US007620630B2

(12) United States Patent
Lloyd et al.

(10) Patent No.: US 7,620,630 B2
(45) Date of Patent: Nov. 17, 2009

(54) DIRECTORY SYSTEM

(75) Inventors: Alan C. Lloyd, Lilydala (AU); Susan M. Oliver, Eaglemont (AU)

(73) Assignee: Oliver Lloyd Pty Ltd, Eaglemont, Victoria (AU)

( * ) Notice: Subject to any disclaimer, the term of this patent is extended or adjusted under 35 U.S.C. 154(b) by 505 days.

(21) Appl. No.: 10/705,242

(22) Filed: Nov. 12, 2003

(65) Prior Publication Data

US 2005/0102297 A1      May 12, 2005

(51) Int. Cl.
G06F 17/30      (2006.01)
(52) U.S. Cl. .................. 707/5; 707/4; 707/101
(58) Field of Classification Search ............... 707/1–10, 707/100–104.1
See application file for complete search history.

(56) References Cited

U.S. PATENT DOCUMENTS

| | | | | |
|---|---|---|---|---|
| 5,237,681 | A * | 8/1993 | Kagan et al. ............ | 707/104.1 |
| 5,566,331 | A * | 10/1996 | Irwin et al. ............. | 707/10 |
| 5,659,616 | A * | 8/1997 | Sudia .................... | 705/76 |
| 6,061,726 | A * | 5/2000 | Cook et al. ............. | 709/226 |
| 6,085,188 | A | 7/2000 | Bachmann et al. | |
| 6,347,312 | B1 | 2/2002 | Byrne et al. | |
| 6,539,382 | B1 * | 3/2003 | Byrne et al. ............ | 707/10 |
| 6,647,393 | B1 * | 11/2003 | Dietterich et al. ...... | 707/102 |
| 6,741,980 | B1 * | 5/2004 | Langseth et al. ....... | 707/2 |
| 7,051,039 | B1 * | 5/2006 | Murthy et al. ......... | 707/102 |
| 7,058,664 | B1 * | 6/2006 | Hsu ....................... | 707/200 |
| 7,475,030 | B1 * | 1/2009 | Tenorio .................. | 705/27 |
| 2002/0107828 | A1 | 8/2002 | Harvey | |
| 2002/0147893 | A1 * | 10/2002 | Roy et al. .............. | 711/154 |
| 2004/0117410 | A1 | 6/2004 | Dietterich et al. | |
| 2004/0146048 | A1 * | 7/2004 | Cotte .................... | 370/352 |

FOREIGN PATENT DOCUMENTS

WO        WO 96/07147        * 3/1996

OTHER PUBLICATIONS

International Search Report.
Written Opinion of the International Searching Authority.

* cited by examiner

*Primary Examiner*—Tim T. Vo
*Assistant Examiner*—Sangwoo Ahn
(74) *Attorney, Agent, or Firm*—Nixon & Vanderhye PC

(57) ABSTRACT

A directory system for providing directory services in a communications network, including a plurality of memory segments for storing respective subsets of directory data for each directory object. The memory segments include attribute segments, object segments, and directory information tree (DIT) segments for respectively storing attribute, management, and hierarchical structure data for directory objects. The directory system monitors usage of directory data stored in the memory segments and redistributes at least a portion of the directory data in the memory segments based on the observed usage to improve the performance of directory services. The directory system also provides transactional messaging services to users.

83 Claims, 10 Drawing Sheets

DIRECTORY SYSTEM

FIELD OF THE INVENTION

The present invention relates to a directory system.

BACKGROUND

Electronic directories allow networked applications to access and manage items of information that represents entities such as people or items of equipment. The items of information are logically organized as a hierarchy of objects or entries in a directory information tree (DIT), where each object has a name (using naming attributes) and one or more other attributes. A directory service provides electronic access to one or more distributed DITs, allowing one or more objects to be accessed by a directory service user performing a search on an object's name or its other attributes, for example.

X.500, is the name given to an internationally agreed set of standards for electronic directory services, as defined by the International Standards Organisation (ISO) and the International Telecommunications Union (ITU). The X.500 directory service is defined in an abstract way and conceptually specifies a distributed object oriented system that has security and access control features. It provides a range of user services (such as Read, Search, List, Modify, Add, Remove and Modify Name operations) that enable a directory service to be distributed, replicated, managed and accessed. One of X.500's protocols used for directory access is known as Directory Access Protocol (DAP), and is defined in X.511. Lightweight Directory Access Protocol (LDAP) is based on DAP and is defined by the Internet Engineering Task Force (IETF) in RFC 2251. LDAP has allowed directory access technology to be easily incorporated into desktop client software.

Directory systems are used by many organizations to store information in relation to the their staff and the organisation's networked computer equipment (printers, routers). For example, a common use of LDAP is to store information representing users of a campus-wide network at a university. A user can log onto any workstation at the university using a single username-password pair that is verified by the workstation after accessing a networked LDAP directory service.

Although directory systems have been successfully applied to large organizations referred to as 'Enterprises' having up to ~50,000 users, today's Internet-based electronic commerce business organisations may need to support much larger numbers (e.g., 30,000-200,000,000) of users. Such an 'eBusiness' could use directory systems to represent many aspects of the business organization, its customers, its services, its policies, its products (including catalogues, content systems and libraries) and its infrastructure components (network systems, mail servers) used to deliver services. In terms of information design, this type of directory virtualizes the organization (as much as possible) into directory system objects as identified entities. Such systems may be expected to hold five hundred million objects, with a schema configuration of hundreds of object classes and thousands of attribute types. In addition, such directory systems need to support the organization's respective security regimes (such as Public Key Infrastructure (PKI) and Access Controls as used for authorization) that are applied to protect ownership, provide information sharing rules and validate trusted identities.

The need to provide rapid, profiled and efficient updating, management and access to so many objects for so many users and services is beyond the capabilities of existing directory systems. Existing directories are engineered as distributed object-oriented databases that comply with the X.500 and LDAP standards. These directories incorporate an underlying storage system of their choosing, such as a Relational Database Management System (RDBMS) based on structured query language (SQL), or Object Oriented Databases.

SQL-based database products have significant drawbacks when ultimate performance is the objective. For example:

(i) The relational model tends to lead to complex objects being fragmented over multiple tables, reflecting "many to one" relationships of elements within a directory object class and the instantiations of that class within a named hierarchical structure.

(ii) SQL is an interpreted language, and this has a performance cost. For a conventional lower scale disk-based RDBMS, this cost is acceptable, as it is less than the cost of disk access when tables are cached, and the main optimization goal of conventional RDBMS products is to avoid unnecessary high rates of disk input/output operations.

(iii) SQL performance is determined by the effectiveness of the query optimizer in turning the SQL into an efficient database access route. Mature RDBMS products have extremely effective query optimizers, but their performance is not guaranteed, particularly when the directory may be subject to a wide range of random queries.

(iv) As the number of entries increases in an RDBMS-based directory system, so do the database table lengths (i.e., the number of rows in a table). This constrained way of extending and joining database tables increases information indexing and search times. A central problem is that RDBMS tables cannot be segmented laterally based on arbitrary object name values, naming contexts (what hierarchy the object might be in) or attribute types and values. This causes significant scaling and extensibility problems for very large directory systems.

Implementing a directory database using an object-based database management system would avoid some of these particular "SQL" problems. However, object databases do not scale well when searching for sparse attributes in complex directory trees or with large entries: object-based directory systems reach their storage, search access and indexing limits very quickly.

To provide high performance in a directory system, the DIT naming information, the attributes held within the directory entries, and the schema and access control information should be accessed as rapidly as possible. Existing directory systems use keys or indexes to access database data, and hash or B-Tree indexing systems are typical. For example, an RDBMS can use keyed columns in its database tables and build hash indexes for them.

One difficulty is that as RDBMS-based directory systems scale, the indexes need to be retuned or rebalanced. Alternatively, if every entry attribute type and value is indexed in the same way and at the same processing level, the system can become saturated with index processing and re-processing.

Moreover, when a new eBusiness user and a corresponding user-to-service relationship is added to a directory service, many directory objects and attributes have to be added in a sequential manner in existing directory systems. This makes the larger scale identity based eBusiness systems quite complex to build and creates a significant risk should the system fail during the user management update process.

Another difficulty facing Internet-based businesses today is the complexity and inefficiency of existing platforms. Internet based service platforms that provide dialup, email, instant messaging (IM) and web based services use a multitude of protocol and network interactions. The shortage of Internet Protocol addresses world wide, network bottlenecks and systems failures all suggest that simpler ways of building systems with fewer "networking" functions are needed.

Similarly, existing directory enabled systems use a considerable number of products and servers, a mixture of information storage paradigms, multiple protocols, and inconsistent data and user identity models to perform even the most basic of tasks in Internet service provisioning. Users require a service environment where they can access one or more on-line applications (e.g., email, IM, web, transactions), using one or more devices (e.g., phones, PCs, PDA, Kiosks and iDTV systems) using a one or more authentication and authorization tokens (e.g., passwords, coded cards, biometrics and signatures). Existing systems implement such interactions in a piecemeal fashion using files, databases, directories, and a range of application processes and decision points. Thus installing, deploying and growing such systems is exceedingly complex and constitutes a significant business risk due to poor scaling and reliability vulnerabilities.

It is desired to provide a directory system that alleviates one or more of the above difficulties, or at least provides a useful alternative.

SUMMARY OF THE INVENTION

In accordance with an exemplary embodiment of the present invention, there is provided a directory system for providing directory services in a communications network, the directory system including a plurality of memory segments for storing respective subsets of directory data for each directory object.

The present an exemplary embodiment of invention also provides a directory system for providing directory services in a communications network, the directory system including a plurality of directory information tree (DIT) segments for storing hierarchical structure data for directory objects, a plurality of object segments for storing management data for said directory objects, and a plurality of attribute segments for storing attribute data for said directory objects.

The present an exemplary embodiment of invention also provides a directory system for providing directory services in a communications network, the directory system including one or more messaging modules for providing transactional messaging services to users.

The present an exemplary embodiment of invention also provides a process for providing directory services in a communications network, including monitoring directory data stored in a plurality of memory segments; and redistributing at least a portion of said directory data in said plurality of memory segments based on said monitoring to improve performance of said directory services.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

In a directory, the term 'relative distinguished name' (RDN) refers to the name of an attribute type-value pair at one level within the directory hierarchy, whereas the term 'distinguished name' (DN) refers to the sequence of RDNs from the root of the hierarchy to a specific entry and provides the unique name by which that entry can be identified. The term 'content prefix distinguished name' refers to the DN of the highest entry in a portion of a directory tree, for example, where that tree is a subordinate branch of a larger hierarchy.

The Context Prefix of a directory (DIT) namespace is the namespace of other directory entries in other directory systems that are superior in name space to this DIT. For example, if the context prefix of a DIT is {c=US, o=govt, ou=defense, ou=army}, then the entries of this prefix are in one or more other interconnected superior—distributed directories. The "Naming Context" of a DIT indicates the DIT's name space responsibility (i.e., what is at the end of and below the Context Prefix). (However, the context prefix of an entry refers to the naming components of that entry without the name of the actual entry (the entry's RDN).

Schema definitions define object class structures, specifying their name forms, what object classes they are derived from, what mandatory attributes they have and what optional attributes they have. Schema also defines the attributes as used in object class definitions re their types and syntaxes. Common schema (e.g., country, organization, organization unit, device, person, etc) is defined in X.520 and X.521.

A name binding rule is used in a directory to enforce structure on the DIT. For example, a name-binding rule might specify that an organization entry can only be placed under a country entry, and that a country entry can only be at the top of the DIT. Such a rule would prevent a directory user from placing countries under people entries or organisational entries. These rules are configured to enforce and maintain "DIT structure" or named object relationships.

Figure 1:
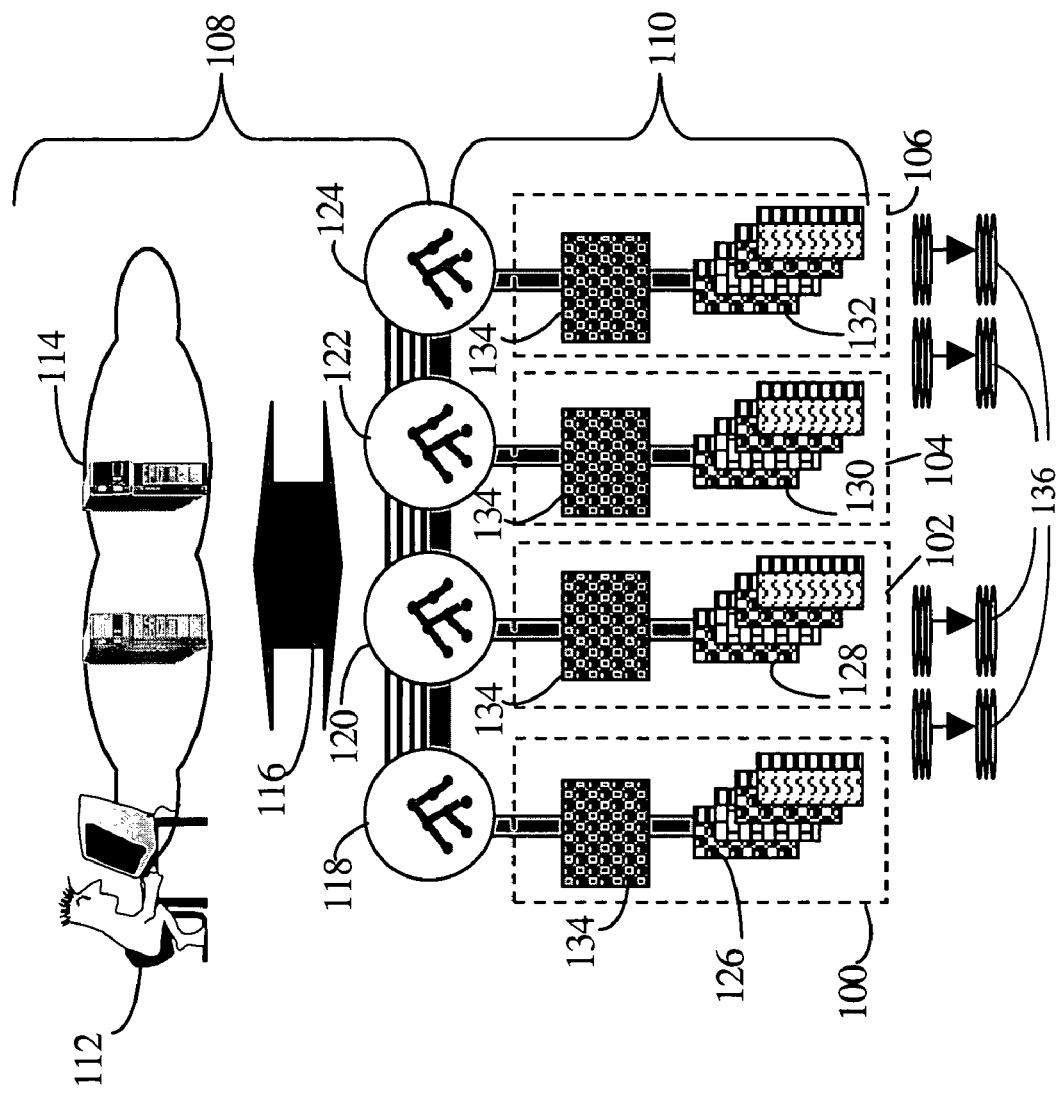
FIG. 1 is a schematic diagram of a preferred embodiment of a group of directory systems being accessed by a remote user via a communications network.

As shown in FIG. 1, the functions performed by directory systems 100 to 106 can be classified into top end functions 108 and back end functions 110. A remote user 112 interacting with any one of the directory systems 100 to 106 via a communications network 114 such as the Internet can access X.500 and LDAP objects/entries of a directory via a distributed X.500/LDAP service 116. This user's view of the directory corresponds to the top end functions 108 of the directory systems 100 to 106. The directory is distributed with a number of object trees (known as Directory Information Trees or DITs) 118 to 126 that are stored and managed by respective directory systems 100 to 106, which may be distributed over a number of physical locations.

The back end functions 110 are those parts of the directory service that are hidden from the user 112. The back end functions 110 provide access to the X.500 and LDAP objects/entries that are stored in adaptive memory resident databases 126 to 132. A set of directory system modules 134 of each of the directory systems 100 to 106 manages and controls access to the memory resident databases 126 to 132. Portions of the data stored in each of the memory resident databases 126 to 132 can be stored or swapped out to standard disk arrays 136 when not in use and retrieved or swapped back from the disk arrays 136 on demand. The directory systems 100 to 106 are identical other than the content of their respective memory resident databases 126 to 132, and the entire directory can be accessed via any one of the directory systems 100 to 106 using chaining and referral processes to provide access to data stored in the databases of the other directory systems. For convenience, the following description is written from the perspective of a local directory system 100 that interacts with remote directory systems 102 to 106.

In contrast to existing directory systems that use generic relational databases or object databases, the directory system 100 uses an adaptive memory resident database 126 based on an extensible set of dedicated virtual memory "segments" for storing directory information and its associated configuration and management data. The virtual memory segments can be independently created, re-dimensioned or destroyed as required. In addition, the directory system 100 executes a directory adaptation process, as described below, that adjusts the data stored in these memory segments in order to improve performance of the directory system 100.

The directory system 100 is also based on a virtual machine environment and provides virtual machines that can operate on the local memory-resident database 126 or make requests through the distributed directory infrastructure to other memory-resident databases 128 or 132 hosted by the remote directory systems 102 to 106. The directory system 100 adaptively reconfigures the virtual memory segments based on usage patterns to reduce search and access times and improve performance of the system 100.

Figure 2:
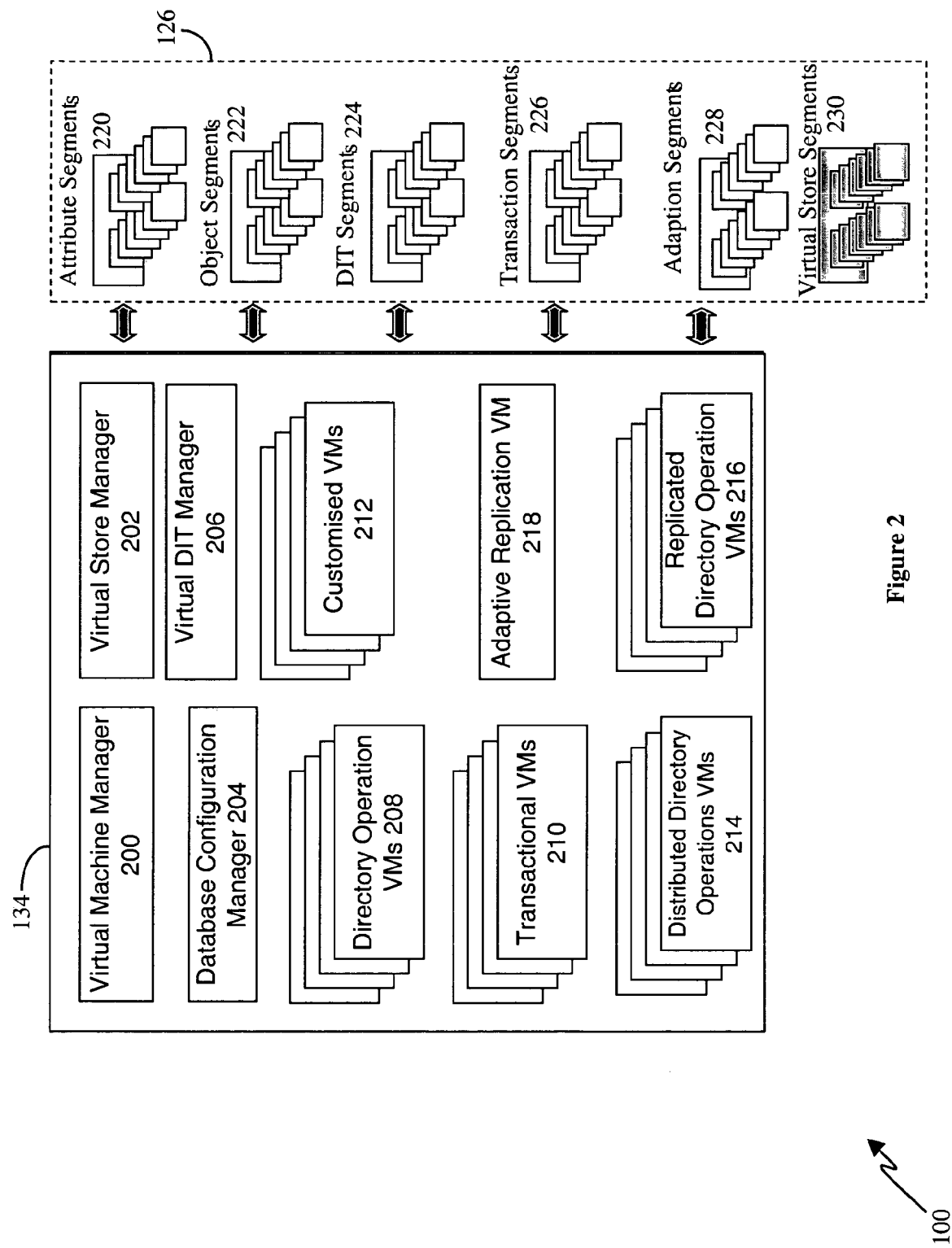
FIG. 2 is a schematic diagram of components of one of the directory systems.

As shown in FIG. 2, the directory system modules 134 include four manager modules 200 to 206, and six types of virtual machine modules 208 to 218. The manager modules include a Virtual Machine Manager (VMM) 200, a Virtual Store Manager (VSM) 202, a Database Configuration Manager (DCM) 204, and a Virtual DIT Manager (VDM) 206. The virtual machine modules include Directory Service Operation Virtual Machines (OVMs) 208, Transactional Virtual Machines (TVMs) 210, Customised Virtual Machines (CVMs) 212, Distributed Directory Operation Virtual Machines (DVMs) 214, Replicated Directory Operation Virtual Machines (RVMs) 216, and Adaptive Replication Virtual Machines (ARVMs) 218. Each of the virtual machines 208 to 216 can be scheduled as a single instance or as multiple instances, particularly in a multi-processor environment where high throughput and concurrency are needed.

Figure 3:
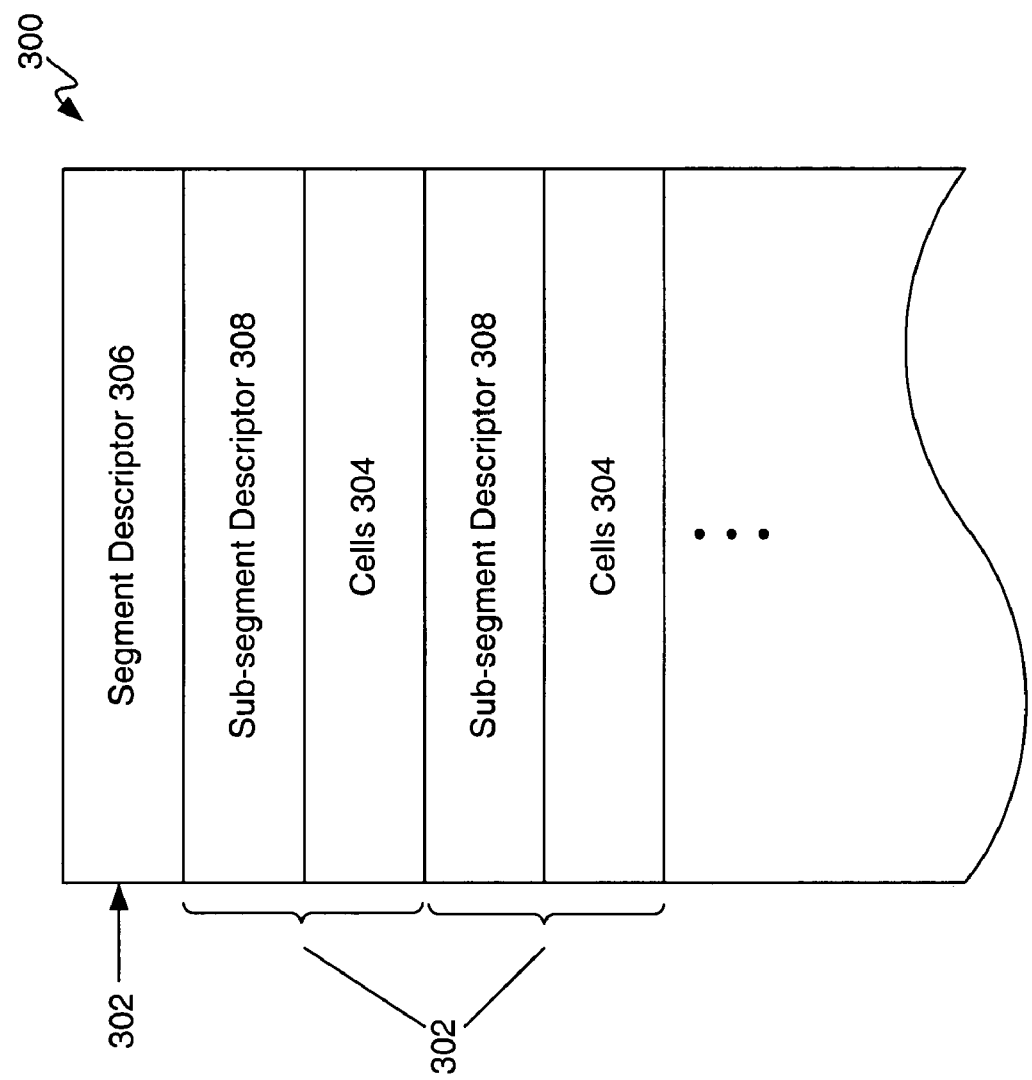
FIG. 3 is a schematic diagram of a virtual memory segment of the directory system.

The memory resident database 126 uses virtual memory segments to store directory object/entry data and also to store data used to manage the directory. As shown in FIG. 3, a virtual memory segment 300 is typically divided into sub-segments 302 containing zero or more data sections referred to as cells 304 that are used to store directory entry or management data. The segment 300 and sub-segments 302 include respective header sections 306, 308 that contain metadata for characterising and managing the respective sub-segments 302 and the data stored in the corresponding cells 304, such as the type of data stored in the cells 304. Each sub-segment 302 may or may not contain sub-segment cells 304 depending on the sub-segment's purpose. The virtual memory segments are implemented as shared memory so that they can be accessed by any of the manager modules 200 to 206 and the virtual machines 208 to 218.

As shown in FIG. 2, the memory resident database 126 provides four types of virtual memory segments for storing and performing transactions on directory data, referred to as directory service segments 220 to 226, and two types of virtual memory segments 228, 230 for managing the directory service segments 220 to 226. The four directory service segment types include three segment types for storing directory entry/object data: attribute segments 220, object segments 222, and DIT segments 224. The attribute segments 220 are used to store attribute data for objects, while the object segments 222 store access control data and other management data for objects. The DIT segments 224 provide the hierarchical directory tree structure of the directory by storing pointers to object data contained in the attribute segments 220 and object segments 222. The segregation of directory data into these three distinct and independently manageable segment types, and the further segregation of object data by various characteristics within each segment type, as described below, provides numerous advantages, in particular by simplifying access and reducing the time needed to create, locate, retrieve, and/or update one or more directory entries. Moreover, the use of effectively one-dimensional virtual memory segments avoids the lateral and logical segmentation difficulties suffered by directory systems that use database tables. A fourth directory service segment type, transaction segments 226, is used to store transaction data for various phases of a transaction to prevent corruption of the directory in case of system failure during the transaction.

The management of the directory service segments 220 to 226 is facilitated by two types of management segments: adaptation segments 228 and virtual store segments 230. Adaptation segments 228 are used by the Virtual DIT Manager (VDM) 206 to adjust or adapt the arrangement of object data and management data stored in the directory service segments 220 to 226 to improve the performance of the directory system 100. For example, the VDM 206 can split a long attribute sub-segment storing many attributes into two or more shorter attribute sub-segments to facilitate parallel processing, as described below. The assignment of all segments as Virtual store segments 230 permits the VSM 202 to manage the storage and retrieval of data between the directory service segments 220 to 224 and the physical storage disk arrays 114.

The Virtual Machine Manager (VMM) 200 manages the creation, destruction, and scheduling of execution instances of the virtual machines 208 to 218, including error and event management. The VMM 200 provides event management and watchdog processes that ensure that virtual machine failures and timeouts do not lock directory resources, and audit and logging mechanisms.

The Virtual Store Manager (VSM) 202 manages the virtual memory segments and their mapping onto physical memory and disk storage, in addition to 'Rolling In' and 'Rolling Out' the virtual store segments onto backing store; i.e., storage media such as high-speed magnetic disks and CDs, in order to optimize use of the available physical memory. The VSM 202 creates, destroys and extends (i) the DIT segments 224 that are used to store the Directory Information Tree(s) (DITs), and (ii) the adaptation and transaction segments that contain the management data for these DITs.

The Database Configuration Manager (DCM) 204 configures the memory-resident database 126. In particular, changes to directory schema definitions, access control and user information are propagated into object segments 222 by the DCM 204. The DCM 204 also populates the adaptation segments 228 with the initial adaptation configuration parameters of the DIT, access control and attribute usage maps. These include parameters that determine when DIT and Attribute segment adaptation is performed. For example, they can indicate adaptation is to be performed daily at midnight; or to create additional attribute segments when attribute sub segments have greater than 1 million attributes (of the same type) and/or if some attributes are not searched for a specified period (e.g., 1 day) then place these attributes into another segment so they can be rolled out independently of the ones that do get accessed frequently.

The Virtual DIT Manager (VDM) 206 performs adaptive optimization of DIT segments 224, attribute segments 220, object segments 222, including sub-segments within those segments, as described below. This involves dynamically adapting DIT, attribute and object segments 220 to 224 of a DIT to suit the DIT organisation and the way that entry attributes are stored and retrieved. A DIT can be divided into many parts, and the VDM 206 can determine individual optimization and adaptation strategies for the DIT, attribute and objects segments 220 to 224 of each part. In particular, the VDM 206 adapts these segments 220 to 224 to improve performance of a directory as its DIT is modified or otherwise accessed. The VDM 206 dynamically re-profiles the DIT, attribute and object segments 220 to 224 by rearranging its grouping and search paths whilst the directory service is active, as described below. The VDM 206 uses its own adaptation segment 228 that contains sub-segments for storing DIT area maps, access control maps and attribute usage maps, as described below.

Nine Directory Service Operation Virtual Machines (OVMs) 208 provide respective multi-threaded X.500/LDAP directory service operations on the memory resident database 126, as defined by the X.500/LDAP directory standards. These operations are:
 (i) Add Entry,
 (ii) Read Entry,
 (iii) Compare Entry,
 (iv) Remove Entry,
 (v) Modify Entry,
 (vi) List (names),
 (vii) Search,
 (viii) ModifyRDN (modify name), and
 (ix) Abandon.

The Distributed Directory Operation Virtual Machines (DVMs) 214 provide X.500 directory service transactional chaining protocol (DSP) service level operations on and between the local memory resident database 126 and remote memory resident databases 126 to 130. Nine types of DVM 214 are provided for respective directory operations as defined by the X.500 directory standards for DSP (i.e., X.518):
 (i) Chained Add Entry,
 (ii) Chained Read Entry,
 (iii) Chained Compare Entry,
 (iv) Chained Remove Entry,
 (v) Chained Modify Entry,
 (vi) Chained List (names),
 (vii) Chained Search,
 (viii) Chained ModifyRDN (modify name), and
 (ix) Chained Abandon.

These DVMs 214 perform X.500 DSP directory operations and call OVMs 208 to perform any local directory operations on the memory resident database 126. The DVMs 214 handle the requests and responses of chained operations in a single-cast or multicast fashion, depending on the operation concerned. The DVMs 214 maintain distributed operation integrity through the use of the transaction segments 226 and the Transactional Virtual Machines (TVMs) 210, as described below.

Six Replicated Directory Operation Virtual Machines (RVMs) 216 provide respective X.500 DISP (replication/shadowing) service level operations on and between memory resident databases 126 to 132. These operations are defined by the X.500 directory standards for DISP (X.525) as:
 (i) Create Operational Binding (Replication Agreement),
 (ii) Modify Operational Binding (Replication Agreement),
 (iii) Delete Operational Binding (Replication Agreement),
 (iv) Coordinate Shadow Update (Supplier request),
 (v) Shadow Update (Shadow transfer), and
 (vi) Request Shadow Update (Consumer request).

The RVMs 216 perform the actual processing of the X.500 DISP directory operations and are described further below.

The Adaptive Replication Virtual Machine (ARVM) 218 provides an X.500 feature referred to as adaptive replication. On large-scale, multi-master and load-balanced systems, multi-party bilateral replication agreements are an operational overhead and add to the system complexity. The ARVM 218 performs DIT replication by replicating the attribute, DIT and object segments 220 to 224, sub-segments and cells in accordance with adaptive replication agreements and operational policies. Operational (replication) policies define whether a replication process is batch (process many entries at once) or incremental (when an entry is updated replicate it), the time window when replication can occur, the name space and the object types to be replicated—and whether this directory system is the master or the replica.

The Transactional Virtual Machines (TVMs) 210 provide integrity for transactional updates. In many directory systems, a power or other system failure may corrupt directories by leaving corrupt or partial entries. The TVMs 210 store transaction data in the cells of transaction segments 226 for all directory updates to manage updates and recovery situations when required. This allows directory data and its management segments to be updated and stored with both high performance and integrity.

Each TVM 210 determines the transaction phase as one of:
 (i) The preparation phase—when the directory operation is started and its parameters are written to a Transaction Sub-segment cell by an OVM 208.
 (ii) The examination phase—where the Transaction Sub-segment and cells are examined by the TVM 210 after a failure condition to see what update recovery process approaches should be taken.
 (iii) The re-execution phase—where the transaction is re-executed by the TVM 210 from a full or partial recovery perspective.
 (iv) The completion phase—when the transaction (or its recovery) is deemed complete.

Transactional information can be written directly into the transaction segment 226 and/or at the same time backed out to back up media/files depending on the setting of the integrity mode in the object sub-segment SYS cells, as described below.

The TVMs 210 are provided in different types for each transaction type, such as an X.500/LDAP directory service update (performed by an Add, Modify, Modify RDN or Remove OVM 208), the database adaptation and re-profiling process (performed by the VDM 206), a directory service replication procedure (performed by an RVM 216) or distributed operation (performed by a DVM 214). In addition, each type of transactional TVM 210 provides customized recovery procedures for the different transaction phases.

The Customised Virtual Machines (CVMs) 212 provide customized services that are extensions to the standard directory service model, including user and service identity management functions (multi object management), relational searching, user certificate PKI validation, and supporting the directory's transactional or instant messaging functions.

Specifically, 17 types of CVM are provided, one to support each of the following services within the directory system 100:
 (i) CVM—Statistical Evaluation (CVM-SE);
 (ii) CVM—Change Monitoring (CVM-CM);
 (iii) CVM—Validate Certificates (CVM-VC);
 (iv) CVM—Collective Attributes (CVM-CA);
 (v) CVM—Multi-Object Management (CVM-MO);
 (vi) CVM—Service Authorization (CVM-SA);
 (vii) CVM—User Presence (CVM-UP);
 (viii) CVM—Relational Searching (CVM-RS);
 (ix) CVM—Directory Service Messaging (CVM-DM);
 (x) CVM—Message Submission (CVM-EMS);
 (xi) CVM—Message Management (CVM-EMM);
 (xii) CVM—Message List expansion (CVM-EML);
 (xiii) CVM—Message Retrieval (CVM-EMR);
 (xiv) CVM—Address Book (CVM-EAB);
 (xv) CVM—Mail Folder (CVM-EAF);
 (xvi) CVM—Calendar/Diary (CVM-ECD); and
 (xvii) CVM—Message Gateway (CVM-EMG).

In some cases, a CVM 212 has an active relationship with specific directory object classes such as Post Boxes (as used for transactional messaging), Users, Roles, Services and with Authentication and Authorization processing. Such 'active' CVMs monitor specific objects to either create system events, notify Users of directory entry changes, or maintain referential integrity between an entry and other directory entries (e.g., entries related to memberships and groups).

The structure and indexing of each virtual memory segment type will now be described.

Attribute Segments

Attribute Segments 220 contain one or more sub-segments, each containing data for one attribute type. Each attribute sub-segment contains zero or more cells for storing the details of each instance of that attribute type. Attribute Segments 220 contain all the attribute type and value information as well as their normalized forms and any control flags set to indicate that specialised processing is required.

The segregation of attributes by type permits single attribute types (or several attribute types) to be directly targeted in a Read/Search operation without needing to go through the entire set of directory entries and all of their attributes to find a specific attribute type(s) and values. In other words, the directory system 100 segregates attributes by type (for example, phone numbers, email addresses, etc are each stored together) within each sub-segment of an attribute segment 220 in order to allow high-speed attribute type level processing. Furthermore, if the number of attribute instances in a sub-segment exceeds a configurable threshold value then that sub-segment can be divided into two or more smaller sub-segments, allowing these to be processed in parallel.

Attribute types are also segregated by their naming role (distinguished and non distinguished) within the directory in order to improve navigation and entry selection processing. Specifically, attribute types are marked as either:
 (i) Distinguished attributes (used for names (DNs/RDNs),
 (ii) Aliased Distinguished Names, or
 (iii) Non Naming Attributes.

Naming is a major property of directories and directories have functions like "navigation" and alias dereferencing that use DN structures—DNs are made of RDNs, and RDNs have one or more attributes that are tagged as "distinguished" attributes in that these attributes of an entry distinguish it from other entries in the same name space. (RDBs don't have these naming properties or functions). It is advantageous to process attributes (of any type) on the basis of whether they are distinguished or not. For example, a Navigation and Rename operation can only be performed on distinguished attributes, whereas a Modify operation will only work on non distinguished attributes.

Directory entry attributes are segregated by their directory information properties within their X.500/LDAP information contexts in order to improve directory information processing. Specifically, an attribute is identified as being one of the following attribute types:
 (i) Collective Attributes,
 (ii) Compound Attributes—such as X.509 certificates and certificate revocation lists (CRLs),
 (iii) Attributes of Compound attributes,
 (iv) X.500/LDAP operational attributes,
 (v) User Operational (Presence) attributes,
 (vi) Sponsoring Attributes, or
 (vii) Normal attributes (where an attribute is none of the above).

The directory system 100 stores and processes all directory entry attributes including compound attributes (i.e., nested attributes defined within attributes, such as X.509 certificates and member lists), at the same processing level to optimise retrieval.

Each attribute value is stored with a normalized form of the value and a hash of the value in attribute sub-segment cells in order to support rapid value-based searching on entry attributes. A hash value of the Relative Distinguished Name (RDN) is stored as an RDN Identifier in each attribute sub-segment cell in order to support rapid entry level based searching and results collection.

Figure 7:
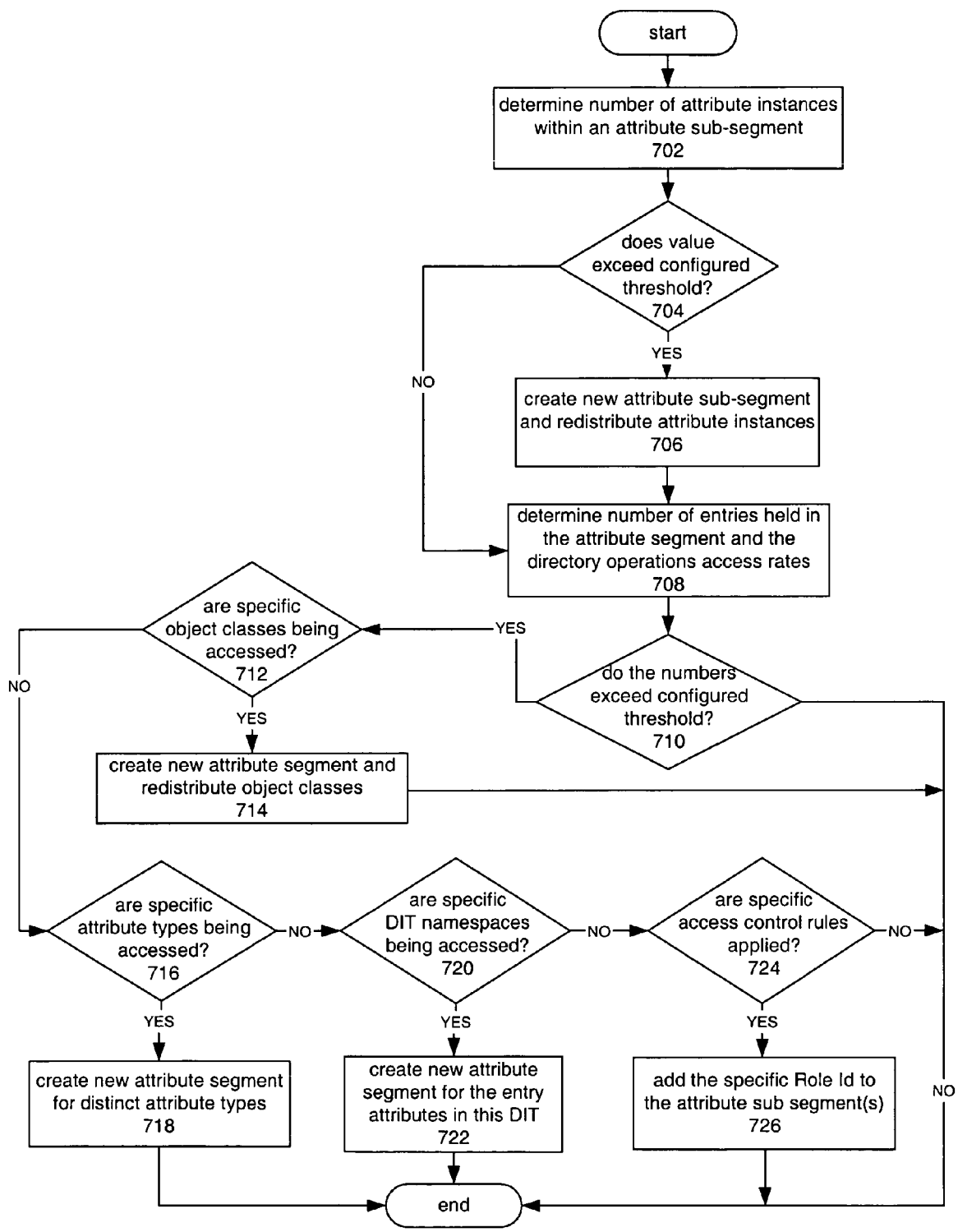
FIG. 7 is a flow diagram of an attribute segment adaptation process of the directory adaptation process.

Attribute Segments can be used in several ways, according to DIT optimization requirements as performed by an attribute segment adaptation process as shown in FIG. 7 and described below. For instance, Attribute Segments can be used in the following modes of operation:
 (i) Basic—There is one Attribute Segment that contains all the Sub-segments for all the attribute types held in the complete DIT. (This is the simplest form of DIT and Entry/Attribute configuration).
 (ii) Attribute Type Splitting—the attribute segment adaptation process can split up Attribute Sub Segments that have become very populated (long) because there are many instances of that attribute type in the DIT. This splitting enables parallel searching of Attribute Sub segments of a given type in addition to the parallel searching enabled by the segregation of attribute based on attribute type. The two or more resulting sub-segments for that attribute type can be stored in the same attribute segment or in two or more attribute segments.
 (iii) Object Class Splitting—There is more than one Attribute Segment where each segment contains Sub-segments that relate to particular object classes and their attributes held in the complete DIT. (This configuration is used where different object classes can be stored in distinct Attribute Segments. For example, X.500/LDAP Device object class attributes can be stored in one Attribute Segment, and X.500/LDAP Person object class attributes stored in another Attribute Segment).
 (iv) Complex/Distinct Attribute Splitting—There is more than one Attribute Segment and each contains one or more sub-segments for specific attribute(s) held in the complete DIT. (For example, the X.500/LDAP Organizational Attribute Sets or the X.509 certificates and CRLs can be held in distinct Attribute Segments.)
(v) DIT Splitting—There is more than one Attribute Segment where each contains all the Sub-segments for all the attribute types held in a portion of the DIT. (This configuration is used where Search and Update rates may be high and higher concurrency is required.)
(vi) Access Control Role Id Splitting (by Attribute Type)— This mode can be used if distinct Access Control Role Ids are associated with specific Attribute Types within an attribute segment. In this case the respective Role Ids can be stored in the headers of the specific Attribute Sub Segments they directly relate to.

Alternately, Attribute Segments can be used in any combination of the above modes. Such flexibility ensures shortest path accesses (Searches and Reads) can occur in a hierarchical or lateral manner over the DIT.

Each Attribute Segment Header contains management information about the complete segment. The Attribute Segment Header contents are:
(i) The segment type identifier (e.g., "Attribute Segment NNNN" or an object identifier (OID)).
(ii) The maximum size of the segment.
(iii) The number of attribute types being managed in this segment.
(iv) A Master/Replica indicator.
(v) The Attribute Segment mode (i.e., whether basic or adapted and, if adapted, whether the mode supports, Attribute, Object Class, Complex Attribute, or DIT Splitting).
(vi) Object Class identifier—used only if this attribute segment supports a single object class (through adaptation).
(vii) The existence or residence (file state) of the segment (being rolled in from backup storage or rolled out to backup storage by the VSM 202).
(viii) A file name for archive when the complete segment is archived.
(ix) A file name for restore when the complete segment is being restored.

Each Attribute Sub-segment Header contains management information about the way in which a single particular attribute type is managed. The Attribute Sub-segment Header contents are:
(i) The Sub-segment and attribute type identifier. (e.g. "Attribute Sub-Segment" TTTT, NN or an OID where TTTT=type, NN=number).
(ii) The maximum size of the sub-segment.
(iii) The number of attribute cells being managed in this sub-segment.
(iv) Attribute type control flags that indicate the Attribute cells contain:
 (a) A complex type (CRL, Certificate or mail list)
 (b) A component of a complex attribute (for example, a certificate Serial Number)
 (c) Sponsoring attributes and can create multi object events.
 (d) Distinguished attributes (the RDN or part of it).
 (e) Aliased DN attributes.
 (f) X.500/LDAP operational attributes.
 (g) User Operational (presence attributes)
  (i) Such as On-line, Location, Device Type, Profile, Security Level, Inform List.
 (h) Collective attributes and will be applied to it and its subordinate entries.
(v) The attribute syntax (String, Binary, Numeric).
(vi) The attribute type AC Role Id—allowing access control information (ACI) roles to be placed at the attribute type level.
(vii) The attribute cell size.
(viii) The existence or residence (file state) of the sub-segment (being rolled in from backup storage or rolled out to backup storage by the VSM 202).
(ix) A file name for archive when cells of this attribute type are being archived.
(x) A file name for restore when cells of this attribute type are being restored.

Each attribute Sub-segment cell contains management information and the value of a single attribute of the corresponding entry as follows:
(i) The cell identifier. (e.g., "a cell number")
(ii) The context prefix identifier of the object/entry with this attribute as taken from the DIT sub segment (i.e., the DN prefix of this of this (entry's) attribute).
(iii) The Relative Distinguished Name identifier of the entry with this attribute.
(iv) Attribute control flags:
 (a) A value indicator (0-N) to indicate this is one value of a multi-valued attribute.
 (b) An archive flag to indicate whether the attribute has been archived (because
 (c) A flag to indicate if this attribute is associated with other attributes.
 (d) A flag to indicate if this attribute is the sponsoring attribute associated with other attributes.
 (e) A flag to indicate if this attribute is an alias.
(v) The length of the attribute.
(vi) The attribute value as given.
(vii) The attribute value normalized—white space and accented characters removed.
(viii) The hash of the attribute value—to assist Search processing.
(ix) A component indicator to indicate the attribute type is a component of another attribute type.
(x) A file name to indicate this attribute has been rolled out (archived) to backing store (used in the case of attributes where their values are very large binary objects).
(xi) A DN List that indicates the names of the objects that this associated attribute updates when modified.

DIT Segments

The DIT Segments 224 contain one or more sub-segments that contain cells. DIT Sub-segments 224 contain references to the entries in a directory tree (by their name and context prefix), allowing very rapid directory entry navigation without having to find a specific entry in an hierarchical fashion through an entire set of directory entries and their naming attributes. The DIT Segments 224 stores a Context Prefix Distinguished Name in string form as well as a hash value generated from the Context Prefix DN. Both information items assist with DIT navigation far more efficiently than using full name value equivalence matching on complex DN—RDN hierarchical structures.

DIT sub-segments are created when leaf entries are added to leaf entries and removed when a parent entry no longer has any leaf objects below it. DIT sub-segments contain one or more cells that point to one or more Attribute Segments 220 and Object Segments 222. DIT sub-segment Cells can be copied from superior DIT sub-segment cells when leaf objects are added or they can be regenerated according to the access control rules for the new entry or the object class and schema of the new entry. One or more DIT sub-segment cells can index the same Attribute 220 and/or Object Segments 222.

DIT segments can be applied in several modes according to DIT optimization requirements. For instance, DIT sub-segments can be organized using a Group and Sequence Id, as described below, so that a group's sub-segments can identify to particular directory nodes and their subordinates in the DIT. DIT Segments can be used in the following modes:

Basic—There is one DIT Segment that contains all the DIT sub-segments with cells that point to all the Attribute Segments that hold the complete DIT. (This is the simplest form of DIT and Entry/Attribute configuration.)

DIT Organisation Splitting—There is more than one DIT Segment where each contains a number of DIT sub-segments with cells that point to the same Attribute Segments, which hold the complete DIT. (This configuration is applied where there are large numbers of entries held in subordinate name spaces in a particular DIT Segment and it is expedient (for navigation performance reasons) to split the DIT Segment into two or more distinct smaller DIT segments. This provides more entry points to the DIT(s) for navigation at the Segment level.

DIT Access Control Rule Splitting—There is more than one DIT Segment where each contains some sub-segments related to particular portions of the complete DIT (for example, a top level DIT with many Organizational Unit DITs). This configuration is used where there are many entries in the directory, but where distinct parts of the DIT contain distinct access control rules. An example is where one DIT Segment and its DIT Sub Segments are associated with the same access control Role Id, and another DIT Segment and its Sub Segments are associated with a different access control Role Id.

DIT Flat Space Splitting—This feature enables a flat namespace with large numbers of leaf entries to be split across a number of DIT Sub-Segments to improve performance. In this case splitting can be derived from entry counts held under one DIT segment or a namespace prefix mask that indicates the part of the internal name that is the full external name (e.g., the prefixes of 3 DIT sub segments might be "Parts1", "Parts2", and "Parts3" a prefix mask of "Parts" indicates that these sub-segments are to be internally and externally represented as a contiguous "flat space". Where Flat Space Splitting is used, the Search VM of the OVMs 208 can create another execution instance of the Search VM so that Search concurrency can be achieved (where multi-processor hardware is used).

Alternately, DIT Segments can be applied in any combination of the above modes according to the DIT structure and responsibility of the database 126. Such flexibility ensures that fast access (Searches and Reads) can occur in a segmented manner over the DIT and complex access control rules are not tested for when they do not apply.

Attribute and DIT Adaptation Mode Combinations

Table 1 below defines the ways in which Attribute and DIT Segment modes of adaptation can be used in combination. Basic means there is one Attribute or DIT Segment only. The other modes use two or more Attribute or DIT segments.

TABLE 1

| Attribute Mode/ DIT Mode | Basic | DIT Organization | DIT- Access Control Rules | Flat |
| --- | --- | --- | --- | --- |
| Basic | Allowed | Allowed | No | Allowed |
| Attribute Type Split | Allowed | Allowed | Allowed | Allowed |
| Object Class Split | Allowed | Allowed | Allowed | Allowed |
| Simple/Complex Attribute Split | Allowed | Allowed | Allowed | Allowed |
| DIT Name Split | No | Allowed | Allowed | No |
| Access Control Role Id Splitting (Attribute Type) | Allowed | Allowed | Allowed | Allowed |

DIT sub-segment Cells point to Attribute Segments 220 (for attribute and entry information) and Object Segments 222 for Access Control and Schema management information. Different DIT sub-segments can point to different Attribute and Object Segment sets. Such partitioning enables additional levels of adaptability and efficiency in the instances where large numbers of object classes, attributes, Users and their access control information are dispersed asymmetrically throughout the directory service.

The DIT Segment Header contains the management information about the complete DIT Segment 224. The DIT Segment Header contents are:

(i) The segment type identifier (e.g. "DIT Segment NNNN" or an OID).

(ii) The maximum size of the segment.

(iii) The number of entries being managed in this segment.

(iv) The Context Prefix Identifier—stored as an object identifier. An object identifier (OID) is a set of numbers separated by periods (i.e., in 'dot notation') that indicates an object's position in a directory hierarchy. If an item in a directory system is given an OID, the OID provides rapid understanding of the item's position within a top down allocation scheme and the "tree depth" of the entity from the length of numbers used. For example, an entity with an OID of 1.7.4.88 is higher in the scheme than an entity at 1.7.5.35.99.222. OID numbers assigned to directory "names" facilitate rapid processing; for example, a request to retrieve all the entries below x.x.x.x indicates that the search starts at 4 levels down and all the entries returned will have at least 5 numbers.

(v) The DIT (Access Control) Identifier—a numeric value that uniquely identifies the parts of the DIT associated with this DIT segment, as described below. The Access Control evaluation process described below uses the DIT identifier to determine whether a user can access this part of the DIT.

(vi) The Access Control Role Id—if one Access Role Id is used throughout this DIT Segment. This is set through system configuration or via the DIT Adaptation modes.

(vii) The mode of this DIT (Master or Replica) and Read Only.

(viii) The existence or residence (file state) of the segment (being rolled in from backup storage or rolled out to back up storage by the VSM 202).

(ix) A file name for archive when the complete segment is archived.

(x) A file name for restore when the complete segment is being restored.

The DIT sub-segment Header contains management information for a particular DIT portion, as follows:
 (i) The sub-segment type identifier (e.g., "DIT Sub-Segment NNNN" or an OID).
 (ii) The sub-segment group—sequence Id. Used to group DIT sub-segments; for example, where Flat Name Space segmentation is applied.
 (iii) The Access Control Role Id—present only if one Access Role Id is used. Otherwise, if multiple Role Ids exist for this DIT sub-segment, then they are determined by accessing the corresponding DIT sub-segment Cells and Object Segment Cells.
 (iv) The Context Prefix of this DIT sub segment (including the external Context Prefix).
 (v) The DIT (Access Control) Identifier—a numeric value that uniquely identifies the part of the DIT associated with this Sub Segment, as described below. The Access Control evaluation process described below uses the DIT identifier to determine whether a user can access this part of the DIT.
 (vi) The Context Prefix Identifier, stored as an Object Identifier (OID).
 (vii) The number of DIT cells being managed in this sub segment.
 (viii) The Context Prefix DN, held in string form.
 (ix) The Context Prefix DN hashed.
 (x) The next RDN Id to be used when an entry is added to this Context Prefix.
 (xi) Flat Space Identifier: 0=DIT area is not segmented, 1-N=DIT Flat Space portion
 (xii) Maximum number of Flat Space Entries: When this value is reached, a new Flat Space DIT Sub-Segment is created.
 (xiii) Flat Space Name Prefix: Set to the RDN prefix value of the entries that will be logically stored in Attribute Segments pointed to by this DIT sub-segment's cells.
 (xiv) The existence or residence (file state) of the sub segment (being rolled in from backup storage or rolled out to backup storage by the VSM 202).
 (xv) A file name for archive when these DIT cells are being archived.
 (xvi) A file name for restore when these DIT cells are being restored.

Each DIT sub-segment Header is followed by one or more DIT sub-segment Cells that point to Object Segments 222 (for Access Control and schema information) and Attribute Segments 220 (for entry attribute information and values). The DIT sub-segment Cell contents are:
 (i) The DIT cell identifier. (e.g. "DIT Cell" or an OID).
 (ii) The Object Segment Identifier(s) that point to the object segments related to the attributes/entries contained in the Attribute Segment(s) identified below. The Object Segment(s) identified contains the schema and access control check information for these entries.
 (iii) The Attribute Segment Identifier(s) that point to the Attribute Segment(s) where the attributes of this DIT portion are stored.

Object Segments

Object Segments 222 contain one or more Sub-segments that contain cells. Object Sub-segments contain DIT schema definitions and access control information. As DIT Sub Segments are created (as a result of processing DIT configuration or DIT adaption rules), existing or new (adapted) Attribute and Object Segments are assigned to them. Attribute Segments hold the directory data for the DIT namespace. Object Segments store the schema and access control rules for the data in that DIT namespace. The DIT schema is a set of rules defining object classes, attribute type definitions, matching rules, and DIT structure rules that define where entries can be placed within the DIT. DIT update operations VMs (i.e., the Add, Remove, Modify and ModifyRDN OVMs of the OVMs 208) access Object Segments 222 to determine the directory's schema rules. DIT access (i.e., Read, Search, Compare, and List OVMs) and DIT update operations VMs access Object Segments 222 to determine access control information.

Object sub-segments are created and updated from configuration items (be they files or directory objects) by the DCM 204. Object sub-segments are sub typed as to their purpose and contain information cells where necessary.

Object Segments can be used in accordance with several modes according to DIT optimization requirements because particular aspects of DIT configuration may only apply to specific parts of a DIT. For instance, an Object Segment can contain all the sub-segment types (Object Class information, Name Binding, Access Controls and Knowledge information) necessary for the directory system 100 to operate. This configuration is referred to as an Object Segment basic mode of operation. Other Object Segment modes permit specific object class specifications, ACI and DIT structure rules (Name Bindings) to be assigned to distinct portions of the DIT so that simpler and faster checking can occur relative to that part of the DIT. This is done because, in large distributed systems, it is not efficient to always process large complex configuration files that cover the whole system for every type of access/update, when only a small portion of that configuration applies to specific parts of the system on specific access types. Hence an object segment adaptation process puts ACI, schema and name bindings in distinct Object Sub Segments and associates these with the corresponding DIT Sub Segments.

For example, if a subset of the object class and name binding rules only applies to distinct portions of the DIT because specialised object classes exist in that part of the DIT, then it is only those that should be tested when updates occur within that portion of the DIT.

In particular, if there is an access control rule that specifies particular Role Ids for a portion of the DIT, then only those Role Ids are inspected when that part of the DIT is accessed.

Object Segments can be organized according to the following modes:
 Basic—There is one Object Segment that contains all the Object sub-segments and the cells necessary for the directory system 100 to operate as an X.500/LDAP directory service.
 Name Binding Splitting—There is more than one Object Segment, where one Object Segment can contain in its Sub Segments all the commonly defined schema definitions and name binding rules. Other Object Segments and Sub Segments can contain distinct Name Binding rules for distinct parts of the DIT. This allows selected configuration elements to be assigned to those parts of the DITs that actually apply them, reducing processing overhead and improving the performance of the directory system.
 Access Control Role Id Splitting (by name space)—There is more than one Object Segment where one Object Segment can contain the common Object sub-segments, and the other Object Segments contain sub-segments that store the distinct Access Control Role Ids (as per Name Bindings).
 Multi Object Profile Splitting—There is more than one Object Segment, where one Object Segment contains all the common Object sub-segments and the other Object Segments contain sub-segments that hold distinct profiles for Multi Object updates. In single object updates, schema and name bindings are defined to ensure that objects are properly defined (schema check) when being added to the directory (as a single object) and to ensure the object is put in the right place in the hierarchy (DIT name binding check). Where multiple objects are added in an atomic way, a "multi object" schema check and a multi position naming check is performed. For performance and atomicity reasons, these checks are bundled into distinct Object segments for the update activity concerned. With multi object processes, a fast, concise "one test" is performed before attempting the update. If this information was not in one place, a multi object update would have to search through all the "common" configuration items that may be spread over a number of other object segments to determine what part of that configuration needed to be checked.

Alternatively, Object Segments can be applied in any combination of the above modes according to the DIT structure and responsibility of the directory system 100. Such flexibility ensures fast access (Searches and Reads) can occur in a segmented manner over the DIT and complex access control rules are not tested for when they do not apply.

An object segment header contains the following:
(i) The segment type identifier (e.g., "Object Segment NNNN" or an OID).
(ii) The maximum size of the segment.
(iii) The number of sub-segments being managed in this segment.
(iv) The Context Prefix of the DIT this Object Segment applies to (e.g., c=us, o=gov, ou=dod).
(v) The Context Prefix Identifier, held as an Object Identifier.
(vi) The mode of this Object Segment (Master or Replica) and Read Only (enabling directory service configuration information to be replicated).
(vii) The existence or residence (file state) of the sub segment (being rolled in from backup storage or rolled out to backup storage by the VSM 202).
(viii) A file name for archive when the complete segment is archived.
(ix) A file name for restore when the complete segment is being restored.

Each Object sub-segment Header contains management information about the cells that are subordinate to the header, as follows:
(i) The sub-segment type and sub type identifier. These identifiers indicate that the following cells contain one of:
  (a) SYS—System Control information
  (b) KI—Knowledge Information
  (c) OC—Object Class Structure information
  (d) ATT—Attribute Type Definitions
  (e) NB—Name Binding Information
  (f) US—User-Service Multiple Object Template, or
  (g) AC—Access Control Information.
(ii) The maximum size of the sub segment.
(iii) The number of cells in this sub segment.
(iv) The Context Prefix that this Object Sub segment applies to (e.g., c=us, o=gov, ou=dod, ou=army). This is assigned by pre configuration or by the Object Segment adaptation process.
(v) The Context Prefix Identifier, held as an Object Identifier.
(vi) The existence or residence (file state) of the sub segment (being rolled in from backup storage or rolled out to backup storage by the VSM 202).
(vii) A file name for archive when this sub-segment Object is being archived.
(viii) A file name for restore when this sub-segment is being restored.

Object sub-segment Cells contain directory and system management information as shown above. The contents of the cells are dependent on the cell type. The Object sub-segment Cell contents are either the Object Segment Cell type identifier, or additional information, depending on the cell type. The various types of object sub-segment will now be described. A System Control Cell holds high-level flags used by the virtual machines 208 to 216, as follows:
(i) Integrity Mode—This indicates the integrity mode the directory system 100 is working in. The options are High Integrity Mode where all updates are journalized from the Transaction Segment 226 to backing store and Low Integrity Mode where all updates are just applied in line to the Transaction Segment only.
(ii) State—indicates:
  (a) Activation state of the directory system 100, these can be off line, loading, suspended, active, or in error;
  (b) DCM 204 is active (updating Access Control Information and User Ids); or
  (c) VDM 206 is active (updating/re-profiling the DIT, Attribute and Object Segments).

The above State indicators are used by the VM scheduling processes to ensure that resources are locked when necessary and that no conflicts in the attribute, DIT and object segments reconfiguration processes occur. For example, to prevent an update operation being performed when an adaptation process is executing.

A Knowledge Information Cell provides the network or domain name address and namespace responsibilities of this directory system 100 and other associated directory systems 102 to 106. Note that each directory system 100 to 106 can be responsible for many Namespaces, as they can apply their processing to one or more DIT Segments. The Knowledge Information Cell contents are:
(i) Mode is set for master or replica;
(ii) Availability set to off line or on-line;
(iii) The Context Prefixes of the directory system 100;
(iv) The Context Prefix Identifiers, held as Object Identifiers;
(v) Domain name or IP address of the directory system 100 in the network;
(vi) Available VMs—indicates what capability this directory system 100 has including its management VMs;
(vii) Permissible VMs (Public)—indicates what non authenticated Users can do on this directory system 100;
(viii) Permissible VMs (Protected)—indicates what authenticated Users can do on this directory system 100; and
(ix) Adaptive Replica Management parameters—Refresh rate, Refresh time.

An Object Class Cell indicates the directory entry object class definitions as defined by the X.500/LDAP standards. The Object Class Cell contents are:
(i) Object Id is the standard identifier assigned to the object class.
(ii) Object Type is the natural register name of the object (for example. Person Object Class).
(iii) Must Contain attributes are the attributes that must always be present in an object if it is placed in the directory.

(iv) May Contain attributes are the attributes that may be present in an object if it is placed in the directory.

Object Class Control Flags indicate if this is a sponsoring object.

The Attribute Type/Syntax Cell indicates the directory entry attribute definitions as defined by the X.500/LDAP standards, as follows:
  (i) Object Id is the standard identifier assigned to the attribute type.
  (ii) Attribute Type Control Flags—indicate if this is a sponsoring attribute
  (iii) Attribute Syntax defines if the attribute is String, Integer, Certificate,
  (iv) Attribute Name is the standard name for the attribute
  (v) Alternative (LDAP) names are the alias names for the attribute type.

The Name Binding Cell indicates the directory entry object class/hierarchy relationships definitions as defined by the X.500/LDAP standards. The Name Binding Cell contents are:
  (i) Object Id is the standard identifier assigned to the name binding
  (ii) Rule Id is a number assigned to this name binding
  (iii) Superior Object Class is the object class of the superior object in this rule.
  (iv) Subordinate Object Class is the object class of the subordinate object in this rule.
  (v) Name attribute type is the attribute syntax (for example Country Name) that is used in this object class relationship.

The US (User-Service) Multiple Object Template Cell is used by the Multi-Object Management CVM. This cell is used to store the prefix names, object classes and attribute values that are applied when a User that has access to multiple services is created in the directory and that operation requires that multiple directory entries or a User group be created with its members as sponsored objects. The US (User-Service) Multiple Object Template Cell contents are:
  (i) A User Id specifying who can use this template (for example, a Service Provisioning Application); and
  (ii) Multiple entries of:
    (a) The operation: Add or Modify entry.
    (b) The attribute as taken from the primary entry being added that will be used for this entry's name if this entry is to be created. If the entry is to be modified (a member list) this is the name added to the list.
    (c) The Context Prefix DN of where this object is placed or modified, as appropriate.
    (d) The Object Class of the entry to be added or modified, as appropriate (e.g., a mail box, address book, vCard or Presence management object).
    (e) The pre loaded attribute values for this object class.
    (f) The access control Role Ids associated with the object.

Access Control Information (ACI) is logically defined in X.501 and the LDAP standards. These definitions are somewhat cryptic as they use Abstract Syntax Notation One (ASN.1) as their definition notation. Large directory systems use rules-based configuration (such as Administrator, Groups, Named Users, Directory Applications, Self Administration and Public User) placed above that of the X.501 definitions. These access control rules also define access policies on directory namespace, the operations permitted and what entries/attributes can be accessed.

The Object sub-segment(s) contain cells that store ACI used to determine a User's or a User group's permissions in the directory. This information is generated from a system level Rules based configuration. As it is important that ACI processing is both effective and efficient, DIT sub-segment Cells point to the Object Segments 222 for the purposes of associating specific schema management and ACI processing to specific parts of the DIT.

ACI related to a user's permissions in the directory system is stored in the Object Segment cells for performance reasons. Access control is managed through the use of Object sub-segment access control (AC) cells. An AC Cell contains the following data:
  (i) A User Id, being the Distinguished Name (DN) assigned to a specific User or a group of users. A User Id is the DN of the user's entry in the directory that this AC cell relates to. For groups of users, it is the DN of an entry that is the immediate superior to that of the user's entries, or the DN of an entry that is an X.500/LDAP "group of names" object that contains the user's names (DNs) associated with this AC cell.
  (ii) A Context Prefix Identifier; that is, the DIT namespace this User or User group has access permissions on.
  (iii) The VM permissions of this User or User group, that is the ability to read or update.
  (iv) The Role Id assigned to this User or User group, defining their capability on this part of the DIT.

As shown above, AC cells contain "Role Ids" for controlling access to all levels of the database 126 down to the attribute level of the DIT for specific users or user groups. AC cells provide the linkage between the Access Control rules (i.e., Role Ids) applied to portions of the directory name space (the DIT) and the Users or User groups that have access rights over that name space. Access controls can be applied in a singular or nested specification at many levels, e.g., applied to an entire directory, specific operations (updates, modifies), portions of name space, specific object classes and specific attribute types—and in combinations of these. The AC cells define a Context Prefix, permissions and role(s). One or more of these AC cells are applied by the DCM 204 to the database 126 when, for example, a User is created and that User requires access control rules (permissions) to be applied across the directory service. For instance, if a new user is added with the same permissions as one or more other users, then the new user can be added to a user group having those users as members. Alternatively, if the new user has very specific access control requirements, then one (or more) AC cells will be added to the Object Segment of the DIT segment(s) concerned, providing the new user's access permissions to the DIT(s). The coupling of user identifiers (or directory user names) and Role Ids in AC cells ensures that access control decisions can be made rapidly.

Directory services permit access to Public users; i.e., users that are not preconfigured in the directory with their own named entries and do not have explicit access control rules assigned to them. Explicit access control rules can only be assigned to users who have named directory entries and who authenticate with the directory by entering their name and password. Additionally, an IT system may have many servers of a specific type (e.g. web and mail servers) that accesses specific parts of the DIT for specific information (user password, mailbox details, forwarding address, etc). In both cases, optimisations can be made by assigning administrative Role Ids to those entities that update and manage the directory entry information and assigning a Role Id to the DIT Sub Segment for those users/servers who do not have Object Segment AC cells for this DIT namespace.

By storing access control Role Ids in DIT Sub segments, access control permissions or denial can be determined at the name space level (within a DIT namespace according to the DIT usage or the DIT and Attribute Segment adaptation mode combination). For example, where DIT and Attribute Segments are adapted for Object Class splitting, the DIT Access Control Role Id also grants or denies access to specific object classes and their attributes.

Access control processing can be further refined by assigning Role Ids to attribute types or groups of attribute types (attribute type groups) that require additional protection. Role Ids stored in Attribute Sub-segment headers can be used to allow or deny access for particular users or groups of users at the attribute type level (within a DIT namespace according to the DIT and Attribute Segment adaptation mode combination). For example, if Basic modes of Attribute and DIT adaptation are used, then a Role Id in an Attribute sub segment can indicate that a Private Telephone Number attribute type is for Read only access for the particular staff (of an organisation) that have access to this DIT namespace, but can only be updated by an administrator.

One or more of these Object Segment user AC cells can be used for a complete DIT or a portion of the DIT (as defined by DIT sub-segments). Role Ids can be defined as hierarchical or lateral in their operation across one or more DITs. For example, if there are types of users that have the same rights over a single DIT namespace (hierarchical)—e.g., they can read the organisation's "white pages" and modify their own telephone number they would all have the same Role Id. This role is a hierarchical role.

On the other hand, if users have diverse rights over multiple DITs (lateral operations) in that, for example, a user can modify their own private entry, update the corporate yellow pages for their group (in another name space), read the white pages services, and find all the assets (from the assets DIT) in their location, that would also constitute a "role"—a lateral role. A single access control Role Id can be applied to a DIT Sub-segment with that Role Id stored in the DIT Sub-segment header to improve performance. The directory system 100 assigns Role Ids based on how the DIT and its Users have been set up in its initial state and how it has been adapted, as shown in Table 2 below. For instance, if a single (larger) DIT segment is divided, through adaption, into two or more smaller DIT segments, then distinct Role Ids can be assigned to the DIT Sub-Segments within those Segments. Moreover, further optimisation can be achieved if, for example, a single Object Segment includes AC cells that relate to these DIT Segments, by dividing the Object Segment into two or more object segments if the access controls for each of the DIT segments are unique.

For practical reasons, there are very few cases where more than 30 "roles" for users are defined in a directory service. The numeric Role Ids used to indicate administrative superiority, namespace capability, object class capability and attribute type capability can be processed much faster than traditional "open ended" and nested definitions of permissions and denials for every conceivable case. In addition, the use of numeric Role Ids allows access control and security processing optimisations to be performed by trusted operating systems or dedicated hardware components, as described below, in order to meet high grade and trusted (military) directory service applications. AC cells allow one or more Role Ids to be assigned to a User or one Role Id to be applied to many users (user groups).

Examples of the use of roles within the directory system include assigning specific Role Ids to:

(i) an administrator—who has complete add, remove, read modify and modify name capabilities over all or a particular set of namespace(s);

(ii) a group of users who have rights such as add, remove, read and modify capability on a particular namespace;

(iii) an application that has rights to add particular objects in one name space, read on another namespace, and modification capability on their own management entries;

(iv) an individual user who has rights to read a particular namespace and a modification capability (on some attributes) in their own entry; and (v) a public user (an anonymous user who does not authenticate with the directory) who has read access on certain attributes in a specific namespace (e.g., a white pages service).

Each Role-Id is a sequence of numeric permission category values, where each permission category value represents permissions in that permission category. Each bit of a permission category value represents a particular permission within the corresponding permission category. Thus a permission category value is determined by which permissions (i.e., bit fields) are set or cleared. It is therefore convenient to represent a Role-Id in 'dot notation', as a sequence of decimal permission category values separated by dots.

Five Role Id permission categories are defined, in the following order (from highest to lowest permission category): Admin Group (a), DIT identifier (d), Directory Operations (o), Attribute Group (g), and Attribute Type (t), although additional permission categories can be defined if desired. Thus an arbitrary Role Id can be represented in dot notation as a.d.o.g.t, where each permission category value a, d, o, g, and t is a decimal number. Within each permission category (i.e., numeric value of a, d, o, g, or t), a particular permission is specified as one of many possible bit values (i.e., powers of 2, or 1, 2, 4, . . . ).

The directory system 100 executes an access control process, as described below, to grant or deny access to a user in relation to a specific read or update operation on a specific entry within the directory. The granting or denial of access is based on a hierarchy of tests applied to the user's access request, starting by testing whether the user has the necessary high-level VM permissions to the directory (defined in the corresponding object segment's Knowledge Information cells and the corresponding DIT Segment Header) to perform the requested operation, and ending with testing whether the user can perform the requested operation on the corresponding attribute types. As part of these tests, an ACI validation process of the access control process is executed to grant or deny access based on comparison of a Role Id representing the user's requested operation, and a Role Id associated with the corresponding directory resource.

When a directory user requests that a directory operation be performed, the OVM corresponding to the desired operation (e.g., the Search OVM of the OVMs 208) is invoked and provided with the operation parameters that indicate what part or parts of the DIT namespace the operation wants to access and the attributes it wants to use. The OVM uses these parameters to generate a Role Id (the a, d, o, g and t parameters) representing the requested directory operation, as described below. This dynamically generated Role Id is referred to as the User's operation Role Id, and can be represented as Ua.Ud.Uo.Ug.Ut. The operation Role Id is generated as follows.

The Access Control cells for the requested DIT namespace are first inspected to determine whether this User does have access rights assigned to the namespace. If no AC cells for that User are found, the DIT access control Role Id is inspected to determine whether Public access permission is defined. Otherwise, access is denied and the operation is terminated. If this user (from the User Id) is found to have administrative rights defined in an Access Control cell, the User's Role Id sets the Administrator bit; i.e., Ua=1.

If administrative rights are not set in any Access Control cell, the DIT identifier component of each Role Id (from one or more DIT Segments and Sub Segments) for the DIT name space requested by the User's operation are used to generate the DIT identifier component of the User's operation Role Id. For instance, if a directory with the namespace dod has army (assigned a DIT identifier value of 0x1 in the DIT Sub Segment), navy (assigned a DIT identifier value of 0x2) and air force (assigned a DIT identifier value of 0x4) as subordinate name space and normal directory entries below them and the user has set a Search operation to start at the dod name space, then the corresponding DIT Identifiers are used to set the bit fields of the DIT part of User's Role Id (Ud). That is, Ud=army DIT identifier+navy DIT identifier+air force DIT identifier=0x1+0x2+0x4=0x7.

Finally, the Directory Operations (Uo), Attribute Group (Ug), and Attribute Type (Ut) permission category values are set to the predefined values representing the requested directory operation, and the attribute groups (if any) and attribute types requested for that operation.

Figure 10:
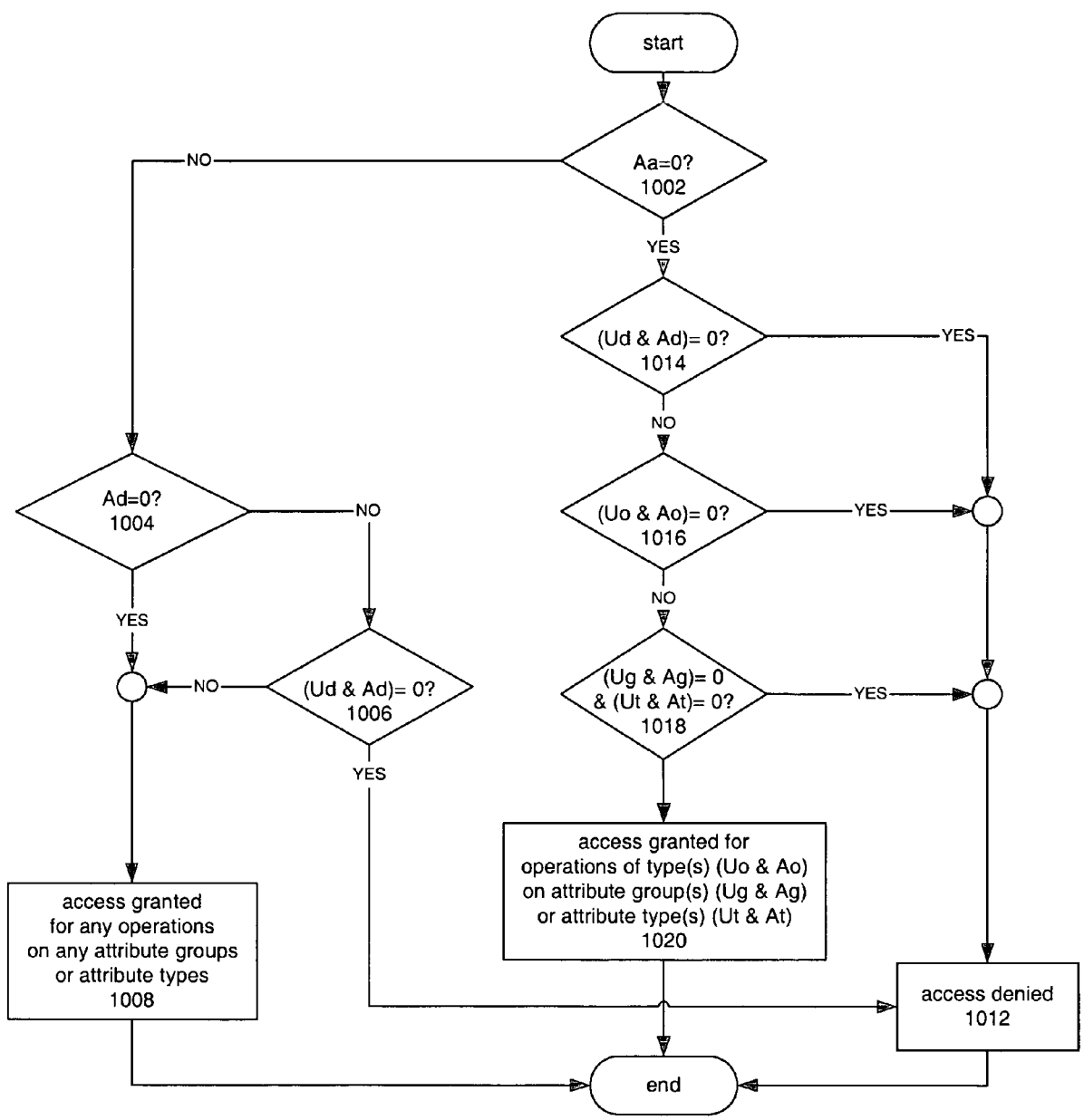
FIG. 10 is a flow diagram of an ACI validation process of the access control process.

The next step is to test the preconfigured permissions as defined by the Role Id(s) of that User as held in the Object Segment AC cells using the ACI validation process, as shown in FIG. 10. In the description below, the directory held Role Id(s) for that user as stored in the Access Control cells can be represented as Aa.Ad.Ao.Ag.At.

The ACI validation process begins by checking whether the administrator bit of the user's pre configured Role Id is set by determining whether Aa=0 at step 1002. If not, then a test is performed at step 1004 to determine whether Ad=0; i.e., whether the user's pre configured Role Id is equal to 1.0.x.x.x, where x represents any value. This Role Id value has special meaning in the directory service in that the user has overriding authority over the total DIT, allowing any operation on any attribute group or individual attribute type. Consequently, access is granted at step 1008.

Otherwise, if the test at step 1004 is answered in the negative, that is, the user's Role Id is equal to 1.Ad.x.x.x, with Ad≠0, then the user has overriding authority over the DITs specified by the bit value(s) of Ad with any operation on any attribute group or types. Accordingly, if the result of a bitwise AND operation (represented by the ampersand character "&") on Ud and Ad is not zero, i.e., (Ud & Ad)≠0, then at step 1008 all operations are permitted on the DIT namespaces in question. Otherwise, access is denied (step 1012) and the process ends.

The above two conditions, where the user's Role Ids equal to 1.0.x.x.x or 1.Ad.x.x.x with Ud≠0, are special cases where any and all access is allowed to the entire or corresponding DIT namespace, respectively.

In any other case (for non administrative users), a hierarchy of tests are performed on the directory operation, attribute group, and attribute type permission categories. In essence, these tests allow or deny access to the DITs specified to perform the directory operations specified on the attribute groups and/or the attribute types specified.

Returning to step 1002, if the user's administrator bit in the Access Control cells was not set, then at step 1014 a test is performed to determine whether Ud & Ad=0. If so, then the user cannot access this DIT namespace, and access is denied at step 1012, thus ending the ACI validation process. Otherwise, the user has access to the DIT namespace, and the next step in the hierarchy is performed at step 1016.

Directory operations (Search, Read, Modify, Rename, etc) are assigned respective bit fields within the directory operation permission category o of a Role Id. At step 1016, a bitwise AND operation is performed on directory operation category permission value Ao from the Role Id in the Access Control cell (or DIT or Attribute Sub Segment if there is a Role Id present in these) and the bit value Uo of the operation being attempted by the user. A zero result indicates that permission is denied; a non-zero result enables the operation to be performed if the subsequent attribute tests pass.

Attribute Groups (such as organisational attribute sets or postal attribute sets) are assigned Role Id bit values (corresponding to the g value in a Role Id). Attribute Types (such as home address or private phone) are assigned Role Id bit values (corresponding to the t value of a Role Id). When a user has permission to enter the DIT namespace (step 1014) and perform the operation (Search, Read, Modify, Rename, etc) (step 1016), a test is performed to determine whether the two attribute Role Id fields (Ug and Ut) of the user's Role Id identify at least one attribute type that is also identified by the Role Ids in the Access Control cells (or the DIT or the Attribute Segments if they are present). That is, whether the at least one attribute is either a member of the one or more attribute group(s) identified by Ag or is one of the one or more attributes identified by At.

Specifically, these Role Id bit values are tested at step 1018 by performing bitwise AND operations. If (Ug & Ag)=0 AND (Ut & At)=0, then access is denied. Attributes from the attribute group or the individual attribute types can be accessed and processed (step 1020).

Any user (whether authenticated with the directory or not) that accesses the directory has no permissions at all, not even read access, unless a Role Id is assigned to that user or the user's type (e.g., a public user). For example, Public users (including users who have not been authenticated with the directory system 100) can be given access to a particular namespace by storing a Role Id in the corresponding DIT Sub Segment header.

Allocation—DITs

When the directory system is initialized and configured at start up, each namespace is assigned a DIT identifier value (d). For example, 5 DITs in a DIT Segment can be assigned DIT identifiers as follows:

| | |
|---|---|
| c = us, o = gov, ou = dod, ou = army | DIT Identifier = 0.1.0.0.0 |
| c = us, o = gov, ou = dod, ou = navy | DIT Identifier = 0.2.0.0.0 |
| c = us, o = gov, ou = dod, ou = airforce | DIT Identifier = 0.4.0.0.0 |
| c = us, o = gov, ou = dod, ou = white pages | DIT Identifier = 0.8.0.0.0 |
| c = us, o = gov, ou = dod, ou = secret | DIT Identifier = 0.16.0.0.0 |

Directory Operations Capability

When the directory system is initialized and configured at start up, Directory Operations permission category values (o) are assigned to directory operations as follows: Add=32, Remove=16, Modify=8, Modify Name=4, Self=2, Read=1.

Directory Attribute Type Group Capability

When the directory system is initialized and configured at start up, Attribute Group permission category values (g) are assigned to attribute groups. Attribute Group as: public set, white pages, specific group set, user self management, user management, application, PKI, etc.

For example: Application 1=128, Application 2=64, PKI=32, White Pages=16, Group Set=8, Public Set=4, Public White Pages=2, User Self Mgt=1.

In most cases, attributes can be grouped in a directory in a logical way that relates to their management and access. This is more efficient than storing single permissions for every attribute type for every user use case.

Directory Attribute Type Capability

When the directory system is initialized and configured at start up, Attribute Type (t) permission category values are assigned to specific attribute types. e.g., Private Address=4, Private Phone=2.

Examples of Role Ids at the DIT, Operations and Attribute Levels:
  (i) If an administrator role has a role ID of 1.0.0.0.0, this is greater than 0.x.x.x.x (where "x" represents any value), and therefore the administrator has overriding power, and access is given to all DITs for all operations.
  (ii) A Navy "Group" with a Role Id of 0.2.9.17.0 gets access to Navy (navy=0.2.0.0.0) for internal white pages attributes (17=16+1=WhitePages+UserSelfMgt) for reading and Self modification attributes (9=8+1=Modify+Read).
  (iii) A User (e.g., the Chief of Defense) assigned a role ID of 0.15.3.12.0 can access (3=2+1=Self+Read) army, navy, airforce and public white pages DITs (15=8+4+2+1) and can also manage his own entry, but not see the secret DIT.
  (iv) A User (e.g., an HR Manager) assigned a role ID of 0.15.96.12.3 can access army, navy, airforce, PKI attributes and white pages as well as manage all entries including private attributes, but cannot see the secret DIT.
  (v) A public person with a Role Id of 0.8.1.2.0 cannot see army, navy or airforce DITs, and can only read "white pages" attributes from the white pages DIT.

The DCM 204 assigns DIT (Access Control) Identifiers to DITs (storing them in DIT Segment Headers and DIT Sub Segment Headers), and assigns Role Ids to users, based on administrator configuration information. For example, the command SET DIT Role Id: {c=us, o=govt, ou=dod} 2 can be entered by an administrator to set the DIT Identifier for the namespace {c=us, o=govt, ou=dod} (i.e., stored in the corresponding DIT segment and sub-segment headers) to be equal to 2. This DIT identifier can subsequently be used as the DIT identifier component (i.e., the DIT identifier permission category) of a Role Id; i.e., Role Id=x.2.x.x.x.

Similarly, the command

SET Attribute Type Group Role Id: telephone, postal, locality, email 8 sets the Attribute Group permission category value (g) in the Role Ids assigned to the attribute types telephone, postal, locality, and email (i.e., the Role Ids stored in the corresponding headers of the corresponding attribute type sub-segments) to be equal to 8; i.e., Role Id=x.x.x.8.x.

A subsequent command can then be used to configure a user or groups of users with a Role Id on a particular DIT namespace. For example, the command SET USER AC: {c=us, o=govt, ou=dod}\{c=us, o=govt, ou=dod, ou=army, ou=task force1} Role Id=0.2.9.8.0 creates an Access Control cell in an object sub-segment associated with the namespace {c=us, o=govt, ou=dod} and stores a Role Id of 0.2.9.8.0 in the new AC cell for users in the organisational unit "task force1", as specified. The DIT Identifier permission category value (d) for these users is thus set to 2 and a user group Id is created for users in the name space of {c=us, o=govt, ou=dod, ou=army, ou=task force} with the ability to perform particular operations (corresponding to the directory operations permissions (o) value of "9") in this namespace on the attributes in attribute group 8, as defined by the "SET Attribute Type" command above.

TABLE 2

| DIT Structure/Use Profile | Role Ids relate to: (examples) |
| --- | --- |
| Basic - <br> Few Object Classes <br> Few Roles | An Attribute Segment can segregate sets of attribute types with its Sub-segments (0.0.0.x.0). Within a Sub-segment, a Role Id is stored for hierarchical use e.g. a Public Role Id, a Group Role Id and a Private Role Id. Each Role Id can access some or all Attribute Sub-segments (attribute types). Vertical Role Ids are applied by DIT permissions (0.x.0.0.0). |
| Mid - <br> Many Object Classes with different attribute types <br> Few Roles | Multiple Attribute Segments that segregate Object Classes and their sets of attribute types - as completely different objects or even as per a basic object class and a refined object class with their Sub-segments, e.g. a Public Role Id, a Group Role Id and a Private Role Id and each Role Id can access 1, 2 or 3 Attribute Segments and their Sub-segments respectively. |
| Major - <br> Many Object Classes with differing attribute types <br> Many Normal Roles <br> Worst Case <br> Many Object Classes with differing attribute type selections <br> Many Complex Roles | Attribute Segments are assigned as above, but Role Ids are assigned on a lateral or vertical basis. Lateral basis indicates distinctive name space grouping where vertical Role Ids indicate more or fewer permissions in the same namespace. This level of sophistication means that some profiles use the a matrix of attribute types/object classes - permissions and denials and Role Ids would be assigned as a class that references a permissions/denials attribute type table. |

This enables a graduated form of access control, which may be: (i) None, (ii) at the DIT level, or (iii) at the entry and attribute level, depending on the shape of the DIT and its Users. For example, hierarchical (i.e., vertical or "DIT area specified") roles can be used to provide superior directory rights to administrators relative to public Users. This can be achieved by assigning a Role Id to administrators that is numerically greater than the Role Id assigned to a directory tree (as used by public Users).

Lateral roles can be defined to provide two individual Users or two groups of Users with unique rights over two separate parts of a directory. If a user's Role Id is equal to a Role Id assigned to a directory resource, access to the resource is granted.

Both hierarchical and lateral Role Ids are generated dynamically by the system DCM 204 from access control configuration information provided by a system administrator and stored in Object Segment AC cells. The majority of Users are typically configured for fast Role Id processing. Users can be assigned multiple Role Ids by including multiple AC cells in the Object Segment.

As described above, an AC cell contains a Role Id value that is generated by processing a role-based directory configuration specifying a user's access to the corresponding part (or parts) of the DIT. Each part of the DIT can have zero, one, or many Role Ids assigned to it. The default/access policy at this level (the most granular level in the directory service) is one of denial, with access allowed only by defining one or more Role Ids associated with the resource(s) in question.

Access Control information is pre-processed and applied using Role Ids to enable "quick decisions" at the time of a directory operation. This pre-processing approach provides a pseudo-indexing mechanism (of access control information and its decision processing).

Several stages of access control evaluation are performed, based on the granularity of the decisions being made. For example:
 (i) Can I enter the system and perform this operation? Grant or deny access to the system
 (ii) Can I go to a resource, the entry or entries? If so, then navigate to the resource required.
 (iii) Can I perform the operation on the resource? Grant or deny the read or update operation on that entry or attribute.

Figure 4:
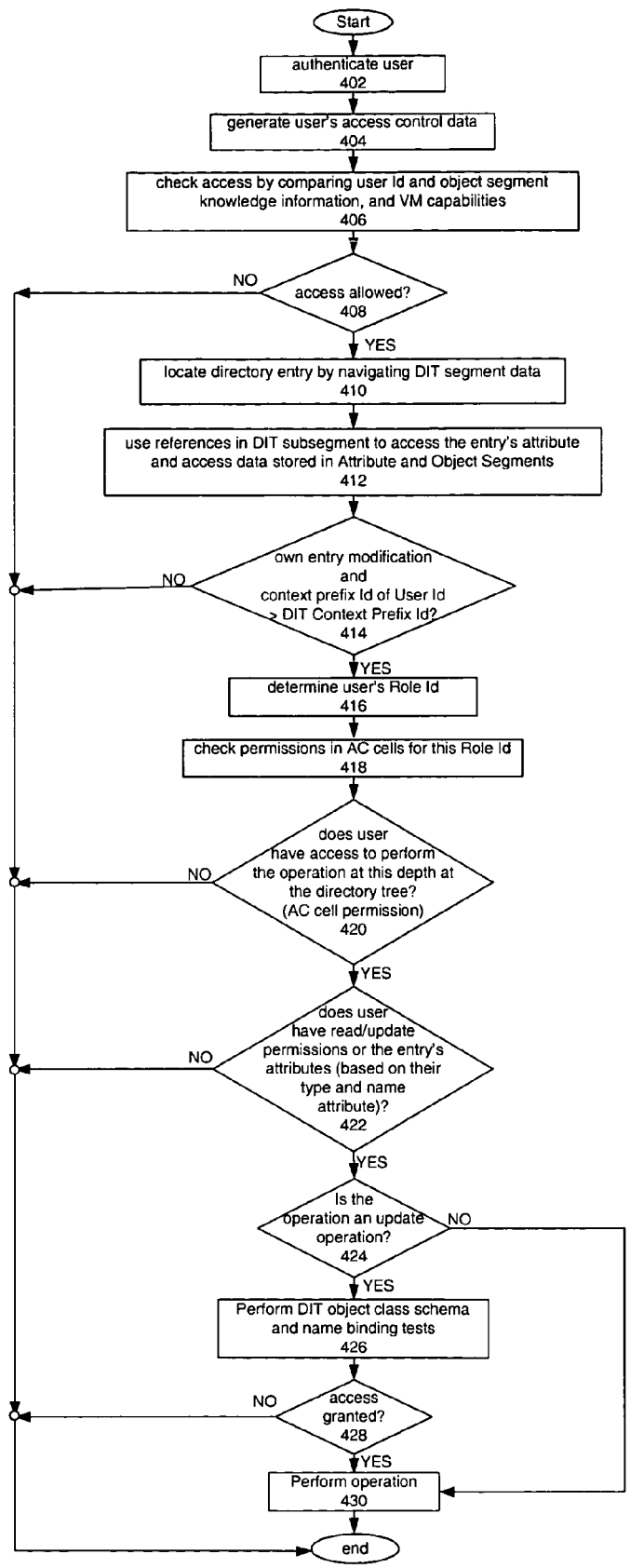
FIG. 4 is a flow diagram of an access control process executed by the directory system.

The directory system 100 executes an access control process, as shown in FIG. 4, to grant or deny access to a user in relation to a specific read or update operation on a specific entry within the directory.

Once a User is authenticated at step 402 (or there are any changes to the access control rules), their access control data is generated by the DCM 204, if these are not already present.

At step 406, macro level tests are performed to determine whether the user can enter the system to perform the specified operation.

Specifically, the User Id is checked for the X.500/LDAP operation type (i.e., read or update) on the namespace (Context Prefixes) requested using the Object Segment—Knowledge Information cell and the VM capabilities defined within that. If the Context prefixes do not match and/or the VM capabilities of that Context Prefix do not support the operation, the operation is denied at step 408. Additionally, the DIT Segment mode stored in the corresponding DIT Segment Header defines whether the DIT is a Master or a Replica or is set to Read Only. If the User is attempting to do an update operation (Add, Modify) and the VM and DIT capabilities are set for Read operations only, the operation is denied at step 408.

In addition, if the operation is an update, DIT Object Class Schema and Name Binding tests can be performed on the operation using the Object Class schema definitions and Name Binding cells from the Object Segment.

If the user is granted access to enter the system 100 to perform the operation, then the process next determines whether the user can access the specific resource/entry. At step 410, the appropriate OVM evaluates the DIT Segments 224 and sub-segments until it arrives as the Context Prefix DN of the entry (or base object) in question. At step 412, the OVM uses the references in the DIT sub-segment to access the entry's attribute and access data stored in the referenced Attribute Segment 220 and Object Segment 222.

A user of the directory has an entry in the directory under their name (DN). This entry holds the user's details, including their password as well as other attributes the user can change with "Self Modification" rights. The name of this entry has a Context Prefix and an RDN (the actual DN of the user). For example, Context Prefix ID could represent {c=us, o=gov, ou=dod, ou=admin}, and the RDN could be cn=alan. If the name of the entry is equal to the name of the user (in this case, "alan"), then the user "alan" has rights to descend to that actual named entry to modify it.

At step 414, if Own Entry modification is being attempted, (update on an object name by a user with the same name), the Object Sub Segments and the AC Cells within the Object sub-segments are inspected to see if this User Id has a Context Prefix Id equal to or greater than that of the DIT Context Prefix Id (The User can descend the DIT past this point if they have a greater Context Prefix and Context Prefix Id capability.) If the user has passed the tests described above, the process next determines whether the user can perform the operation on that resource. At steps 418 and 420, the AC Cell is checked to see if this User is able to perform this operation at this depth of the directory tree, by checking the Role Ids associated with the user and the directory resource for permissions using the ACI validation process described above. If the Role Ids do not deny access, then the next test is to determine if the User has read or update permissions on the entry's attributes based on their type, including its name attributes. These tests use the Role Id(s) generated by the DCM 204, as described above. Users are assigned access control Role Ids according to their permissions defined in the high-level configuration parameters. For example, Role Ids can be classified as Public User, Own Entry management, Group or Administrator.

If the operation is an update operation (step 424), the DIT Object Class Schema and Name Binding tests are performed on the operation at step 426 using cells from the respective Object sub-segments. If access is granted at step 430, the operation is performed at step 430.

The access control process described above with reference to FIG. 4 relates to a directory operation on an entity. During a search process, it will be apparent that access control checks are performed on each DIT during navigation of the directory.

Transaction Segments

Each transaction segment comprises a Segment header, one or more sub-segment headers and one or more sub-segment cells. Transaction Segments contain the information necessary to keep the database 100 intact through VM processing and directory operation updates. Transaction sub-segments are sub-typed as to their purpose and contain information cells that relate to the transaction progress.

Transaction sub-segments are created from operations being performed on the directory by its Users through specific OVMs 208 and by the ARVM 218.

The Transaction Segment Header contains management information about a complete DIT segment. The Transaction Segment Header contents are:
 (i) The segment type identifier.
 (ii) The maximum size of the segment.
 (iii) The number of sub-segments in this segment.
 (iv) The Context Prefix of the DIT this Transaction Segment relates to (that is external to this DIT).
 (v) The Context Prefix Identifier, held as an object identifier.

(vi) The mode of this Transaction Segment (Internal or External transaction management).
(vii) Exception Event Processor (for errors).
(viii) The existence or residence (file state) of the sub segment (being rolled in from backup storage or rolled out to backup storage by the VSM 202).
(ix) A file name for archive when the complete segment is archived.
(x) A file name for restore when the complete segment is being restored.

The Transaction Segment Sub Header contains the management information about the way in which a particular transaction is being protected. The Transaction sub-segment Header contents are:
(i) The sub-segment type identifier.
(ii) The sub-segment group—sequence Id:
  (a) for the DVM 214 it is set as the Multicast Id (Distributed Operations)
  (b) for the RVM 216 it is set to the Replication Transfer Id
(iii) Remote database Id RX if the transaction is initiated from a remote database (Such as a distributed basic or relational Search).
(iv) The Context Prefix of the DIT this transaction relates to.
(v) The Context Prefix Identifier as an object identifier.
(vi) Remote database Id TX if the transaction is sent to a remote database. (Such as a distributed or relational Search).
(vii) The Directory service operation as provided by the User (if OVM 208) or a VDM 206 identifier if this is an Adaptation process that is being performed.
(viii) The archived database DIT Segment information if this to be updated during the transaction.
(ix) The archived database (Attribute Segment Cells) entries as they existed before the update.

There are one or more Transaction sub-segment Cells within a Transaction sub-segment. They are used to record the progress of a transaction and its status. The Transaction sub-segment Header Cell contents are:

(i) The Transaction Cell Id relative to the Transaction sub-segment Id.
(ii) The transaction progress:
  (a) Not Started
  (b) DIT segments updated
  (c) Attribute Segments updated
  (d) Remote transaction sent—waiting reply
  (e) Remote transaction received—scheduling
  (f) Awaiting group response of distributed operations
  (g) Transaction discarded
  (h) Transaction in roll back
  (i) Transaction failed, or
  (j) Transaction completed
(iii) The date/time this cell was created.

Transaction sub-segments and cells are created on directory updates by particular OVMs 208 and the Adaptation processes, the VDM (Virtual DIT Manager) 206 and the database object configuration process, the DCM (Database Configuration Manager) 204. As defined above TVMs 210 have a number of process phases on which they operate:
(i) There is the preparation phase, when the directory operation and its parameters are written to a Transaction sub-segment and its cells.
(ii) There is the examination phase, where the Transaction sub-segment and its cells are examined after a failure condition to see what recovery process approaches should be taken.
(iii) There is the re execution phase, where the transaction is re-executed from a full or partial perspective.
(iv) There is the completion phase, when the transaction (or its recovery) is deemed complete.

Every instance of a new sub-segment created in the preparation phase carries with it a cell that indicates the date/time and the progress set to "Not Started". It remains in this state until the update is completed successfully, at which this time the Transaction sub-segment and its cell(s) are destroyed. In the other TVM states (recovery), the sub-segment is updated with new progress state cells. The use of Transaction sub-segments is described further in Table 3 below:

TABLE 3

| Responsible VM | Condition | sub-segment Contents |
| --- | --- | --- |
| OVM - Add Entry (a) | Add a leaf entry with other siblings - | OVM Parameters |
| OVM - Add Entry (b) | Add a leaf entry on an existing leaf entry (no siblings) - | OVM Parameters New DIT sub-segment |
| OVM - ModifyRDN | Modify the distinguished attributes of a leaf entry. | OVM Parameters Old Distinguished (naming) Attribute(s), Old RDN Id |
| OVM - Modify Entry | Modify the non-distinguished attributes of an entry. | OVM Parameters Old Non -distinguished Attributes |
| OVM - Remove Entry (a) | Remove a leaf entry where siblings exist | OVM Parameters |
| OVM - Remove Entry (b) | Remove a leaf entry where no siblings exist | OVM Parameters Old DIT sub-segment and cells |
| DVM - Distributed Operations (DSP or local mode) TX | Sending distributed operations or Segment information to remote systems. | DVM X.500 DSP request information or Segment, sub-segment and/or cell information. One cell for each request (multicast requests) |
| DVM - Distributed Operations (DSP or segment mode) RX | Receiving distributed operations or Segment information from remote systems. | DVM X.500 DSP request information or Segment, sub-segment and/or cell information |

TABLE 3-continued

| Responsible VM | Condition | sub-segment Contents |
|---|---|---|
| RVM - Replicated Operations (DSP or segment mode) TX | Sending replicated information or Segment information to remote systems. | RVM X.500 DISP request information or Segment, sub-segment and/or cell information |
| ARVM - Adaptive Replicated Operations (segment mode) RX | Receiving replicated Segment information from remote systems as the result of adaptive processing. | Segment, sub-segment and/or cell information |
| ARVM - Replicated Operations (segment mode) TX | Sending Segment information to remote systems as the result of adaptive processing. | Segment, sub-segment and/or cell information |
| RVM - Replicated Operations (DSP or AMRD mode) RX | Receiving replicated information or Segment information from remote systems. | RVM X.500 DISP request information or Segment, sub-segment and/or cell information |
| VDM - re profiling the segments | Re profile the Attribute, DIT and Object Segments | Old sub-segment information Proposed sub-segment information |
| VCM - configure the Object segments | Update schema, User and Access Control information | Old and proposed Object Sub segments and cells Old and proposed DIT sub-segment cells if required |
| CVM-MO - Multi Object Update | Add or Remove Multi Objects | Add - CVM-MO parameters/objects. Remove - Existing objects as per Object Sub segment template. |

Adaptation

Figure 6:
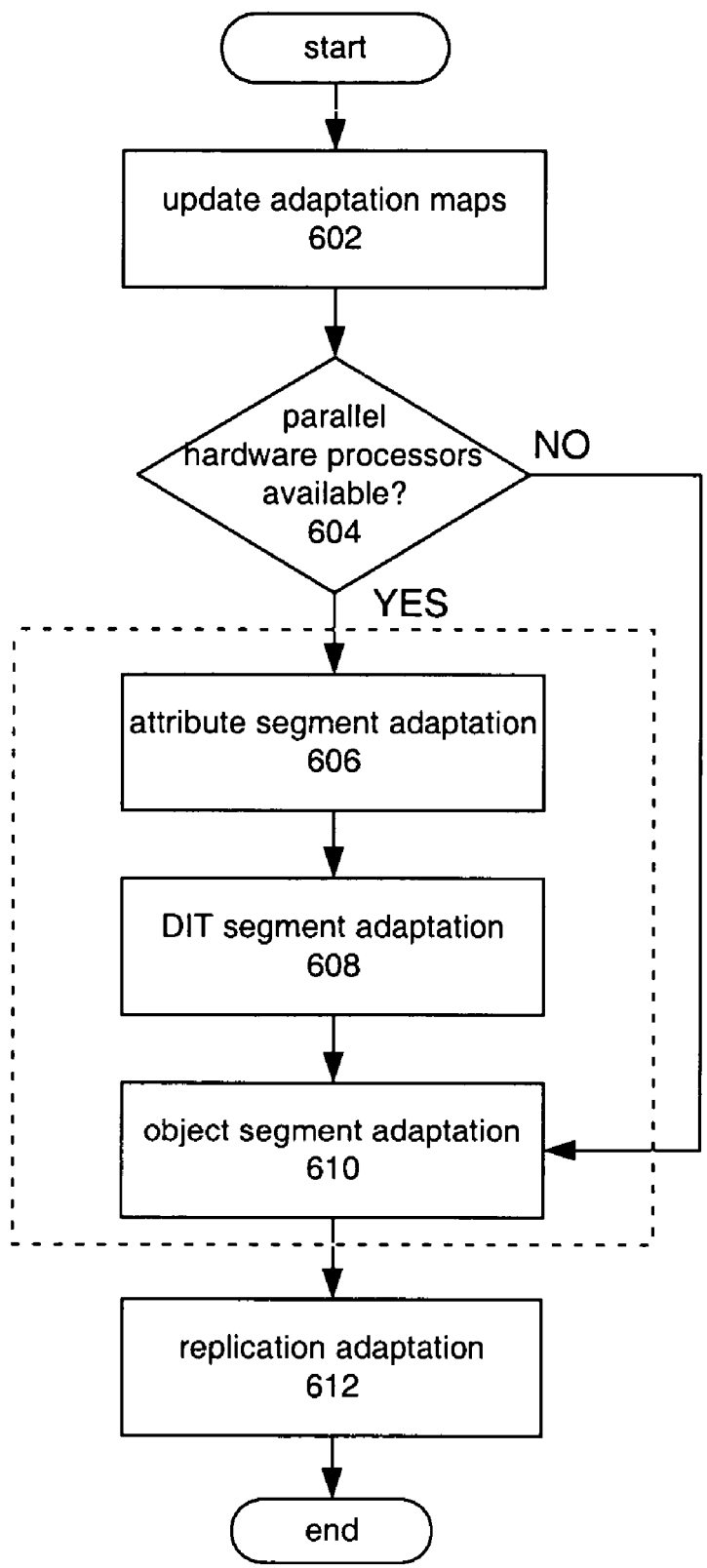
FIG. 6 is a flow diagram of a directory adaptation process executed by the directory system.

As described above, the directory system 100 executes a directory adaptation process, as shown in FIG. 6, to optimize the organization of the logical directory information for Search and retrieval processes (e.g., Searching on specific name spaces, object classes or attribute types) and to split up long linear data tables into two or more shorter segments to reduce search times by allowing parallel processing.

By re-organising directory information, Search processes can make big decisions early (e.g., which Attribute Segments to look through) as well as take advantage of multi-processor hardware by executing "syntax" aware multi-threaded information evaluation and retrieval processes on distinct Attribute Segments or Sub Segments. In the Search evaluation process, different search processes are assigned to distinct attribute Sub Segments based on the attribute type and syntax. If an Attribute Segment has been adapted to store distinct attribute types/syntaxes (such as PKI based attributes), then specific search processes can be assigned at that level.

Adaptation, Attribute Syntax and Search Optimisation

Directory attributes have syntaxes such as Case Ignore String and Certificate, etc.

A process to evaluate a string for equality or a predetermined value is different from a certificate matching process that may be looking for an embedded attribute type such as the certificate serial number (which just happens to be an integer) or the Issuer DN. It follows that specific Search processes can be assigned at the Attribute Sub Segment level and Attribute Segment level. For example:

(i) A Case Ignore String Match process can be assigned to an Attribute Sub Segment that stores email addresses;

(ii) A Case Exact Match can be assigned to an Attribute Sub Segment that stores a Clear text Password;

(iii) A Certificate Component Match process can be assigned to an Adapted Attribute Segment that stores X.509 certificates as well as its component attributes held in distinct Sub Segments according to the component attribute's type; and (iv) A PKI management process can be assigned to an Adapted Attribute Segment that stores CA, Certificate, Attribute Certificate and Certificate Revocation List attributes.

As shown in FIG. 6, the directory adaptation process includes two distinct adaptation (sub-)processes: (i) a segment adaptation process (steps 602 to 61) executed by the VDM 206 that restructures the storage of data in the Attribute, DIT and Object Segments of a directory; and (ii) a replication adaptation process 612 that is executed if the directory system 100, as a local machine to its users, has the authority and capability of retrieving directory information from other (typically remote) directory systems 102 to 106 (i.e., other name spaces). This replication adaptation process 612 is executed by the ARVM 218 in order to ensure that such information is stored locally to improve system performance (this is also referred to as adaptive replication).

As shown in FIGS. 6 to 9, the segment adaptation process (steps 602 to 61) can be divided into three constituent (sub-) processes: an attribute segment adaptation process 606, a DIT segment adaptation process 608, and an object segment adaptation process 610 for reorganising the attribute, DIT and object segments of a directory, respectively.

The attribute segment adaptation process 606 and the DIT segment adaptation process 608 are used to divide or split a large amount of data stored in a single segment or sub-segment into two or more smaller segments or sub-segments in order to facilitate parallel processing. Consequently, these two adaptation processes are executed only if parallel processing hardware is available (e.g., multiple processors, such as multiple CPUs and/or one or more CPUs and one or more dedicated segment processors).

In contrast, the object segment adaptation process 610 and the replication adaptation process 612 are used to co-locate and cache selected data to improve performance, but not specifically for the purposes of parallel processing. Consequently, these two adaptation processes are executed regardless of whether parallel processing hardware is available or not.

All of the adaptation processes are controlled through the local Adaptation Segments 228.

When the Attribute 220, DIT 224 and Object 222 Segments are adapted, all writes/updates to the directory are buffered.

Adaptation Segments

Adaptation Segments 228 comprise a Segment header, a sub-segment header and cells.

Adaptation Segments 228 contain the information necessary to keep the database 126 and its information (Attribute, DIT and Object Segments 220 to 224) organized for optimum use, performance and scale. The information that is written to the Adaptation Sub Segment cells is stored in five types of "usage maps". There are distinct Adaptation Sub-segments for each map type. These usage maps are used to profile and re-profile the DIT, Object and Attribute Segments 220 to 224 and sub-segments. Each cell represents a snapshot of directory usage at a point in time, and the Adaptation Sub Segment contains historical maps that indicate how the directory has been used and adapted.

Adaptation sub-segments are created by the VDM 206 and are updated by the operations being performed on the directory by specific OVMs 208.

Adaptive Replication information is held within an Adaptation sub-segment as a series of distinct Map cells. This replication Map information is generated by the ARVM 218 and processed with other map information to determine the outcomes required of the adaptive replication process. Adaptive Replication can be performed when the local database 126 is entitled to copy information from remote databases 128 to 132 if there is a local demand for such information.

Segment Adaptation Modes

The adaptation modes for the Segments are:

Attribute Segments 220:
(i) Basic;
(ii) Attribute Type Splitting;
(iii) Object Class Splitting;
(iv) Complex/Distinct Attribute Splitting;
(v) DIT Splitting, and
(vi) Access Control Role Id Splitting (by Attribute Type).

DIT Segments 224:
(i) Basic;
(ii) DIT Organisation Splitting;
(iii) DIT Access Control Rule Splitting; and
(iv) DIT Flat Space Splitting.

Object Segments 222:
(i) Basic;
(ii) Name Binding Splitting;
(iii) Access Control Role Id Splitting (by name space); and
(iv) Multi Object Profile Splitting.

Segment Adaptation Processing

The segment adaptation process is executed by the VDM 206 when the directory system 100 starts up and initialises its Attribute, DIT and Object Segments from backing store and using its configuration files. At this time the VDM 206 adapts the Segments based on the configuration, the state of the existing segments and directory entry information available on start up. The segment adaptation process is also executed after startup, when a specific threshold is reached, or at a periodic interval specified in the configuration files.

Attribute Segment and Sub Segment Adaptation

As shown in FIG. 7, the Attribute segment adaptation process determines the number of attribute instances in each Attribute Sub Segment at step 702, and if the configured threshold value is exceeded, attribute type splitting is performed at step 706 by creating one or more new attribute sub-segments for the same attribute type and dividing the attribute instances between the original sub-segment and the new sub-segment(s). Alternatively, attribute type splitting can be initiated by when the search times for one or more attribute types exceed a threshold value configured by an administrator.

The next steps are performed if the number of entries held in an Attribute Segment (determined at step 708) has reached a configured threshold at step 710.

If so, then if it is determined at step 712 that directory service operations are targeting specific object classes (by monitoring directory operation statistics), then object class splitting is performed at step 714 by moving the targeted object class instances and their sets of attributes) into one or more new attribute Segments.

Otherwise, if it is determined at step 716 that directory service operations are targeting specific attribute types within object classes (by monitoring directory operation statistics), then Complex/Distinct Attribute Splitting is performed at step 718 by moving the targeted attribute types within the targeted object classes into one or more new attribute Segments.

Otherwise, if it is determined at step 720 that directory service operations are targeting specific DIT portions (by monitoring directory operation statistics), then DIT Splitting is performed at step 722 by moving the corresponding attribute Segments or Sub-segments into a new attribute Segment and creating a new DIT segment reference for the new attribute Segment.

The attribute segment adaptation process [correct?] yes is different to the other adaptation processes in that it takes all the distinguished attributes of the same type (the entry naming attributes) from one attribute sub segment based on their DIT context prefix (their namespace), and moves some or all of these into one or more new sub segments.

Returning to step 720, if it is not the case that specific parts of the namespace are being targeted, then if, at step 724, the VDM 206 determines that the entry ACI (the Role Id) validation process for specific attribute types only needs a limited set from the complete set, then the ACI check can be optimised by storing the Role Ids that relate to a particular attribute type with the attribute sub-segment(s) for that attribute type. This Access Control Role Id Splitting (Attribute Type) is performed at step 726.

Figure 8:
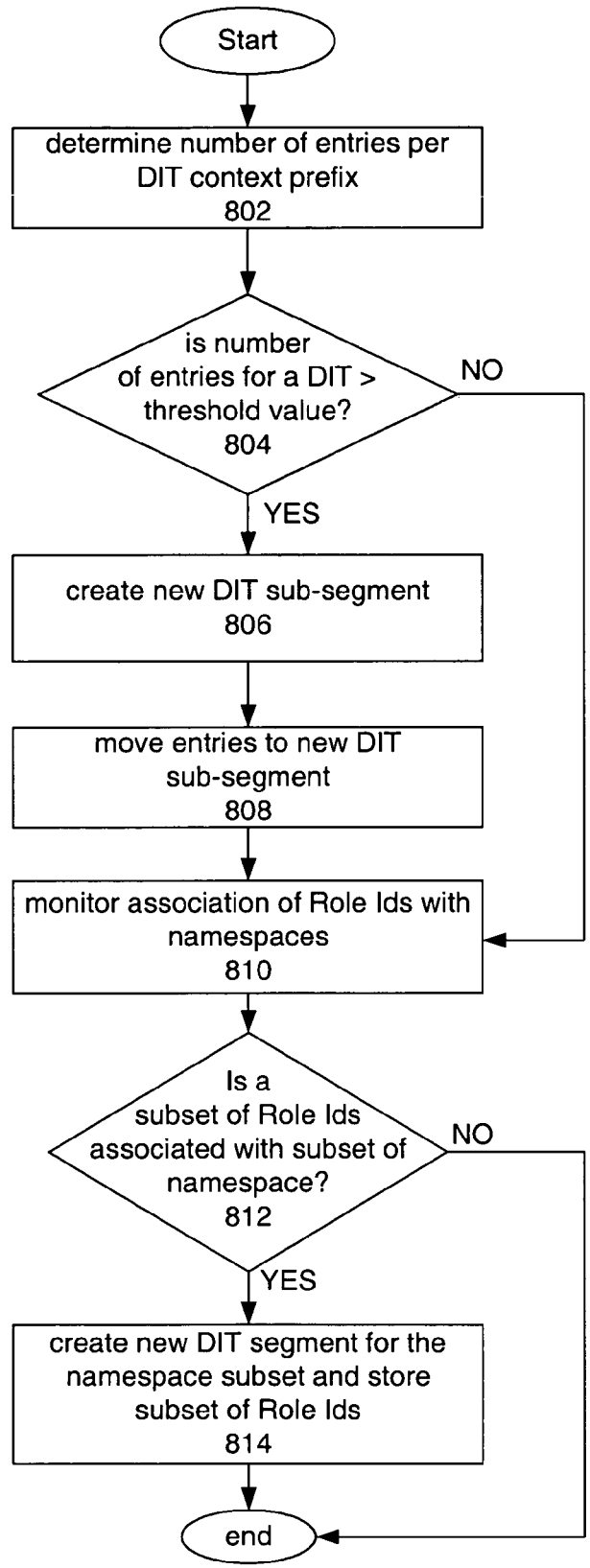
FIG. 8 is a flow diagram of a DIT segment adaptation process of the directory adaptation process.

As shown in FIG. 8, the DIT adaptation process begins at step 802 by determining the number of entries there are in a DIT segment at each level. If it is determined at step 804 that at least one of the pre-configured maximum values for depth and entry count is exceeded, then a new DIT sub-segment is created at step 806, and the entries are divided between the new and old DIT sub-segments at step 808.

For DIT Access Control splitting, at step 810 the VDM 206 monitors the access control Role Ids assigned to users and the access control Role Ids assigned to DIT Sub Segments. In large scale directories, DITs (specific name spaces) are generally designed and protected for particular functions such as user authorisation, vCard management, network service configurations, etc. In terms of navigation and access control processing performance, a smaller number of macro level access control checks can be performed more rapidly than fine-grained access control checks. Consequently, where particular DIT Segments have very specific access control profiles for a limited set of user access control profiles, then performance can be improved by assigning distinct DIT segments to such Role Ids. Access Control Role Ids in DIT Sub Segment cells provide the primary point of protection and permission on that DIT. Accordingly, if it is determined at step 812 that a subset of Role Ids is associated with a subset of the directory namespace, then at step 814 a new DIT segment is created for the namespace subset, and the subset of Role Ids is stored in the new DIT Sub segments within that Segment. This completes the DIT adaptation process.

DIT Organisation Splitting and DIT Access Control Splitting modes of adaptation are not mutually exclusive. Combinations of these adaptation situations can exist within the directory.

For DIT Flat Space splitting, the same steps in 802 to 804 are performed. The VDM 206 evaluates the number of entries under a DIT Sub Segment at step 802. If this number exceeds a pre-configured threshold value at step 804, new DIT Sub Segments are formed at step 806 with the same DIT Context Prefix and DIT Sub Segment header sub-segment group—the sequence Id in the DIT sub-segment header is set to indicate that this DIT Sub Segment belongs to a group for the same name space.

The Object Segment adaptation process creates new Object Segments and Sub Segments. New Object Segments are created in the adaptation process to hold schema, name binding rules and access control Sub Segments specific to one or more DIT segments. If a new Object Segment already exists because of earlier adaption, then only (one or more) Sub Segments are created.

Figure 9:
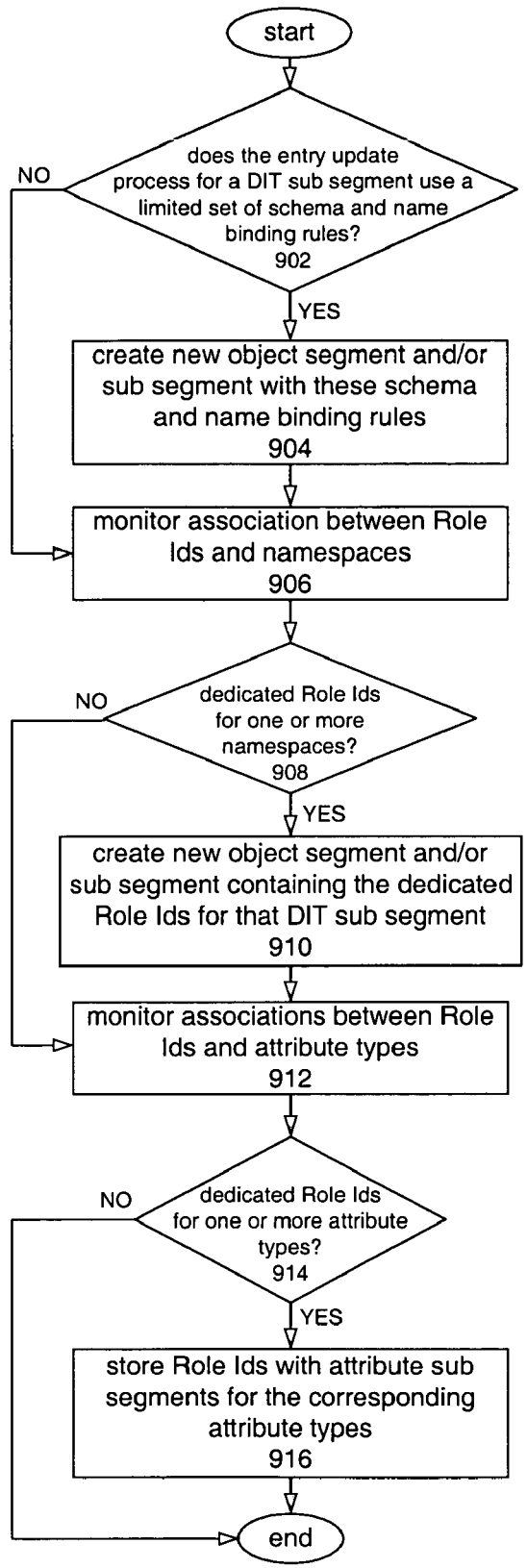
FIG. 9 is a flow diagram of an object segment adaptation process of the directory adaptation process.

As shown in FIG. 9, the object segment adaptation process begins at step 902 by determining whether a limited subset of schema and name binding rules are used when updating any of the DIT sub-segments. If so, then a new object segment and its sub-segments are created for the selected DIT sub-segment at step 904, and the subset of schema and name binding rules identified at step 902 is stored in the new Object segment/sub segments. This improves performance of the directory system by avoiding the need to process irrelevant schema and name binding rules when updating directory entries.

At step 906, the VDM 206, determine, at step 908, whether any Role Ids are only associated with a subset of the directory namespace. If so, then at step 910 one or more new Access Control Segments and/or Sub Segments are created for each namespace subset and the corresponding Role Ids are stored in the new segments and/or sub-segments.

At step 912, the VDM 206 monitors the associations between Role Ids are attribute types. If it is determined at step 914 that one or more Role Ids are only being applied to one or more specific attribute types, then at step 916 these Role Ids are stored in the corresponding attribute Sub Segment(s) for those one or more specific attribute types.

Where an Object Segment contains Multi Object update profiles, related name bindings, schema and access control information are checked during update processes. It is more efficient to package these details into a new Object Segment so that the whole process for Multi Object update is self-contained. This Object Segment/Sub Segment creation process is performed at start up time from information contained in the existing Object Sub Segments, using steps analogous to steps 902 to 910.

Adaptation Modes, Configuration and Events

Table 4 describes each of the adaptation modes listed above in the context of the database being in the basic mode of operation with pre-configured parameters, an adaptation event and an exit state (being the adapted mode produced by the segment adaptation process).

TABLE 4

| Segment Mode on Exit | Parameters Pre-Configured or generated by the Segment Adaptation VM | Event and Outcome |
|---|---|---|
| Attribute Segments 220 | | |
| Attribute Type Splitting | Maximum number of attribute cells in an attribute Sub Segment. The attribute segment adaptation process determines that number of attribute cells in an attribute sub-segment (steps 702 to 704). | When the threshold is reached, create new Attribute Sub Segment (step 706). If an Attribute Sub Segment becomes empty (all attributes are deleted), remove the sub segment. |
| Object Class Splitting | Maximum Object Class counts per DIT namespace e.g.: 1. Person 10,000, 2. Device 10,000, 3. Document 10,000 It has been determined by the segment adaptation process that the number of distinct of object classes and/or entry counts has reached a threshold value. Note: Where it is realised that performance can be improved by initially starting with different object classes (and their attributes) in different Attribute Segments, the parameters above should be set to 1. | When the number of instances of an object class reaches the threshold for that object class (and extra cpu resources are available), a new Attribute Segment is created for that object class (steps 704, 706) and the old Attribute Segment stores the other object classes that have not yet reached their thresholds. In the new Attribute Segment, the Attribute Segment Id is marked to indicate is the segment is adapted for this object class. If all the instances of this object class are subsequently deleted from this Attribute Segment, the Segment is deleted. |
| Complex/ Distinct Attribute Splitting | This adaptation occurs based on the number of Object Classes (of the same type) in the system or a portion of the DIT where the operations on such objects are | When the number of object class instances that contain distinct attribute sets (e.g., basic and complex attributes) reaches the threshold for that object class (and |

TABLE 4-continued

| Segment Mode on Exit | Parameters Pre-Configured or generated by the Segment Adaptation VM | Event and Outcome |
|---|---|---|
| | biased toward particular attributes of that object class (the common or compound attributes). Attributes Type sets within an Object Class: Certificate Authority { Attr Segment 1 { Name Organizational Attribute Set } Attr Segment 2 { Certificate(s) CRL(s) ARLs (s) } } The attribute segment adaptation process determines that searches are occurring on specific attribute types that can be either complex and compound attribute types or simple attribute types (step 716). Note: different attribute syntaxes require different search evaluation processes. For instance, a process to evaluate the values for equivalence in a phone number attribute is much simpler than the process that has to evaluate the complex name forms in member lists or the values embedded within a X.509 certificate. | extra cpu resources are available), a new Attribute Segment is created for the more frequently accessed attribute types of that object class and marked as adapted. All the existing attribute sub segments of that type (and its component attributes - as marked in the Attribute Sub Segments) are moved from the original Attribute Segment to the new one. Any subsequent search for (e.g.) attributes within a certificate is directed to this Attribute Segment. If all the instances of these attribute types are deleted from this new Attribute Segment, the Segment is deleted. |
| DIT Splitting | Maximum number of Accesses per period over a given name space; adaptation for example: DIT {c = us, o = govt, ou = dod} 10,000 per minute. Attr Segment 1 { c = us, o = govt, ou = dod, ou = army} Attr Segment 2 { c = us, o = govt, ou = dod, ou = navy} } The attribute segment adaptation process determines that a DIT with one Attribute Segment is being accessed at high rates in a random manner and the results are derived from dispersed entries that span the namespace This is determined from the Search parameters (Base Object (Name)) provided in a User's request that indicates where in the DIT to start a Search from. If two or more distinct Base Object (Names) are applied by directory users, then two or more distinct Attribute Segments can be created for them (and assigned to distinct DIT Sub Segments (And spare cpu resources are available.) | When the number of searches per period on a name space reaches the threshold for that name space (steps 708 and 710), (and extra cpu resources are available), a new Attribute Segment is created for a portion of the DIT (e.g., {c = us, o = govt, ou = dod, ou = army}). All the existing attribute sub segments are scanned for their Prefix Ids and where they match the split DIT prefix, they are copied to the new Attribute Segment and Sub Segments. The respective DIT Sub Segments are then updated to point to the new Attribute Segment. If all the entries are deleted from this Attribute Segment the Segment is also deleted. |
| Access Control Role Id Splitting (by attribute type) | The object segment adaptation process determines (at step 916) that the entry ACI (the Role Id) validation process for specific attribute types only needs a limited set from the complete set. | The ACI check can be optimised by storing the Role Ids that relate to a particular attribute type with the attribute sub-segment(s) for that attribute type (step 918). |
| DIT Segments 224 | | |
| DIT Organisation Splitting | DIT Segment assignment has been pre-configured for different namespaces e.g.: DIT Seg 1: c = us, o = govt, ou = dod, ou = army DIT Seg 2: c = us, o = govt, ou = dod, ou = navy | When the entry count and DIT navigation depth of the DIT Segment has reach its boundaries, the DIT Segment is split into two or more DIT Segments. If all the entries are subsequently deleted from the new (or old) DIT |

TABLE 4-continued

| Segment Mode on Exit | Parameters Pre-Configured or generated by the Segment Adaptation VM | Event and Outcome |
|---|---|---|
| | The segment adaptation process determines that large numbers of entries and high DIT levels exist in one DIT Segment and that navigation times are excessive. | Segment the Segment is deleted. |
| DIT Access Control Rule Splitting | Access Control Rules (the Role Ids) have been pre configured for different namespaces under a DIT Segment, e.g.:<br>c = us, o = govt, ou = dod, ou = army Role Id: 00.03.2.32.00<br>c = us, o = govt, ou = dod, ou = navy Role Id: 00.02.2.32.00}<br>The DIT segment adaptation process determines (steps 810, 812) that the Access Control Rules (the Role Ids) over a period of time (as Access Control Rules can be changed dynamically) have polarised onto different name spaces in the same DIT segment. | When the DIT Sub Segments within a DIT Segment relate to distinct access control rules, and those DIT Sub Segments can be partitioned into discrete name space, then a new DIT Segment is created (step 814). The access control Role Id for that Segment is stored in the Segment Header.<br>If all the entries are subsequently deleted from the new (or old) DIT Segment, the Segment is deleted. |
| DIT Flat Space Splitting | Flat Name Space rules have been pre configured. e.g.:<br>Flat Name Space Entries (see DIT Sub Segment): entry count (10,000) Suffix ( "group1")<br>The DIT segment adaptation process determines that the subordinate entry count under a particular entry has exceeded the lateral usability (The Flat Space Entries) (steps 802, 804), a new DIT Sub Segment is created (step 806), and a subset of the entries moved to this new sub-segment (step 808). | Where a large flat name space occurs, it can be accommodated by assigning multiple Attribute Sub Segments for a particular attribute type (e.g., naming attributes) or by establishing multiple DIT Sub Segments for respective portions of the Flat Space. In the DIT Sub Segment, the Flat Space Identifier is set to the Flat Space portion number.<br>If all the entries are subsequently deleted from the new (or old) DIT Sub Segment, the Sub Segment is also deleted. |
| Object Segments 222 | | |
| Name Binding Splitting | Where the Object Sub Segment(s) for Name Bindings have been pre configured with DIT prefixes to which they relate. e.g.:<br>Name Binding Sub Segment Prefix = c = us, o = govt, ou = dod, ou = army<br>The object segment adaptation process determines that the entry update validation process for a specific DIT name space (that inspects name binding rules) only needs a limited set from the complete set (step 902). (e.g., once a DIT has been established at the top level, then generally a system populates that with person entries under an ou entry. It follows that a prefix as exemplified above only needs two name binding rules to check: ou to people, and ou to role. | Where a DIT has reached a stable state and only leaf entries are being added (ie, the DIT Context Prefix has remained stable and typical leaf entries (Subscribers, vCards, device configuration objects, etc) are just being added, modified or removed), then the name binding check is made more efficient by creating a new Object Segment and/or Sub Segment for the Name Bindings in that Context Prefix (step 904) and storing the appropriate subset of name binding rules in the new object sub-segment (step 906). |
| Access Control Role Id Splitting (by namespace) | Where the Object Sub Segment(s) for Access Control Rules have been pre-configured with DIT prefixes to which they relate, e.g.:<br>ACI Sub Segment Prefix = c = us, o = govt, ou = dod, ou = army<br>The object segment adaptation process determines (at step 910) that the entry ACI (the Role Id) validation process for specific DIT name space (that inspects the ACI Role Ids) only needs a limited set from the complete set. | Where a DIT has reached a stable state and only leaf entries are being added, read and deleted, then the ACI check is optimised by creating a new Object Segment and/or Sub Segment for the Role Ids in that Context Prefix (step 912). |

TABLE 4-continued

| Segment Mode on Exit | Parameters Pre-Configured or generated by the Segment Adaptation VM | Event and Outcome |
|---|---|---|
| | (e.g., once a DIT has been established at the top level, then generally a specific application populates that, and specific users (roles) read that information. | |
| Multi Object Profile Splitting | Where an Object Segment contains Multi Object update profiles, related name bindings, schema and access control information are checked during startup. It is more efficient to package these details in one Object Segment so that the whole process for Multi Object update is self contained. Object Segments are configured normally. The object segment adaptation process determines that Multi Object updates will be performed. It constructs a separate Object Segment for this process. | A new Object Segment is created with the schema, name bindings and access control rules for the Multi Object update process. |

Adaptation Maps

The segment adaptation process inspects configuration parameters, the Object, DIT and Attribute Segments 220 to 224, and the directory's Management Information Base (MIB) periodically to gain statistical information about numbers of operations, the duration of operations and their performance (each OVM 208 can record its activity and performance). From this information, the VDM 206 updates map information in the adaptation segment 228 at step 602, based on the existing map information and the nature of the changes, as described below.

The map information is stored in five distinct Adaptation Sub Segments or maps. Each cell associated with these Sub Segments provides a record (a history) of what the directory has been doing. There is a DIT adaptation map, an access control adaptation map, an entry adaptation map, a usage adaptation map, and an adaptive replication map. These five maps store parameters that are processed by the VDM 206 during an assessment phase that can be executed periodically or triggered by an event (such as the segment adaptation process recognising that the number of cells in an Attribute Sub Segment has reached the pre-configured threshold maximum number of cells to create a new Attribute Sub Segment Cell, as described above). At this point the segment adaptation process determines whether the database segment layouts can be adjusted and optimized. As described above, this processing takes into account (i) the DIT structure and population at various depths of the DIT; (ii) the access control decisions being placed on those structures; (iii) the types of entries and attributes those structures contain; and (iv) the read and update operations being performed on them.

In order to describe the adaptation processing in further detail, the contents of the five maps are described below.

The DIT Adaptation Map contains:
(i) Context prefixes; The Context Prefix "length" indicates depth of the DIT because it shows how many levels of names (RDNs) are in the Prefix. e.g., the context prefix {c=us, o=gov, ou=dod, ou=admin} indicates the DIT is 4 deep to its leaf entries and 5 deep with leaf entries;
(ii) The Spread of this DIT in terms of its subordinate entries; i.e., how many entries are stored under this prefix at respective levels. (e.g., L-1=10 entries, L-2=100 entries, L-3=300,000 entries.
(iii) The number of entries below this Context Prefix;
(iv) The Types of Object Classes below this Context Prefix; and
(v) The Date/Time this cell was created.

The segment adaptation process can use the DIT adaptation map as follows:

Where DITs are building in "spread" or "depth", new DIT Segments and/or sub-segments can be established. Where DITs are growing in entry count, the segment adaptation process can instigate Flat Space management or the generation of multiple Attribute Sub Segments for the same attribute type.

The Access Control Adaptation Map contains:
(i) A Context Prefix within the database 126;
(ii) Access control sub-segment entries at each subordinate level to Context Prefix;
(iii) The Quantity of Role Ids below this Context Prefix; and
(iv) The Date/Time this cell was created.

Where DIT Sub Segments (and its subordinates by Prefix) have a discernable single Access Control Role Id, the segment adaptation process creates a new DIT Segment for that Context Prefix.

The Entry Adaptation Map contains:
(i) A Context Prefix within this database 126;
(ii) The number of subordinate access control sub-segment cells (Role Ids) used under this context prefix;
(iii) The number of different Attribute Types below this Context Prefix;
(iv) A list of the Attribute Types below this Context Prefix; and
(v) The Date/Time this cell was created.

Where DIT Prefixes are showing large numbers of attribute types, the segment adaptation process examines the object class structures that use such attributes. From this information, the segment adaptation process can create new attribute Segments based on Object Class splitting, Complex Attribute splitting, according to the Access Control rules in place.

The Usage Adaptation Map contains:
 (i) A Context Prefix within this database;
 (ii) The quantity (over time) of directory operations relating to Reads and Updates on its Attribute sub-segments;
 (iii) The number of different Attribute Types below this Context Prefix; and
 (iv) The Date/Time this cell was created.

Typically, a large scale ebusiness directory stores a very large number of attributes that are only used very occasionally. In this case high usage attributes are given higher precedence in the directory service processes. That is, where read and update operations are occurring on specific attributes (i.e., on a subset of Attribute Sub Segments), then the less often accessed attribute Sub Segments can be moved to another Attribute Segment. This allows OVMs 208 to access all their relevant attributes in one Attribute Segment, avoiding the need to inspect all Attribute Sub Segments (that were originally in that Segment) and for the VSM 202 to roll the less frequently accessed Attribute Segments onto backing store (i.e., the disk arrays 136) if memory resources are limited. The associated DIT Segment, Sub Segment and cell(s) for a portion of the DIT allow multiple Attribute Segments to be associated with a DIT Sub Segment. This enables parts of the objects in the DIT to be made "resident" in memory for immediate processing whilst other, less frequently accessed parts of those objects are stored on backing store.

The segment adaptation process examines the four maps (and their histories) as described above to determine whether the data stored in attribute 220, Directory Information Tree (DIT) 224 and/or object segments 222 and sub-segments needs to be redistributed or reallocated (thus changing the "shape and extent" of the modified segments).

The Adaptive Replication Map contains:
 (i) A Context Prefix of the database being chained to (frequently);
 (ii) The Spread of directory operations relating to Reads and Updates on its Attribute sub-segments;
 (iii) The number of Entries and distinct Attribute Types below its Context prefix that are being accessed; and
 (iv) The Date/Time this cell was created.

Where operations are being chained to other directory databases 128 to 132 and those entries are being passed back to the local directory system 100 for the local client 112, the replication adaptation process can create replica DIT and Attribute Segments (for read only access) through the ARVMs 218 of the remote directory systems 102 to 106. Where updates occur on a master, the remote ARVM 218 passes these to the replica.

Historical Map Processing.

Periodically, the maps are inspected to determine whether patterns of adaptation are occurring. Such patterns may reflect adaptation in particular directions, including:
 (i) The directory is increasing in size re its numbers of entries;
 (ii) The directory is increasing in size re its numbers of entries with the same object classes;
 (iii) The same types of directory accesses are increasing;
 (iv) The complexity and distribution of directory accesses are increasing;
 (v) The directory increases in size and then decreases its size in rapid cycles; or
 (vi) Particular attributes get accessed/modified at specific times of the day.

The outcomes of such analysis are used to choose a specific mode or modes of adaptation or to postpone or avoid adaptation altogether. For example, flat space adaptation will occur if the number of entries under one DIT prefix has increased above the pre configured threshold. On the other hand, adaptation is postponed if user access rates are increasing and becoming more complex, or if the directory size (the number of entries) increases and decreases in cycles over short periods.

In general, alternative embodiments can be devised in which the adaptation processes can be implemented, applied and used in stages. The adaptive replication VM 218, and the VDM 206 can adapt the Attribute Segment(s) 220, the DIT Segments 224 and the Object Segments 222 individually or collectively. The modes of adaptation that can be applied to these directory service segments 220 to 224 are identified in Table 5 below.

TABLE 5

| Attribute Segment | DIT Segment | Object Segment |
| --- | --- | --- |
| Basic | Basic | Basic |
| Attribute Type Splitting | DIT Organization Splitting | Name Binding Splitting |
| Object Class Splitting | DIT Access Control Rule Splitting | Access Control Role Id Splitting (name space) |
| Complex/Distinct Attribute Splitting | DIT Flat Space Splitting | Multi Object Profile Splitting |
| DIT Splitting | | |
| Access Control Role Id Splitting (Attribute Type) | | |

Each Adaptation Segment Header contains management information for the complete segment, as follows:
 (i) The segment identifier. (e.g. Adaptation Segment NNNN or an OID)
 (ii) The maximum size of the segment.
 (iii) The number of sub-segments being managed in this segment.
 (iv) The DIT Segment Ids that this Adaptation Segment 228 relates to (may be more than one entry).
 (v) The DIT sub-segment Ids that this Adaptation Segment 228 relates to.
 (vi) The Attribute Segment Id that this Adaptation Segment 228 relates to (may be more than one entry).
 (vii) The Attribute sub-segment Ids that this Adaptation Segment 228 relates to.
 (viii) The Object Segment Ids that this Adaptation Segment 228 relates to (may be more than one entry).
 (ix) The Object sub-segment Ids that this Adaptation Segment 228 relates to
 (x) The Date/Time this Segment was created.
 (xi) The Date/Time this Segment was used for Adaptation.
 (xii) The mode of this Adaptation Segment (Master or Replica).
 (xiii) Exception Event Processor (for errors and recovery).
 (xiv) The existence or residence (file state) of the segment (being rolled in or out by VSM 202).
 (xv) A file name for archive when the complete segment is archived.
 (xvi) A file name for restore when the complete segment is being restored.

Each Adaptation Segment Sub Header contains management information for a particular aspect of the Adaptation being processed, assessed and actioned. The Adaptation sub-segment Header contents are:
 (i) The sub-segment type identifier (Map types or History types).
 (ii) A Group Sequence Identifier (Map Set Id).

(iii) The Context Prefix of this DIT sub segment (including the external Context Prefix).
(iv) The Context Prefix Identifier as an object identifier.
(v) Constraint Parameters, the constraints in which re adjustments can take place.
(vi) The existence or residence (file state) of the segment (being rolled in or out by VSM 202).
(vii) A file name for archive when the complete segment is archived.
(viii) A file name for restore when the complete segment is being restored.

There are one or more Adaptation Segment Cells in each Adaptation sub-segment. They are used to record the History and Maps associated with the adaptation processes. The Adaptation sub-segment Cell contents are:
  (i) The Adaptation Cell Id—a sequence number that is managed in the context of its Adaptation sub-segment; and
  (ii) The Adaptation Map cell parameters for the corresponding Map type, as described above.

Directory Service Operations Virtual Machines

As described above, the Directory Service Operation Virtual Machines (OVMs) 208 provide standard directory service operations by interfacing with the virtual memory segments of the database 126. Each of the nine OVMs 208 is described below.

The OVM-Read Entry VM performs the LDAP/X.500 Read Entry (or Single Entry Search) service that selects all or a selected set of attributes from an entry based on an Entry Information Selection (EIS) specification. This process is performed as follows:
  (i) Perform database VM Operation type and Name space tests using the DIT Segment and the Object sub-segment Knowledge Information Cells. Perform the System and User capabilities test for this operation.
  (ii) If Namespace requirements indicate one or more external databases then initiate distributed operations via the DVM 214.
  (iii) Test the access controls Role Ids here and through the navigation process using the Object Segment AC cells information or the DIT Sub Segment Role Ids (AC-Tests) to see if this User is permitted to read an entry or its attributes in this part of the DIT.
  (iv) Navigate to the target entry by taking these steps:
    (a) If there is more than one DIT Segment entry, then select the DIT Segment where the prefix matches the higher order components of the DN of the entry to be read. Extract the DIT Segment Context Prefix Id.
    (b) Select from the DIT sub-segment entries the Context Prefix Id where the context prefix has the same RDN components of the DN to that of the Object Name or is the same except for the last RDN (as this will indicate a leaf entry is being Read).
    (c) Extract from the DIT cell the pointers to the Attribute Segment (s) for this context prefix and initiate a VSM transfer if not all the Attribute Segments/types are in memory.
    (d) Extract the Attribute Segment cell pointers for the distinguished attributes of this new entry's RDN types. Examine the Attribute sub-segment for "distinguished" attribute sub-segments.
    (e) Test the Attribute sub-segment cells for the distinguished attribute types/values to be that of the Read entry's RDN types/values. Extract from the cell the Context Prefix Id and the RDN Id. (test for existence of the name).
    (f) If Alias (name) is detected in Attribute sub-segment and de-referencing is permitted, repeat navigation process, discarding duplicate target entry names.
  (v) Access the other Attribute sub-segment cells for all attributes or the types of attributes specified in the EIS that have the same Context Prefix Id and RDN Id.
  (vi) Access the Attribute Segment and sub-segments to see if collective attributes exist for this entry.
  (vii) Send the attributes and positive response to directory User.

The OVM-Compare VM performs the LDAP/X.500 Compare service that tests all or a selected set of attributes from an entry, using a Purported Attribute Value Assertion (P-AVA) specification. This process is performed as follows:
  (i) Perform VM Operation type and Name space tests using the DIT Segment and the Object sub-segment Knowledge Information Cells. Perform the System and User capabilities test for this operation.
  (ii) If Namespace requirements indicate one or more external databases 126 to 130 then initiate distributed operations via DVM. 214
  (iii) Test the access controls Role Ids here and through the navigation process using the Object Segment AC cells information or the DIT Sub Segment Role Ids (AC-Tests) to see if this User is permitted to read/compare an entry or its attributes in this part of the DIT.
  (iv) Navigate to the target entry by taking these steps:
    (a) If there is more than one DIT Segment entry then select the DIT Segment where the prefix matches the higher order components of the DN of the entry to be read. Extract the DIT Segment Context Prefix Id.
    (b) Select from the DIT sub-segment entries the Context Prefix Id where the context prefix has the same RDN components of the DN to that of the Object Name or is the same except for the last RDN (as this will indicate a leaf entry is being Compared).
    (c) Extract from the DIT cell the pointers to the Attribute Segment for this context prefix and initiate a VSM transfer if not all the Attribute Segments/types are in memory.
    (d) Extract the Attribute Segment cell pointers for the distinguished attributes of this new entry's RDN types. Examine the Attribute sub-segment for "distinguished" attribute sub-segments.
    (e) Test the Attribute sub-segment cells for the distinguished attribute types/values to be that of the Compare entry's RDN types/values. Extract from the cell the Context Prefix Id and the RDN Id. (test for existence of the name).
    (f) If Alias (name) is detected in Attribute sub-segment and dereferencing is permitted, repeat navigation process, discarding duplicate target entry names.
  (v) Access the other Attribute sub-segment cells for all attributes or the types of attributes specified in the P-AVA that has the same Context Prefix Id and RDN Id.
  (vi) Test these attribute types/values against the P-AVA (e.g., determine whether a telephone number is present, or whether a telephone number is equal to 03 9123 4567, etc.)
  (vii) If all attributes are not tested, Access the Attribute Segment and sub-segments to see if collective attributes exist for this entry. Apply tests if so.
  (viii) Send a positive or negative response to directory User accordingly.

The OVM-Search VM performs the LDAP/X.500 Search (one or more multiple entries) service that selects all or a selected set of attributes from entries based on a Filter specification. This process is the most complex of operations on a directory in that a Filter Specification can be nested with logical operators, (ANDs, ORs or NOTs) and as well they may be multiple alias entries that point to a single entry. This process is performed as follows. (For brevity, details that are not specific to the architecture of the directory system 100 have been omitted.)

(i) Perform VM Operation type and Name space tests using the DIT Segment and the Object sub-segment Knowledge Information Cells. Perform the System and User capabilities test for this operation.

(ii) If Namespace requirements indicate one or more external database 102 to 106 then initiate distributed operations via DVM 214.

(iii) Test for presence of specialised Filter—Matching Rule Identifiers of:
  (a) Validate—call CVM-Validate Certificate (CVM-VC)
  (b) Relational—call CVM-Relational Searching (CVM-RS)
  (c) Authorise—call CVM-Service Authorization (CVM-SA)
  (d) Statistics—call CVM-Statistical Evaluation (CVM-SE)
  (e) MailBox—call CVM-MailBox (CVM-MB)
  (f) MessagePad—call CVM-MessagePad (CVM-MP)
  (g) AddressBook—call CVM-AddressBook (CVM-AB)

(iv) Test the access controls Role Ids here and through the navigation process using the Object Segment AC cells information or the DIT Sub Segment Role Ids (AC-Tests) to see if this User is permitted to search entries and their attributes in this part of the DIT.

(v) Navigate to the base object entry by taking these steps:
  (a) If there is more than one DIT Segment entry then select the DIT Segment where the prefix matches the higher order components of the DN of the entry to be read. Extract the DIT Segment Context Prefix Id.
  (b) Select from the DIT sub-segment entries the Context Prefix Id where the context prefix has the same as RDN components of the DN to that of the Base Object DN or is the same except for the last RDN (as this will indicate a leaf entry is being Searched).
  (c) Select from the DIT Sub Segment cells the Attribute Segments assigned to this DIT.
  (d) Check the EIS and filter attribute types against the Attribute Segments (and their types) and initiate a VSM transfer if not all Attribute types are present in memory.
  (e) Using the Search Subset parameter value (one level, whole subtree) select from the DIT sub-segment entries the Context Prefix Ids where the context prefix has the more RDN components to that of those matched the Base Object DN (as this will enable subtrees of the Base Object to be Searched).
  (d) Where the Base Object DN indicates a single leaf object Search, extract the Attribute Segment cell pointers for the distinguished attributes of this entry's RDN types. Examine the Attribute sub-segment for "distinguished" attribute sub-segments.
  (e) Test the Attribute sub-segment cells for the distinguished attribute types/values to be that of the Read entry's RDN types/values. Extract from the cell the Context Prefix Id and the RDN Id. (test for existence of the name).
  (f) If Alias (name) is detected in Attribute sub-segment and dereferencing is permitted, repeat navigation process—discarding duplicate target entry names.

(vi) Form a list of Context Prefix Ids and Attribute sub-segments that contain the attribute types as specified by the Filter and EIS parameters.

(vii) Initiate Search Sub processing (multiple threads) for each Attribute Sub Segment if multiple processors are available (or initiate Attribute processing by one or more dedicated hardware components, as described below, if present).

(viii) Access the required Attribute sub-segment cells for all attributes or the types of attributes specified in the Filter and EIS that have the same Context Prefix Id (ix) If all attributes requested are not satisfied, Access the Attribute Segment and sub-segments to see if collective attributes exist for this entry. Apply Search tests if so.

(x) Send the attributes and positive response to directory User.

The OVM-List VM performs the LDAP/X.500 List (or Single Level Search) service that selects the subordinate naming attributes of an entry. This process is performed as follows:

(i) Perform VM Operation type and Name space tests using the DIT Segment and the Object sub-segment Knowledge Information Cells. Perform the System and User capabilities test for this operation.

(ii) If Namespace requirements indicate one or more external databases 126 to 130 then initiate distributed operations via DVM. 214

(iii) Test the access controls Role Ids here and through the navigation process using the Object Segment AC cells information or the DIT Sub Segment Role Ids (AC-Tests) to see if this User is permitted to list an entry's naming attributes in this part of the DIT.

(iv) Navigate to the target entry by taking these steps:
  (a) If there is more than one DIT Segment entry then select the DIT Segment where the prefix matches the higher order components of the DN of the entry to be read. Extract the DIT Segment Context Prefix Id.
  (b) Select from the DIT sub-segment entries the Context Prefix Id where the context prefix has the same as RDN components of the DN to that of the Object Name or is the same except for the last RDN (as this will indicate a leaf entry is being Listed).
  (c) If the List is being performed on a leaf entry, exit and return a negative response.
  (d) Extract from the DIT cell the pointers to the Attribute Segment for this context prefix and initiate a VSM transfer if not all the Attribute Segments/types are in memory.
  (e) Extract the Attribute Segment cell pointers for the distinguished attributes of this new entry's RDN types. Examine the Attribute sub-segments for "distinguished" attribute sub-segments.
  (f) Test the Attribute sub-segment cells for the distinguished attribute types/values to be that of the List entry's RDN types/values. Extract from the cell the Context Prefix Id and the RDN Id. (test for existence of the name).

(v) Access the other distinguished Attribute sub-segment cells for all attributes that have the same Context Prefix Id.

(vi) Send the attributes and positive response to directory User.

The OVM-Add Entry performs the LDAP/X.500 Add Entry service of adding a leaf entry to the directory structure.

This process is performed by this OVM on the database 126 as follows. (For brevity, details that are not specific to the architecture of the directory system 100 have been omitted.)

(i) Perform VM Operation type and Name space tests using the DIT Segment and the Object sub-segment Knowledge Information Cells. Perform the System and User capabilities test for this operation.

(ii) If Namespace requirements indicate one or more external databases 126 to 130 then initiate distributed operations via DVM 214.

(iii) Test the access controls Role Ids here and through the navigation process using the Object Segment AC cells information or the DIT Sub Segment Role Ids (AC-Tests) to see if this User is permitted to add an entry in this part of the DIT.

(iv) Test the Object Class and Attribute Types being added using the Object Segment information (OC-Tests).

(v) Test the DIT structure rules using the Object Segment information (DIT-Tests).

(vi) Write the Add Entry to a Transaction sub-segment and cell with date/time.

(vii) Navigate to the parent entry by taking these steps:

(a) If there is more than one DIT Segment entry then select the DIT Segment where the prefix matches the higher order components of the DN of the new entry. Extract the DIT Segment Context Prefix Id.

(b) Select from the DIT sub-segment entries the Context Prefix Id where the context prefix has the same RDN components of the DN to that of the Object Name or is the same except for the last RDN (as this will indicate a leaf entry is being Added to a leaf entry).

(c) Extract from the DIT cell the pointers to the Attribute Segment for this Context Prefix and initiate a VSM transfer if not all the Attribute Segments/types are in memory (d) Examine the Attribute sub-segment for "distinguished" attribute sub-segments.

(e) If the DN—Context Prefix match determined the last two RDNs did not exist in the DIT sub-segment, then a new leaf entry is being added to an existing leaf entry. Set "Add First Leaf Entry"

(f) If "Add First Leaf Entry" is not set, test the Attribute sub-segment cells for the distinguished attribute types/values to be that of this entry's RDN types/values. Extract from the cell the Context Prefix Id and the RDN Id. (test for existence of the name/duplication).

(g) If "Add First Leaf Entry" is set, test the Attribute sub-segment cells for the distinguished attribute types/values to be that of this entry's (RDN minus 1)-types/values. (test for existence of the parent entry).

(h) If Alias (name) is detected in Attribute sub-segment and dereferencing is permitted, update the DN to the target.

(viii) Extract the last RDN types and values of the entry to be added.

(ix) If "Add First Leaf Entry" is set, add a new DIT sub-segment and Cell to the DIT Segment with the new Context Prefix and Context Prefix Id—(generally this will use the same Attribute Segment(s) as the parent entry. Set the RDN Id to 1 in this sub-segment.

(x) Add the distinguished attributes to the distinguished Attribute sub-segment cells. Set Context Prefix Id and the RDN Id and Control Flags accordingly.

(xi) Add the other attributes as cells to the Attribute sub-segments for this type. Set Context Prefix Id and RDN Id and Control Flags in these cells accordingly.

(xii) Add the operational attributes as cells to the Attribute sub-segments for these types. Set Context Prefix Id and RDN Id and Control Flags in these cells accordingly (xiii) (RDN Id is calculated from the RDN Id field in the DIT sub-segment)

(xiv) If this new entry creates a parent entry without a DIT sub-segment entry update the DIT Segment with the parents Context Prefix.

(xv) If Integrity mode equals Low Integrity Mode—Remove Add Entry from the Transaction Segment cell. Send positive response to directory User.

(xvi) If Integrity mode equals High Integrity Mode—Initiate disk update. Set Transaction RIRO state to RO. Await termination (xvii) On termination clear Transaction Segment and cell entry. Send positive response to directory User.

(xviii) If the Segments being updated indicate they belong to a master database and the Object sub-segment Knowledge Information indicates that replicas of the same Context Prefix exist, schedule replication (incremental or batch) through the RVM 216 and the Transaction Segment.

Note: in the event of power failure the Transaction sub-segments are examined and recovery action taken if required.

The OVM-Modify RDN VM performs the LDAP/X.500 Modify RDN service of changing a leaf entry's name. This process is performed by this OVM on the database 126 as follows. (For brevity, details that are not specific to the architecture of the directory system 100 have been omitted.)

(i) Perform VM Operation type and Name space tests using the DIT Segment and the Object sub-segment Knowledge Information Cells. Perform the System and User capabilities test for this operation.

(ii) If Namespace requirements indicate one or more external databases 126 to 130 then initiate distributed operations via the DVM 214.

(iii) Test the access controls Role Ids here and through the navigation process using the Object Segment AC cells information or the DIT Sub Segment Role Ids (AC-Tests) to see if this User is permitted to modify the name of an entry in this part of the DIT.

(iv) Test the DIT structure rules Name Bindings using the Object Segment information (DIT-Tests) to see if the new name form is appropriate.

(v) Write the Modify RDN to a Transaction sub-segment and cell with date/time.

(vi) Navigate to the parent entry by taking these steps:

(a) If there is more than one DIT Segment entry then select the DIT Segment where the prefix matches the higher order components of the DN of the new entry. Extract the DIT Segment Context Prefix Id.

(b) Select from the DIT sub-segment entries the Context Prefix Id where the context prefix is the same except for the last RDN (as this will indicate a leaf entry is having its name modified).

(c) Extract from the DIT cell the pointers to the Attribute Segment for this Context Prefix and initiate a VSM transfer if not all the Attribute Segments/Types are in memory.

(d) Examine the Attribute sub-segment for "distinguished" attribute sub-segments.

(e) Test the Attribute sub-segment cells for the distinguished attribute types/values to be that of requested entry's RDN types/values (test for the existence of the original name).

(f) If an Alias (name) is detected in Attribute sub-segment and de-referencing is permitted, update the DN to the target.

(g) Test the Attribute sub-segment cells distinguished attribute types/values against that of the entry's new RDN types/values—in case an attempt is being made to change to the name to that of an existing entry.

(vii) Add the new distinguished attributes to the distinguished Attribute sub-segment cells. Set Context Prefix Id and the RDN Id and Control Flags accordingly.

(viii) If Integrity mode equals Low Integrity Mode—Remove Add Entry from the Transaction Segment cell. Send positive response to directory User.

(ix) If Integrity mode equals High Integrity Mode—Initiate disk update. Set Transaction RIRO state to RO. Await termination.

(x) On termination clear Transaction Segment and cell entry. Send positive response to directory User.

(xi) If the Segments being updated indicate they belong to a master database 126 and the Object sub-segment Knowledge Information indicates that replicas of the same Context Prefix exist, schedule replication (incremental or batch) through the RVM 216 and the Transaction Segment.

Note: in the event of power failure the Transaction sub-segments are examined and recovery action taken if required.

The OVM-Modify Entry VM performs the LDAP/X.500 Modify Entry service of modifying the attributes or their values of an entry. This process is performed by this OVM on the database 126 as follows. (For brevity, details that are not specific to the architecture of the directory system 100 have been omitted.)

(i) Perform VM Operation type and Name space tests using the DIT Segment and the Object sub-segment Knowledge Information Cells. Perform the System and User capabilities test for this operation.

(ii) If Namespace requirements indicate one or more external databases 126 to 130 then initiate distributed operations via the DVM 214.

(iii) Test the access controls Role Ids here and through the navigation process using the Object Segment AC cells information or the DIT Sub Segment Role Ids (AC-Tests) to see if this User is permitted to modify an entry in this part of the DIT.

(iv) Test the Object Class and Attribute Types being modified using the Object Segment information (OC-Tests).

(v) Write the Modify Entry to a Transaction Segment cell with date/time.

(vi) Navigate to the entry by taking these steps:
  (a) If there is more than one DIT Segment entry then select the DIT Segment where the prefix matches the higher order components of the DN of the new entry. Extract the DIT Segment Context Prefix Id.
  (b) Select from the DIT sub-segment entries the Context Prefix Id where the context prefix has the same RDN components of the DN to that of the Object Name or is the same except for the last RDN (as this will indicate a leaf entry is being Modified).
  (c) Extract from the DIT cell the pointers to the Attribute Segment for this context prefix and initiate a VSM transfer if not all the Attribute Segments/types are in memory.
  (d) Extract the Attribute Segment Cell pointers for the distinguished attributes of this new entry's RDN types. Examine the Attribute sub-segment for "distinguished" attribute sub-segments.
  (e) Test the Attribute sub-segment cells for the distinguished attribute types/values to be that of the Read entry's RDN types/values. Extract from the cell the Context Prefix Id and the RDN Id. (test for existence of the name).
  (f) If Alias (name) is detected in Attribute sub-segment and dereferencing is permitted, update the DN to the target.

(vii) Extract the last RDN types and values of the entry to be added.

(viii) Access the Attribute sub-segment (non distinguished) cells.

(ix) Add the distinguished attributes to the distinguished Attribute sub-segment cells. Set Context Prefix Id and the RDN Id and Control Flags accordingly.

(x) Add the other attributes as cells to the Attribute sub-segments for this type. Set Context Prefix Id and RDN Id and Control Flags in these cells accordingly.

(xi) Add the operational attributes as cells to the Attribute sub-segments for these types. Set Context Prefix Id and RDN Id and Control Flags in these cells accordingly (xii) (RDN Id is calculated from the RDN Id field in the DIT sub-segment)

(xiii) If this new entry creates a parent entry without a DIT sub-segment entry update the DIT Segment with the parents Context Prefix.

(xiv) If Integrity mode equals Low Integrity Mode—Remove Add Entry from the Transaction Segment cell. Send positive response to directory User.

(xv) If Integrity mode equals High Integrity Mode—Initiate disk update. Set Transaction RIRO state to RO. Await termination (xvi) On termination clear Transaction sub-segment and cell entry. Send positive response to directory User.

(xvii) If the Segments being updated indicate they belong to a master database and the Object sub-segment Knowledge Information indicates that replicas of the same Context Prefix exist, schedule replication (incremental or batch) through the RVM 216 and the Transaction Segment.

Note: in the event of power failure the Transaction sub-segments are examined and recovery action taken if required.

The OVM-Remove Entry VM performs the LDAP/X.500 Remove Entry service that removes a leaf entry from the directory structure. This process is performed by this OVM on the database 126 as follows. (For brevity, details that are not specific to the architecture of the directory system 100 have been omitted.)

(i) Perform VM Operation type and Name space tests using the DIT Segment and the Object sub-segment Knowledge Information Cells. Perform the System and User capabilities test for this operation.

(ii) If Namespace requirements indicate one or more external databases 126 to 130 then initiate distributed operations via DVM 214.

(iii) Test the access controls Role Ids here and through the navigation process using the Object Segment AC cells information or the DIT Sub Segment Role Ids (AC-Tests) to see if this User is permitted to remove an entry in this part of the DIT.

(iv) Write the Remove Entry to a Transaction Segment cell with date/time.

(v) Navigate to the actual entry by taking these steps:
  (a) If there is more than one DIT Segment entry then select the DIT Segment where the prefix matches the higher order components of the DN of the new entry. Extract the DIT Segment Context Prefix Id.

(b) Select from the DIT sub-segment entries the Context Prefix Id where the context prefix has the same RDN components of the DN to that of the Object Name or is the same except for the last RDN (as this will indicate a leaf entry is being Removed).

(c) Extract from the DIT cell the pointers to the Attribute Segment for this context prefix and initiate a VSM transfer if not all the Attribute Segments/types are in memory.

(d) Examine the Attribute sub-segment for "distinguished" attribute sub-segments.

(e) Test the Attribute sub-segment cells for the distinguished attribute types/values to be that of this entry's RDN types/values. Extract from the cell the Context Prefix Id and the RDN Id. (test for existence of the name)

(f) If Alias (name) is detected in Attribute sub-segment and dereferencing is permitted, update the DN to the target.

(vi) If this entry has no sibling nodes copy its DIT sub-segment parent entry and its cells to a Transaction Segment cell and set "Last Leaf Entry".

(vii) If this entry contains Active Attributes, copy the event(s) to a Transaction Segment cell.

(viii) If this entry has alias entries and the "alias integrity" feature is on, copy this action to a Transaction Segment cell.

(ix) Remove the DIT sub-segment and its cells for this entry (x) Record the Context prefix Id and RDN Id then remove the distinguished attribute cells from the Attribute sub-segment (xi) Where the Context Prefix Id and RDN Id match, remove the other attribute cells from the Attribute sub-segments of this type.

(xii) If Last Leaf Node set remove the DIT sub-segment of the parent entry.

(xiii) If Integrity mode equals Low Integrity Mode—Remove Add Entry from the Transaction Segment cell. Send positive response to directory User.

(xiv) If Integrity mode equals High Integrity Mode—Initiate disk update. Set Transaction RIRO state to RO. Await termination (xv) On termination clear Transaction Segment and cell entry. Send positive response to directory User.

Note: in the event of power failure the Transaction sub-segments are examined and recovery action taken if required.

The OVM-Abandon VM performs the LDAP/X.500 Abandon (Search) service that stops outstanding operations. This process is performed by this OVM on the MRD as follows. (For brevity, details that are not specific to the architecture of the directory system 100 have been omitted.)

(i) Perform VM Operation type and Name space tests using the DIT Segment and the Object sub-segment Knowledge Information Cells. Perform the User capabilities test for this operation.

(ii) If Namespace requirements indicate one or more external databases 128 to 132 then initiate distributed operations via the DVM 214.

(iii) The Search Operation referenced if in progress is halted and its partial results are discarded.

(iv) Send a negative response to directory User for the Search—Abandoned.

(v) Send positive response to directory User for the Abandon.

Distributed Directory Operations and Replicated Directory Operations

The directory system 100 supports the X.500 Distributed and Replicated modes of operation through the Distributed Directory Operation VMs (DVMs) 214 and the Replicated Directory Operation VMs (RVMs) 216.

Distributed Directory Operation VMs (DVMs) 214 provide the X.500 Directory System Protocol (DSP) service level operations on and between the databases 126 to 134. These operations are defined by the X.500 directory standards for DSP, namely X.518.

Distributed operations occur when a User asks the database 100 to perform operations (using OVMs 208) on namespace where that namespace is known to be outside the scope of the namespace managed by the local database 126. X.518 reflects the LDAP and X.511 (DAP) defined operations but additional parameters are added or modified such as base object and trace information in order that distributed operations can be processed correctly.

The OVMs 208 call the DVM 214 when detecting that the namespace of the request is external to the local database 126's namespace by testing the Context Prefix information in the DIT Segment(s) and the Knowledge Information in Object sub-segment cells. The DVM 214 sets in motion the construction of the DSP request and records that in a Transaction Segment 226 cell (as a DVM-TX transaction).

A single request from a User such as a Search or a List can be actioned across multiple databases 126 to 134 at the same time. Therefore if the operation is a Search or a List and it implicates multiple databases 126 to 134, the DVM 214 records this so that it can coordinate the asymmetric responses that it may receive from the local database 126 and the remote databases 128 to 132. Where multiple remote databases 128 to 132 are used, a Transaction Segment cell is created for each DSP request issued.

Where the operation is a Search or a List and it implicates multiple databases, the DVM 214 records this in a dedicated Transaction sub-segment, so that it can coordinate the asymmetric responses that it may receive from the local databases 126 and the remote databases 128 to 132. When a response is received its content is stored in the operation's Transaction sub-segment as a cell. Where this response is not the last response expected, the cell is flagged with "waiting group response". When the last response is received the results are collated and the initiating OVM is called to send the response and terminate the entire operation.

Replicated Directory Operation VMs (RVMs) 216 provide the X.500 DISP (replication/shadowing) service level operations on and between databases 126 to 134. These operations are defined by the X.500 directory standards for Directory Information Shadowing Protocol (DISP), namely X.525.

Replication agreements defining the DIT area to shadow and the nature of the update (incremental or batch) are defined between directory servers on a bilateral basis.

The RVMs 216 perform the actual processing of the X.500 DISP directory operations and can operate in two modes:

(i) External DISP Mode—used where the interface to other parts of the directory service are using the X.500 DISP standards for replication; and (ii) Segment Transfer Mode—used where the interface to other parts of the directory service can use segment-based information transfer formats for replication. These information transfer formats are as per the virtual storage Segment, Sub-segment and cell definitions described above. For example, this type of transfer is used where ARVMs 218 in each directory system 100 to 108 coordinate the transfer of DIT and Attribute Segments based on high statistics of local users continually accessing the remote systems 102 to 108 for entries.

The RVMs 216 can perform replication at the segment, sub-segment and cell levels. The RVMs 216 call OVMs 208 to perform local replication update operations if External DISP Mode is used. The RVMs 216 maintain replication integrity through the use of transaction segments 226.

Static replication is initiated when the scheduling of replication agreements is actioned or there is a change in the master information that is then transferred to the replica(s).

During update operations, the OVMs concerned test the modes of the Segments used and determine if they are set as masters. The Attribute, DIT and Object Segments have flags to indicate if they are masters or replicas. In the case of being a master, the Object Segment Knowledge Information is inspected for a database with the same prefix and its Mode set to "Replica". If this is the case the RVM 216 is called to schedule the replication as a transaction using the Transaction Segment cells.

Adaptive replication is triggered by the ARVM 218 when it schedules its analysis of the Adaptation maps and finds that the Attribute, DIT and Object Segments should be copied to or from the other databases 126 to 130. Configuration parameters are used to control the clearing or refreshing of the entries created through the adaptive replication process.

Customised Virtual Machines—CVMS

Customised Virtual Machines (CVMs) 212 provide the following services:
 (i) CVM—Statistical Evaluation (CVM-SE)
 (ii) CVM—Change Monitoring (CVM-CM)
 (iii) CVM—Validate Certificate (CVM-VC)
 (iv) CVM—Collective Attributes (CVM-CA
 (v) CVM—Multi-Object Management (CVM-MO)
 (vi) CVM—Service Authorization (CVM-SA)
 (vii) CVM—User Presence (CVM-UP)
 (viii) CVM—Relational Searching (CVM-RS)
 (ix) CVM—Directory Service Messaging (CVM-DM)
 (x) CVM—Message Submission (CVM-EMS)
 (xi) CVM—Message Management (CVM-EMM)
 (xii) CVM—Message List expansion (CVM-EML)
 (xiii) CVM—Message Retrieval (CVM-EMR)
 (xiv) CVM—Address Book (CVM-EAB)
 (xv) CVM—Mail Folder (CVM-EAF)
 (xvi) CVM—Calendar/Diary (CVM-ECD)
 (xvii) CVM—Message Gateway (CVM-EMG)

CVM-Statistical Evaluation (CVM-SE)

The CVM-Statistical Evaluation (CVM-SE) provides statistical output of the directory entries in terms of their population, numbers, attribute types and keywords. This VM is initiated by any of the X.500/LDAP retrieval operations of Search that applies a Filter specification containing the entry types or attribute types/values to be counted and a Matching Rule Identifier equal to "Statistics". This VM maintains DIT statistics such as cell and entry counts as stored in the Segments. Each operation in a OVM 208 records its statistics in the Directory Management Information Base as defined in RFC 1567 Directory Monitoring MIB. This includes information such as summary statistics on the directory accesses, operations, and errors, and summary statistics on the entries held by the directory service.

In addition the CVM-SE generates statistics indicating how the Object, DIT and Attribute Segments 220 to 224 are organized, their configuration and any adaptation maps that affected their configuration.

CVM-Change Monitoring (CVM-CM)

LDAP standards define a "Persistent" Search in that the User may register to be notified by the directory service if a specific entry/entries are updated. This VM is initiated by any of the X.500/LDAP Search operations that have their control attribute set for persistent Search.

CVM-Collective Attributes (CVM-CA)

Collective attributes are defined in X.500. They are defined as the common attributes that apply to a complete directory subtree that contains one or more directory information entries. For optimization, collective attributes are stored once at the "top of the subtree" to which they apply, but returned to the directory User as if they were stored within every entry or entries being returned. Collective attributes in the directory system 100 are explicitly flagged within an Attribute sub-segment. The CVM-CA is invoked when the Read, Compare or Search OVMs encounter a collective attribute in their DIT-Attribute Sub Segments.

CVM-Validation—Certificate Paths (CVM-VC)

X.509/PKI standards describe that a number of chained certificates can reflect a chain of trust from the User (the End Entity) to the Issuer of the certificate(s). Currently X.509 certificate paths are validated by the directory service application (email applications) that is external to the directory service by making a succession of LDAP Searches on the directory service. This makes the application of PKI very complex and results in significant network traffic and directory intensive Search operations.

For example, if there are three certificates in the trust path to verify a digital signature of a User and there are ten recipients of the signed message, then the LDAP directory traffic for validation will be 30 accesses or possibly even more if there are certificate revocation lists to be processed. In addition, a tremendous amount of data is transferred out of the directory to the end User and the message's recipient email applications. If the directory was trusted, a simple "Yes or No" about the validity of the certificate path is all that is required.

Directory services that support the USA standard SDN.705 (from the National Security Agency NSA—US) for strong authentication and signed operations of X.500 protocols, actually validate the certificate paths for the signatures on the protocols. In this case the directory is validating its own users signatures. It is not validating an external user signature for another external user.

The directory service itself is capable of providing this verification action internally when presented with the End Entity certificate. It instantiates this (trusted) VM and validates the certificate path accordingly. The CVM-VC is initiated by an X.500/LDAP Search operation or that contains a Filter specification containing the certificate to be validated and Matching Rule Identifier equal to "Validate". The Search operation Filter may also contain the ROOT certificate upon which the certificate path will be tested. Where the ROOT certificate is not provided in the Search request, the Search response will return the ROOT certificate that the original End Entity certificate validated against. Where the validation process finds a CRL in the path that invalidates the certificate, the response will identify the CA's identity and indicate the revocation reason as provided in the CRL.

This certificate validation function can also be initiated through a directory service Online Certificate Protocol (OCSP) gateway in that an OCSP request will be asking the recipient if the certificate presented is valid. The directory system 100 can perform this function because currently OCSP servers will make a series of calls on the directory to read and validate the certificate chain.

Where the OCSP interface is incorporated, the directory system 100 will have to be trusted and capable of digitally signing its responses to the OCSP requests.

CVM-Multi-Object Management (CVM-MO)

The X.500/LDAP directory standards development process tried to address this issue. It did so by dictating "structure" around a set of objects that required such objects to be tightly connected by names or by using a superior object that "contained "subordinate" objects. This approach was seen as too simplistic and constrained to solve the real problem of managing related objects in a directory service that support on-line User to (multiple) Service relationships in an agile service environment.

The directory system 100 provides a User to Service object management (creation, modification and deletion service) when pre-configured with such details and rules. This CVM is controlled through directory object templates held in Object Segments Cells. These templates stipulate that if a specific User object is created, other objects that relate to that User such as mail boxes, presence management attributes, memberships, vcard information and service bundles are also created or modified across the DIT and their attributes populated with the predefined attribute values of that User. The primary object is referred to as the sponsoring object and its counterparts are referred to as the sponsored objects. In addition where such attributes are modified (the sponsoring attributes), its counterparts (sponsored attributes) are also modified. Where sponsoring attributes are updated after the User creation event, the sponsored ones are also updated.

The CVM-MO service supports an online, personalised User and their Service environment. This service can also be used for membership lists and group management functions. For example, a mail box, vCard, presence management object and some default service objects (email and IM) can be created automatically when a user object is created.

This VM is initiated by any of the X.500/LDAP update operations of Add, Remove, Modify or ModifyRDN that target the sponsoring object of an object set.

The CVM-MO requires that "sponsor and sponsored" objects and attributes are used within the directory service. The profiles for these objects are defined through the use of Object sub-segment cells of the US type.

CVM User Presence (CVM-UP)

When a User is authorised to access a directory (service authorisation), validated on the directory or an application authorises on behalf of the User, or the user is using the transactional messaging contexts of the directory, the directory updates the user's Presence object's User Operational attributes (e.g., On-line, Location, Device Type, Profile, Security Level, Inform List) in the Sub Segment that is assigned for this type of attribute to indicate that a User is present on the directory system 100 or its attached applications. In addition this update can be used to initiate events, and or to inform others of this event.

The CVM-UP writes the relevant attributes to the User's own entry User Operational attributes using the connect credentials (name and DN) as well as other attributes that can be derived from, the Users entry or the application which has permission to update the Users Operational attributes—for example. Location, Device Type, Security level.

This feature is ideal for Instant Messaging, and other mobile services. User Operational (Presence attributes) are defined as: On-line, Location, Device Type, Profile, Security Level, Inform List, The nature of the object classes and attributes held in the directory will be aligned to that as defined in RFC 2778 and 2779, the RFCs for Presence Protocols and Instant Messaging. Such Object Classes will support the Presence information and its lodgement and broadcast and the Instant Messaging mail boxes. The directory system 100 also supports the objects and attributes that relate to the XML data defined in the XMPP standards as and when they are finalized.

The directory system 100 also supports an IM protocol gateway that converts the Presence and Instant Messaging protocols into Directory Updates or Reads.

CVM Service Authorization (CVM-SA)

The directory system 100 can be used to provide a service environment where users can access one or more on-line applications (email, IM, web, transactions), through one or more devices (phones, PCs, PDA, Kiosks and iDTV systems) using a one or more authentication and authorization tokens (passwords, coded cards, biometrics and signatures).

The directory system 100 provides a "service selection and profile" determination function if the User to Service (and authorization) environment is known. When a User is added to the directory, their service profiles can be added at the same time (as described above in relation to the Multi Object Management CVM) and, with this knowledge, the directory system 100 can perform composite authorization verification and service profile selection, all at the same time.

For instance, if a directory-enabled web application could "Search" a User's environment objects with a device type and authentication token (a name/password) as the multi object filter, and the response given (on success) was one or more permissible services for that User, there would be only a small number of directory interactions and only a small degree of explicit directory object knowledge required by the web based application.

The CVM-SA is initiated by an X.500/LDAP Search operation that contains a Filter specification containing the service requirements, the authorization token (to be validated), optional device properties, and a Matching Rule Identifier equal to "Authorise".

CVM—Relational Searching (CVM-RS)

An object based directory is not well suited to manage relationships between objects that may exist in a single DIT or dispersed DITs. To overcome this problem, the CVM-RS provides searching facilities which are native to relational databases, but reengineered to suit the characteristics of X.500/LDAP directory operations. This provides a convergence of the two types of information management paradigms; that is, traditional RDBMS and object based X.500/LDAP directories.

A difficulty referred to as the split service provider problem occurs when a subscriber gets mobile phone services from company X and Internet services from Company Y. Company X and Y have agreed to interconnect their directory services but have dedicated entries for their customers. In prior art directory systems, if someone wants to find all the available details for the subscriber, then two or more directory operations are performed, and a directory result joining process is used to combine the results.

Where objects placed in the directory represent a user, the user's service profiles, address books, memberships, their presence and their own content, then the business level requirement for "a single customer view" is satisfied if all objects related to a user are seen collectively. This can only be achieved through relational searching features.

Relational Searching CVMs are activated when a directory User's search request contains filter items containing the Matching Rule filters and identifiers for relational searching.

Matching Rules are a standard X.500 mechanism for invoking specialised information matching policies. In this case they provide the capability for a directory User to examine the local and distributed databases 126 to 134 in sequence as one atomic operation, returning the relational results back to the directory User.

The following logical specification describes a convention for specifying a search-filter that permits relationships between objects/subtrees to be followed in a multi-step sequence without the directory User client having to perform iterative searching. This reduces both client application workload and network overhead and allows for optimization of the search-filter process in the directory system.

The Relational Searching CVMs use an X.500/LDAP directory search filter containing the following logical operators:

(i) Source—Specifies the attribute type and value that is obtained from the source subtree object used to populate the relational filter attribute used in the next search sequence.

(ii) Relate—Specifies the target object class and attribute Id on which the Source Value will be applied.

(iii) Base Object—Specifies the base DN (as per X.500) of a relational search filter. (Optional)

(iv) Scope—Specifies the scope of a relational search filter (as per X.500). (Optional)

For example, the following LDAP search filter finds all the users that are on line (present) in the locality of a particular user.:

Step 1
(base DN=Subscriber name)
Source=Locality, Location="value" (of the respective subscriber)
Relate=Location, Object Class=Subscriber (to other subscriber entries in step 2)

Step 2
(base DN=Subscriber DIT)
Source=Subscriber Name (s) (where location value is the same as the initial subscriber)
Relate=Subscriber Names, Object Class=Presence Step 3
(base DN=Presence DIT)
Source=Presence Status=TRUE (for the Subscriber names in the same location)
Relate=Subscriber Names (return those names who are on line)

The Relational Searching VM is initiated by any of the X.500/LDAP Search operations that contain a Filter specification containing the service and authorization token to be validated and a Matching Rule Identifier equal to "Relational".

USER—Service Management—Collective Functionality

The directory system 100 provides an identity-based service set with its CVM processing for:

(i) CVM—Multi-Object Management
(ii) CVM—Service Authorization
(iii) CVM—User Presence
(iv) CVM—Relational Searching
(v) CVM—Validation—Certificate Paths (CVM-VC)

These CVMs should be viewed as a collection of processes that enable (mobile) identity based eBusiness services to be implemented efficiently and with high integrity and flexibility, as follows:

(i) Multi Object management allows a User and their environment to be created and managed easily, (ii) Service Authorization allows a User to rapidly enter the service environment according to access device types and security token usage, (iii) User Presence allows the system to know of and profile the User on demand as well as inform other Users about their presence.

(iv) Distributed relational searching enables the Service managers to obtain the business level intelligence from the directory about their Users and services.

(v) Validation of Certificate Paths enables signed message recipients to validate the originator with one action (not three, four or five).

Directory Service Messaging (DSM)

The directory system 100 incorporates transactional messaging functionality, including instant messaging, into its directory service infrastructure. Transactional messaging differs from traditional (non-transactional) messaging (e.g., standard email) in that the delivery of messages is transactional in an atomic, end-to-end sense, rather than a store-and-forward sense.

Existing computer desktop environments can provide email, instant messaging and directory services. All three are quite distinct in terms of their User interfaces, protocols and storage approaches (e.g., mail boxes and desktop folders). In local desktop environments, users can drag and drop items into folders and desktop objects. The directory system 100 provides an environment where these objects are represented in a large scale, external directory service in which items can be dragged and dropped explicitly using a mouse or implicitly by sending a "message".

With a directory-based approach to messaging and transaction systems, a directory object is used as a mailbox that can be updated using a modify attribute command with a message that may contain a document (the attachment). In contrast with existing messaging systems that transfer messages on a store-and-forward basis, the directory system 100 provides message transfer and delivery processes that are transaction based and effectively instant. A property of users interacting with transactional or instant messaging is that a user's presence can be detected. Presence is assigned to directory operations that are associated with User authentication and the transmission and reception (accessing a mailbox or note pad object).

In the description below, the term "Directory Supported Messaging" (DSM) is used to describe traditional messaging systems such as SMTP, MIME and X.400 directory based messaging. This type of system is where the messaging functions (the store-and-forward components of the system) are seen as the primary elements and the directory service is provided to authenticate Users, support address books and message route configuration data.

The term Directory Service Messaging/Transactions (DSM/T) is used to describe the transactional and instant messaging processes used by the directory system 100.

DSM/T provide many advantages over existing DSM systems, including:

(i) Consistency in "drag and drop" operations for eBusiness Users.

(ii) Fewer communications and network protocols within and between the systems therefore reduced configuration effort and higher resultant throughputs (iii) A simpler yet more effective infrastructure, which is name and identity based, distributed and object oriented.

(iv) A single point of log-on can protect a much wider set of integrated services and support presence.

(v) Consistency in terms of dealing with User privileges and access profiles over the system services and its information content such as address books and post boxes.

(vi) The replacement of the messaging store-and-forward concepts to on-line presence based transactional and instant messaging operations.

(vii) Less complexity in the User client software (thinner clients) and therefore less support costs.

(viii) A single mailbox concept that can have (typed) partitions for: documents, messages, faxes and voice, instant messages.

(ix) Recipient capability to bar message originators through the use of the directory service access controls and directory resident member lists.

(x) Directory entries that represent User groups, distribution lists, common security profiles and content evaluation rules.

In order to process email and messages within a directory service, Message Store Management (delete a message), Message Submission, Message List Expansion, Message Retrieval and Message Delivery functions are provided by message processing VMs of the customised VMs 212, as follows:

(i) A Message Submission VM, (CVM-EMS), (ii) A Message Management VM, (CVM-EMM), (iii) A Message List expansion VM, (CVM-EML), and (iv) Message Retrieval VM, (CVM-EMR).

The directory operations performed by these VMs are shown in Table 6 below.

TABLE 6

| CVM Operation | Directory Operation | Comment |
|---|---|---|
| Message Submission | Modify Entry to add an attribute value of an "OutBox" | Entry Object Class is MailBox - Attribute will be Message |
| Message Store Mgt | Modify Entry to remove an attribute value of an Inbox | Entry Object Class is MailBox - Attribute will be Message + Id |
| Message Retrieval | Read/Search Entry | Entry Object Class is MailBox - Attribute will be Messages or Message + Id Similar to the POP3 approach of examining an Inbox. |
| Message List Expansion | Modify Entry to add an attribute value (the message) to the Distribution List | Entry Object Class is Distribution List - Attribute will be Message |

Message Ancillary VMs are used to manage Address Books, customizing message folders (mail boxes) and managing Calendar/Diary functions, as follows:

(i) CVM-EAB (Address Book);

(ii) CVM-EMF (Mail Folder); and (iii) CVM-ECD (Calendar/Diary).

The directory operations performed by these VMs are shown in Table 7 below.

TABLE 7

| CVM Operation | Directory Operation | Comment |
|---|---|---|
| Address Book Mgt | Modify Entry to add, modify or remove attribute values | Each entry in the address book is a composite attribute containing the named entity's details |
| Mail Box Mgt | Modify mailbox naming attributes | as per existing email systems |
| Calendar/Diary | Modify Entry to add, modify or remove attribute values | as per existing email systems |

Message Gateway VMs are used to interface the directory to existing messaging systems to enable transition and interworking. Gateway VMs are used to provide HTTP, SOAP, SMTP, SMIME, and POP3/IMAP protocols/services.

For example, a POP3 Gateway VM acts as a client's "INBOX" system, and performs the directory actions listed in Table 8.

TABLE 8

| POP3 Command | Directory Action | Comment |
|---|---|---|
| STATus | Read Mail box stats | Lists number of message attributes |
| LIST | Read a message header | |
| RETRieve | Reads a message entry | |
| DELete | Deletes a message entry | |
| NOOP | Nothing | |
| RSET | Resets Delete Flags | clears the mail box delete message flags |
| QUIT | Updates the mailbox or quits the session | according to STATE (previous commands) deletes the messages marked for deletion or disconnects from the gateway |
| TOP | Reads a message header | |
| UIDL | Reads a message with a Unique Id | |
| USER | Authenticates User Name | |
| PASS | Authenticates Password | |
| APOP | Duplex Connection Authentication | |

This entity is represented in the directory system as an entry with an object class of, for example, "InBox—xxx" and any update on this entry (which is a message for the client) is stored. The POP3 protocol gateway manages this mail box directory entry when a client process accesses it via the POP3 protocols.

The directory system 100 supports the entities and attributes shown in Table 9.

TABLE 9

| Object Classes | Attributes | Comment |
|---|---|---|
| Mail Box | Mail Box Owner (DN) Mail Box Owners email address(es) Mailbox Name (eg Inbox) Mailbox mode (In, Out or store) Mail Box Size Out of Office Message Barred Subjects Barred Content | The mailbox o/c class can invoke special processing in that its message attribute is processed for: (i) Message delivery mailbox selection (ii) Delivery notification requirements (iii) Out of Office message responses (iv) Deleted message removal (v) Unread messages |

TABLE 9-continued

| Object Classes | Attributes | Comment |
|---|---|---|
| | Barred Originators | (vi) Barred items |
| | Mail Box Entry (s) | (vii) Limits being reached |
| Message Distribution List | Message List Owner (DN) | |
| | List's Owners email address(es) | |
| | List Identifier | |
| | Message Non Response - Policy re notify list/originator | |
| | Barred Subjects | |
| | Barred Content | |
| | Barred Message Originators | |
| | Permitted Message - Originators | |
| | Member Entries (s) | |
| Address Book | Address Book Owner (DN) | |
| | Multiple entries of Name | |
| | Email | |
| | Phone | |
| | Fax | |
| | Web | |
| | Business Category, | |
| Calendar/ Diary | Date/Time/Event/ Duration, entries | |
| Instant Messaging Pad | Friend List/Rosters | |
| | Friend Status | |
| | Banners | |
| | Date/Time Created | |
| | Line Number | |

Submitted or 'posted' messages are represented in the directory system 100 as an entry with an object class of, for example, "Out Box—xxx", where xxx represents a date, such as "July 2003", for example, and any update on this entry (which is a message for transfer, can be validated and sent by the local directory system 100. This object class is monitored by the CVM-EMS so that event signals can be sent to the mailbox owner if notification of submission (and transfer) is required.

Message distribution lists are represented in the directory system 100 as entries with an object class of "MailList-xxxx" and any update on this entry (which is a message for expansion and onward delivery), is be validated, responded to (back to the originator), and the message expanded and stored for onward processing. This is either by the directory system 100 itself as transactional mail to other mail lists, or recipient objects, or sent via its mail gateways VMs.

A user's mailbox is represented in the directory system as an entry with an object class of "In Box—xxx" and any update on this entry (which is a message for expansion and delivery in the local system, is validated, responded to (back to the originator) if required, and the message expanded and stored in the local directory system. This object class is monitored by the CVM-EMR so that event signals can be sent to the mailbox owner through Persistent Search operations or LDAP event systems.

The above features can deal with facilities such as:

(i) multi-casting messages to a group of directory names, (ii) holding messages for receipt—if the User is deemed off line.

(iii) providing an alternative delivery method to the User's entry or target entry protection.

(iv) message vetting (time of day or subject).

The directory system 100 described above can be implemented as application software modules for execution by a standard computer system executing a standard operating system, such as Linux. Alternatively, one or more modules of the directory system 100 can be implemented as part of an operating system (as drivers through APIs) executed by the standard computer system in order to improve the performance of the directory system 100. However, it will be apparent to those skilled in the art that one or more of the processes executed by the directory system 100 can be implemented as dedicated hardware components such as application-specific integrated circuits.

Figure 5:
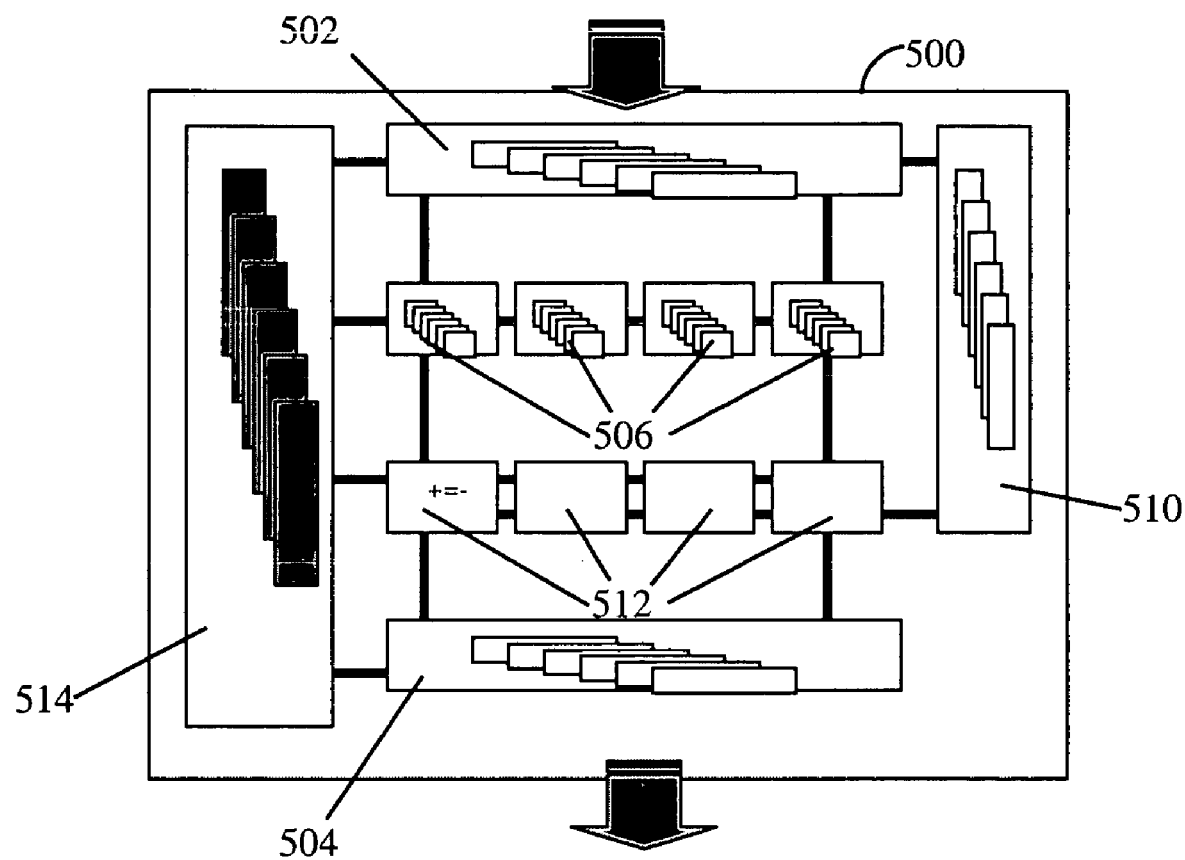
FIG. 5 is a schematic diagram of an attribute segment processor of an alternative embodiment of the directory system.

In an alternative embodiment, the directory system 100 can be implemented using a computer system having at least one dedicated ASIC referred to as an attribute segment processors (ASP) 500, as shown in FIG. 5. One or more ASPs 500 can be provided on a PCI card for insertion into a standard IA-32 or IA-64 computer system. The ASP 500 includes input registers 502, output registers 504, attribute sub-segment memory 506, filter and entry information selection processing logic 510, attribute cell, ACI Role Id and filter evaluation units 512, ASP command and (input/output) control logic 514.

The input and output registers 502, 504, each include status, configuration and directory parameter registers, as described in Table 10 below. The attribute cell and filter evaluation units 512 determine whether cell values are present, less than, equal to, greater than, a prefix or substring of the evaluation criteria presented.

The ASP 500 can be loaded with up to 32 Attribute sub-segments and up to 4 MB of cell data (e.g., 1024 data cells of up to 4096 bytes per cell). However, the number of Attribute sub-segments and bytes of cell data per ASP 500 is a fabrication issue and can be modified as desired, subject to design rule constraints.

The ASP 500 has a control interface (not shown) through which the higher level software and its driver passes data and commands, via the PCI bus of the host computer system. The ASP 500 has a status and response interface (not shown) through which the higher level software and its driver can read the ASP's command results. The ASP 500 can load and dump its Attribute sub-segments and Cells from or to the hosting machine's memory hardware via its PCI bus. Where directory read or search operations are performed, the ASP 500 marks the cells that comply with the read/search criteria. The ASP 500 then writes this to its output memory area.

The ASP control interface is represented in Table 10:

TABLE 10

| Directory Operation | ASP Command | Notes/Parameters |
|---|---|---|
| ASP Management | INITIALISE | Resets all registers, Clears all Attribute sub-segments and their Cells |

TABLE 10-continued

| Directory Operation | ASP Command | Notes/Parameters |
|---|---|---|
| ASP Management | INITIALISE SUB SEGMENT | Clears the specified Attribute sub-segment and its Cells |
| ASP Management | RESET - REGISTERS | Resets all registers or the defined register. See sub Table below |
| ASP Management | STOP | Stop any existing commands and unmark any marked cells |
| Order Preparation | LOAD REGISTER | See sub Table below |
| Order Completion | READ STATUS | See sub Table below |
| sub-segment Management | HASH | Cycles the Cells of the specified Attribute sub-segment and generates the value hash fields. |
| sub-segment Management | SET BASE and DUMP | Cycles the Cells of the specified Attribute sub-segment and where they are marked - dumps them to the memory area defined. |
| Add Entry/Attribute | ADD CELL | Writes a new cell to the specified Attribute sub-segment. If the RDNId specified already exists and the attribute type is distinguished a naming error is indicated in the status register. |
| Remove Entry/Attribute | REMOVE CELL | Deletes a cell (or cells of multi valued attributes) (as specified by the RDNId) from the specified Attribute sub-segment. If the RDNId specified does not exist an attribute error is indicated in the status register. |
| Read Entry/Attribute | READ CELL | Reads the cells (as specified by the RDNId) from all Attribute sub-segments that comply with the Entry Information Selection criteria |
| Compare Entry/Attribute | MODIFY CELL | Compares the cells (as specified by the RDNId) from all Attribute sub-segments with that of the Comparison criteria |
| Modify Entry/Attribute | MODIFY CELL | Modifies a cell (as specified by the RDNId) in the specified Attribute sub-segment. If the RDNId specified does not exist an attribute error is indicated in the status register |
| Modify Name Entry/Attribute | MODIFY - RDNID | Modifies a cell's RDNId (as specified by the RDNId) in the specified Attribute sub-segment If the new RDNId specified already exists and the attribute type is distinguished a naming error is indicated in the status register. |
| Copy Attribute | COPY ATTRIBUTE | Creates a new cell from the RDNId specified to that of the "new RDNId" in the specified Attribute sub-segment If the new RDNId specified already exists and the attribute type is distinguished a naming error is indicated in the status register. |
| Search | SEARCH | Cycle all Attribute Segments and mark the cells that comply with the Search Filter and Entry Information Selection Criteria |

The ASP RESET, LOAD REGISTER and READ STATUS commands operate on a range of hardware registers within the ASP 500. Table 11 defines these registers:

TABLE 11

| Register Name | Comments |
|---|---|
| ATTSUBSEG(s) | Sets the Attribute sub-segment for the operation (initialize, modify or delete) |
| RDNId | Sets the RDN Id all operations (except Search) |
| Filter | Sets the X.500/LDAP Filter registers. These have specific groups for AND, OR and NOT functions. |
| EIS | Sets the X.500/LDAP Entry Information Selection parameters into the ASP as used on Read and Search |
| Assigned ACI | Sets the ACI Role Ids for the Attribute Sub Segment |
| User ACI | Sets the ACI Role Ids for the User |
| VALUE | Sets the attribute value for write/modify type operations |
| VALUE NORM | Sets the normalized version attribute value for write/modify type operations |
| MEMORY BASE | Sets the memory base used for Dump, Load operations and writing marked cells into memory. |
| STATUS | Read by the software to determine process outcomes |
| CONFIG | Read by the software to see how many: Attribute sub-segments are supported, Cells per Attribute sub-segment are supported and their size, Attribute sub-segments are free, Cells per Attribute sub-segment are free and; to see what attribute types are supported by the Attribute sub-segments being used. Written by the software to set: The number of Cells per Attribute sub-segment The size of Cells per Attribute sub-segment |

The ASP Status register is set on completion of its command processing. There are general status indicators and X.500/LDAP operation indicators, as shown in Table 12.

TABLE 12

| Status Register Item | Comments |
| --- | --- |
| Busy/Completed | The ASP has its operation in progress or has completed, |
| ASP Error | eg memory errors, internal malfunction, etc |
| Cell Flags | Set to the flags of the cell being read |
| Naming Error | Named item exists on add entry or modify RDN |
| Attribute Error | Named item does not exist on modify or remove |
| File Flag set | Set when the value of an attribute being read is not in the ASP - as it has been backed out to the machines file system |
| Entries Found | Set to the number of entries if entries have been marked as meeting the selection criteria |

Many modifications will be apparent to those skilled in the art without departing from the scope of the present invention as herein described with reference to the accompanying drawings.

What is claimed is:

1. A method for storage and retrieval of directory data in a directory system running on at least one processor having access to at least one data storage device and at least one communications network with interfaces to at least one application running on other processors having need of directory system services, said method comprising:
   running plural intelligent directory service modules as a part of said directory system, said intelligent directory service modules comprising (a) an identity management module, (b) a presence management module, and (c) a messaging management module;
   storing data objects used by the directory service modules in respectively corresponding different organized logical segments of memory, each segment containing object attribute data needed by the corresponding directory service module to perform its intelligent service in response to an incoming request;
   receiving directory service requests from said application(s) running on said other processors, said requests including an identification of the type of requested directory service comprising (a) identity service, (b) presence service, and (c) messaging service;
   directing received directory service requests to the directory service module respectively corresponding to the identified type of requested directory service; and
   returning responses to incoming requests based on the outputs of at least one intelligent directory service module without requiring access of other object attribute data separately stored for another of the intelligent directory service modules.

2. A method as in claim 1, wherein said intelligent directory service modules provide customized virtual machines within said directory service.

3. A method as in claim 1, wherein data storage and processing methods practiced by said intelligent directory service modules are embodied within solid state integrated circuits.

4. A method as in claim 1, wherein said different organized logical segments of memory containing object attribute data associated with corresponding different intelligent directory services are, in turn, logical segments of memory providing a directory information tree (DIT).

5. A method as in claim 4, wherein said DIT is used to locate the logical segment of memory corresponding to the requested intelligent directory service and to access the object attribute data associated therewith.

6. A method as in claim 1, wherein said object attribute data includes data indicating whether each of said attributes is associated with one or more other attributes.

7. A method as in claim 1, wherein said attribute data includes data indicating whether each of said attributes is a sponsoring attribute for one or more other attributes.

8. A method as claimed in claim 1, wherein attributes having directory object naming characteristics in common are stored together.

9. A method as in claim 8, wherein the directory object naming characteristics correspond to one of: distinguished name attributes, aliased distinguished names, and non-naming attributes.

10. A method as in claim 1, wherein one of the intelligent directory services provides security services and uses its own security attribute data corresponding to one of: collective attributes, compound attributes, attributes of compound attributes, X.500/LDAP operational attributes, user operational attributes, sponsoring attributes.

11. A method as in claim 1, wherein said segments include a first segment for storing distinct name binding rules, access control information, object schema and management data for said directory objects.

12. A method as in claim 11, wherein one of the intelligent directory services provides configuration services with said schema and management data to configure said object attribute data according to processing requirements of said intelligent directory services.

13. A method as in claim 4, wherein:
   the directory system generates a directory operation access control identifier for use in determining whether a user is granted access to perform a selected directory operation on a selected attribute type in a selected portion of a DIT, said directory operation access control identifier identifying said directory operation, said portion of said DIT and said attribute type, and
   the directory system determines whether said access is granted on the basis of a comparison of said directory operation access control identifier with one or more access control identifiers associated with one or more of said portion of said DIT, said attribute type, and an attribute type group including said attribute type.

14. A method as in claim 1, wherein:
   the directory system is adapted to generate one or more access control identifiers for a user on the basis of access configuration information for a user, and
   a trusted operating system is used to determine said user's access to a directory object on the basis of access control identifiers associated with said object and said user.

15. A method as in claim 1, wherein said memory segments include transaction segments dedicated to storage of transaction data representing phases of a directory transaction to allow recovery of said directory transaction.

16. A method as in claim 1, including an adaptation component for automatically reconfiguring said memory segments on the basis of usage of said memory segments.

17. A method as in claim 1, wherein said memory segments include at east one adaptation segment dedicated to storage of adaptation data representing the usage of said memory segments.

18. A method as in claim 17, wherein said adaptation data represents the organization of directory data stored in said memory segments.

19. A method in claim 16, wherein said reconfiguring includes segregating one or more portions of said directory data on the basis of access frequencies for said one or more portions of said directory data.

20. A method as in claim 16, wherein said reconfiguring includes segregating one or more portions of directory data based on the number of instances of an entity of said directory data in a region of memory.

21. A method as in claim 16, wherein said reconfiguring includes segregating instances of an attribute type from a name space into two or more regions of memory.

22. A method as in claim 1, including modules for accessing and managing said plurality of memory segments.

23. A method as in claim 22, including a composite attribute module for managing composite attributes and extracting from said composite attributes particular attributes for storage in an associated object attribute data segment.

24. A method as in claim 22, including a statistical module for generating statistical data in relation to directory entries.

25. A method as in claim 22, including a monitoring module for monitoring one or more directory entries and for generating notification data in response to modification of a monitored directory entry.

26. A method as in claim 22, including a collective attributes module for segregating collective attributes of entries within a name space.

27. A method as in claim 22, including a X.509 certificate validation module for validating one or more certificate paths.

28. A method as in claim 22, including a multi-object management module for processing two or more objects as an entity.

29. A method as in claim 28, wherein said two or more objects include a sponsoring object and one or more sponsored objects.

30. A method as in claim 29, wherein said multi-object management module is adapted to automatically generate said one or more sponsored objects when a sponsoring object is generated.

31. A method as in claim 30, wherein said multi-object module is adapted to automatically generate one or more objects related to a user object when said user object is generated.

32. A method as in claim 31, wherein said user object represents a user, and said one or more objects represent one or more services for said user.

33. A method as in claim 1, including a service authorization module for determining whether a user is authorized to use one or more services.

34. A method as in claim 33, wherein said service authorization module is adapted to perform said determining in response to a directory search.

35. A method as in claim 34, wherein said directory search is based on an authorization matching rule, service and device properties, and an authorization token.

36. A method as in claim 1, including a relational search module for performing a distributed object relational search in response to a search query including relational operators.

37. A method as in claim 1, wherein the identity-based service components include a user presence management component that maintains presence attributes of said users, said presence attributes including an attribute that indicates whether a user is using a directory.

38. A method as in claim 37, wherein said user presence management component generates one or more events in response to a change in said user presence attributes for each user.

39. A method as in claim 1, wherein the message-based service component includes a message transfer component that enables the message attributes of said directory objects to be transferred to other directory objects.

40. A method as in claim 1, including at least one attribute processor adapted to store and process attribute data of a directory.

41. A method as in claim 40, wherein said attribute processor includes an application-specific integrated circuit.

42. Computer-readable storage media storing executable computer program code which, when executed, performs the method of claim 1.

43. Apparatus for storage and retrieval of directory data comprising a directory system running on at least one processor having access to at least one data storage device and at least one communications network with interfaces to one or more applications running on other processors having need of directory system services, said apparatus comprising:

plural intelligent directory service modules running as a part of said directory system, said intelligent directory service modules comprising (a) an identity management module, (b) a presence management module, and (c) a messaging management module;

memory storing data objects used by the directory service modules in respectively corresponding different organized logical segments of memory, each segment containing object attribute data needed by the corresponding directory service module to perform its intelligent service in response to an incoming request;

at least one data input receiving directory service requests from said application(s) running on said other processors, said requests including an identification of the type of requested directory service comprising (a) identity service, (b) presence service, and (c) messaging service;

means for directing received directory service requests to the directory service module respectively corresponding to the identified type of requested directory service; and means for returning responses to incoming requests based on the outputs of at least one intelligent directory service module without requiring access of other object attribute data separately stored for another of the intelligent directory service modules.

44. Apparatus as in claim 43, wherein said intelligent directory service modules provide customized virtual machines within said directory service.

45. Apparatus as in claim 43, wherein data storage and processing methods practiced by said intelligent directory service modules are embodied within solid state integrated circuits.

46. Apparatus as in claim 43, wherein said different organized logical segments of memory containing object attribute data associated with corresponding different intelligent directory services are, in turn, logical segments of memory providing a directory information tree (DIT).

47. Apparatus as in claim 46, wherein said DIT is used to locate the logical segment of memory corresponding to the requested intelligent directory service and to access the object attribute data associated therewith.

48. Apparatus as in claim 43, wherein said object attribute data includes data indicating whether each of said attributes is associated with one or more other attributes.

49. Apparatus as in claim 43, wherein said attribute data includes data indicating whether each of said attributes is a sponsoring attribute for one or more other attributes.

50. Apparatus as claimed in claim 43, wherein attributes having directory object naming characteristics in common are stored together.

51. Apparatus as in claim 50, wherein the directory object naming characteristics correspond to one of: distinguished name attributes, aliased distinguished names, and non-naming attributes.

52. Apparatus as in claim 50, wherein one of the intelligent directory services provides security services and uses its own security attribute data corresponding to one of: collective attributes, compound attributes, attributes of compound attributes, X.500/LDAP operational attributes, user operational attributes, sponsoring attributes.

53. Apparatus as in claim 43, wherein said segments include a first segment for storing distinct name binding rules, access control information, object schema and management data for said directory objects.

54. Apparatus as in claim 53, wherein one of the intelligent directory services provides configuration services with said schema and management data to configure said object attribute data according to processing requirements of said intelligent directory services.

55. Apparatus as in claim 46, wherein:
the directory system generates a directory operation access control identifier for use in determining whether a user is granted access to perform a selected directory operation on a selected attribute type in a selected portion of a DIT, said directory operation access control identifier identifying said directory operation, said portion of said DIT and said attribute type, and
the directory system determines whether said access is granted on the basis of a comparison of said directory operation access control identifier with one or more access control identifiers associated with one or more of said portion of said DIT, said attribute type, and an attribute type group including said attribute type.

56. Apparatus as in claim 43, wherein
the directory system is adapted to generate one or more access control identifiers for a user on the basis of access configuration information for a user, and
a trusted operating system is used to determine said user's access to a directory object on the basis of access control identifiers associated with said object and said user.

57. Apparatus as in claim 43, wherein said memory segments include transaction segments dedicated to storage of transaction data representing phases of a directory transaction to allow recovery of said directory transaction.

58. Apparatus as in claim 43, including an adaptation component for automatically reconfiguring said memory segments on the basis of usage of said memory segments.

59. Apparatus as in claim 43, wherein said memory segments include at least one adaptation segment dedicated to storage of adaptation data representing the usage of said memory segments.

60. Apparatus as in claim 59, wherein said adaptation data represents the organization of directory data stored in said memory segments.

61. Apparatus as in claim 58, wherein said reconfiguring includes segregating one or more portions of said directory data on the basis of access frequencies for said one or more portions of said directory data.

62. Apparatus as in claim 58, wherein said reconfiguring includes segregating one or more portions of directory data based on the number of instances of an entity of said directory data in a region of memory.

63. Apparatus as in claim 58, wherein said reconfiguring includes segregating instances of an attribute type from a name space into two or more regions of memory.

64. Apparatus as in claim 43, including intelligent directory service modules for accessing and managing said plurality of memory segments.

65. Apparatus as in claim 64, including a composite attribute module for managing composite attributes and extracting from said composite attributes particular attributes for storage in an associated object attribute data segment.

66. Apparatus as in claim 64, including a statistical module for generating statistical data in relation to directory entries.

67. Apparatus as in claim 64, including a monitoring module for monitoring one or more directory entries and for generating notification data in response to modification of a monitored directory entry.

68. Apparatus as in claim 64, including a collective attributes module for segregating collective attributes of entries within a name space.

69. Apparatus as in claim 64, including a X.509 certificate validation module for validating one or more certificate paths.

70. Apparatus as in claim 64, including a multi-object management module for processing two or more objects as an entity.

71. Apparatus as in claim 70, wherein said two or more objects include a sponsoring object and one or more sponsored objects.

72. Apparatus as in claim 71, wherein said multi-object management module is adapted to automatically generate said one or more sponsored objects when a sponsoring object is generated.

73. Apparatus as in claim 72, wherein said multi-object module is adapted to automatically generate one or more objects related to a user object when said user object is generated.

74. Apparatus as in claim 73, wherein said user object represents a user, and said one or more objects represent one or more services for said user.

75. Apparatus as in claim 43, including a service authorization module for determining whether a user is authorized to use one or more services.

76. Apparatus as in claim 75, wherein said service authorization module is adapted to perform said determining in response to a directory search.

77. Apparatus as in claim 76, wherein said directory search is based on an authorization matching rule, service and device properties, and an authorization token.

78. Apparatus as in claim 43, including a relational search module for performing a distributed object relational search in response to a search query including relational operators.

79. Apparatus as in claim 43, wherein the identity-based service components include a user presence management component that maintains presence attributes of said users, said presence attributes including an attribute that indicates whether a user is using a directory.

80. Apparatus as in claim 79, wherein said user presence management component generates one or more events in response to a change in said user presence attributes for each user.

81. Apparatus as in claim 43, wherein the message-based service component includes a message transfer component that enables the message attributes of said directory objects to be transferred to other directory objects.

82. Apparatus as in claim 43, including at least one attribute processor adapted to store and process attribute data of a directory.

83. Apparatus as in claim 82, wherein said attribute processor includes an application-specific integrated circuit.

* * * * *